(12) United States Patent
Smith et al.

(10) Patent No.: US 8,975,205 B2
(45) Date of Patent: Mar. 10, 2015

(54) PHOTOCATALYTIC STRUCTURES, METHODS OF MAKING PHOTOCATALYTIC STRUCTURES, AND METHODS OF PHOTOCATALYSIS

(75) Inventors: Wilson Smith, Plymouth, MA (US); Yiping Zhao, Statham, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 945 days.

(21) Appl. No.: 13/128,526

(22) PCT Filed: Nov. 10, 2009

(86) PCT No.: PCT/US2009/063825
§ 371 (c)(1),
(2), (4) Date: May 10, 2011

(87) PCT Pub. No.: WO2010/054357
PCT Pub. Date: May 14, 2010

(65) Prior Publication Data
US 2011/0245074 A1    Oct. 6, 2011

Related U.S. Application Data

(60) Provisional application No. 61/112,918, filed on Nov. 10, 2008, provisional application No. 61/144,795, filed on Jan. 15, 2009.

(51) Int. Cl.
*B01J 23/00*   (2006.01)
*B01J 23/10*   (2006.01)
(Continued)

(52) U.S. Cl.
CPC ............... *B01J 35/004* (2013.01); *B01J 23/30* (2013.01); *B01J 35/002* (2013.01); *B01J 35/06* (2013.01);
(Continued)

(58) Field of Classification Search
CPC ........ B01J 35/004; B01J 35/06; B01J 35/002; B01J 23/30; B01J 37/0244; B01J 23/06; C25B 1/003; C01B 3/042; C01B 13/0214; C01B 13/0207; C01B 3/04; Y02E 60/364; Y10S 977/762; Y10S 977/764
USPC .................. 502/305, 309, 350; 977/762, 764
See application file for complete search history.

(56) References Cited

U.S. PATENT DOCUMENTS

2007/0184975 A1    8/2007    Yi et al.
2008/0149171 A1    6/2008    Lu et al.
2008/0246961 A1    10/2008   Zhang et al.

FOREIGN PATENT DOCUMENTS

KR          578044 B1 *   5/2006
KR          100578044 B1  5/2006

OTHER PUBLICATIONS

Liu et al., "Anatase TiO2 Nanoparticles on Rutile TiO2 Nanorods: A Heterogenous Nanostructure via Layer-by-Layer Assembly," Langmuir 2007, 23, 10916-10919.*

(Continued)

*Primary Examiner* — Anthony J Zimmer
(74) *Attorney, Agent, or Firm* — Thomas|Horstemeyer, LLP

(57) ABSTRACT

Embodiments of the present disclosure include structures, photocatalytic structures, and photoelectrochemical structures, methods of making these structures, methods of making photocatalysis, methods of splitting $H_2O$, methods of splitting $CO_2$, and the like.

17 Claims, 24 Drawing Sheets

(51) Int. Cl.
*B01J 35/00* (2006.01)
*B01J 23/30* (2006.01)
*B01J 35/06* (2006.01)
*B01J 37/02* (2006.01)
*C01B 3/04* (2006.01)
*C01B 13/02* (2006.01)
*C25B 1/00* (2006.01)

(52) U.S. Cl.
CPC .......... *B01J 37/0238* (2013.01); *B01J 37/0244* (2013.01); *C01B 3/04* (2013.01); *C01B 3/042* (2013.01); *C01B 13/0207* (2013.01); *C01B 13/0214* (2013.01); *C25B 1/003* (2013.01); *Y02E 60/364* (2013.01); *Y10S 977/762* (2013.01); *Y10S 977/764* (2013.01)
USPC ........... 502/309; 502/305; 502/350; 977/762; 977/764

(56) References Cited

OTHER PUBLICATIONS

International Search Report and Written Opinion dated Jun. 30, 2010.
Smith, et al., "Enhanced Photocatalytic Activity by Aligned WP/TiO Two-Layer Nanorod Arrays," J. Phys. Chem C 2008, 112(49), 19635-19641, Nov. 13, 2008.
Wolcott, et al., "Photoelectrochemical Study of Nanostructured ZnO Thin Films for Hydrogen Generation from Water Splitting," Adv. Funct. Mater. 2009, 19, 1-8.
Wolcott, et al., "Photoelectrochemical Water Splitting Using Dense and Aligned TiO2 Nanorod Arrays," www.small-journal.com, small 2009, 5, No. 1, 104-111.
Smith, et al., "Superior Photocatalytic Performance by Vertically Aligned Core-Shell TiO2/WO3 Nanorod Arrays," Catalysis Communications 10(2009) 1117-1121.

* cited by examiner

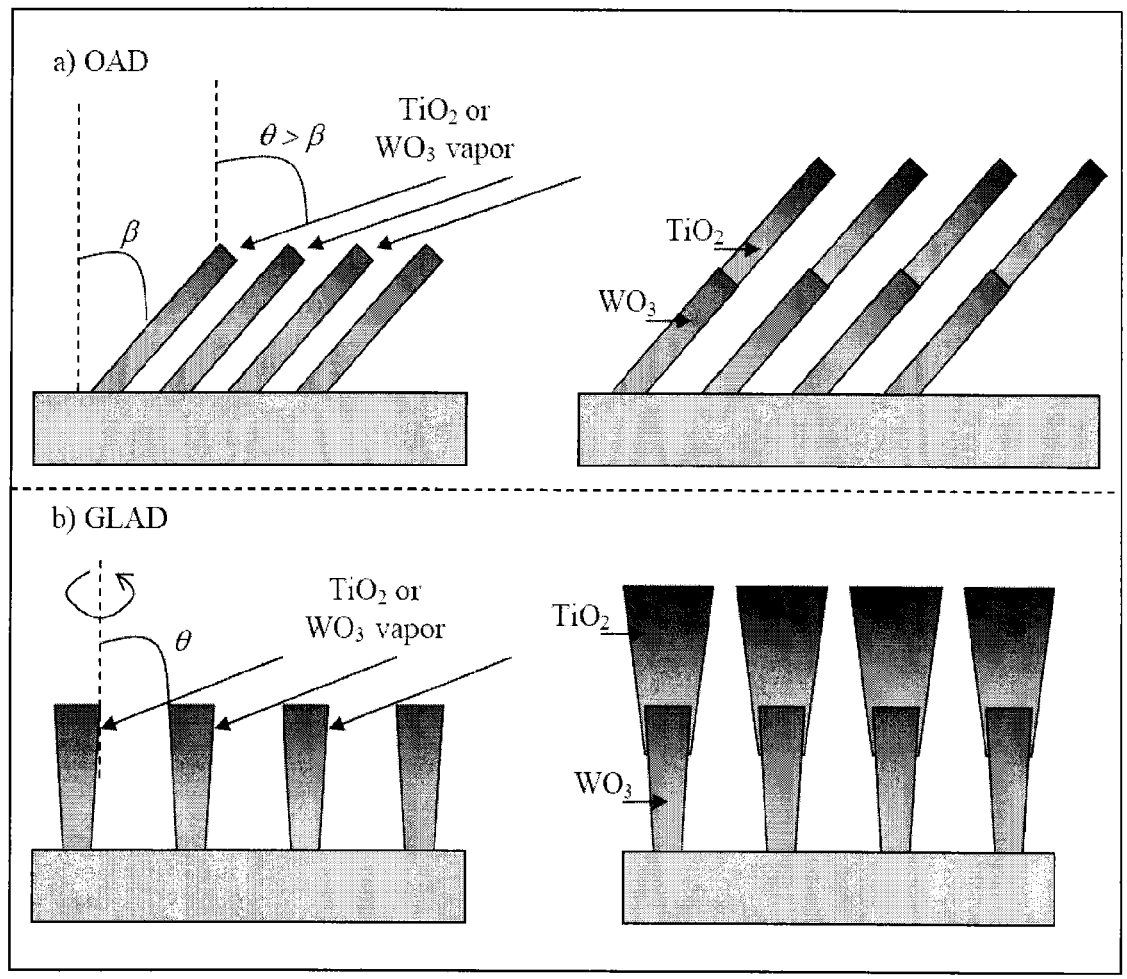
FIG. 1.1

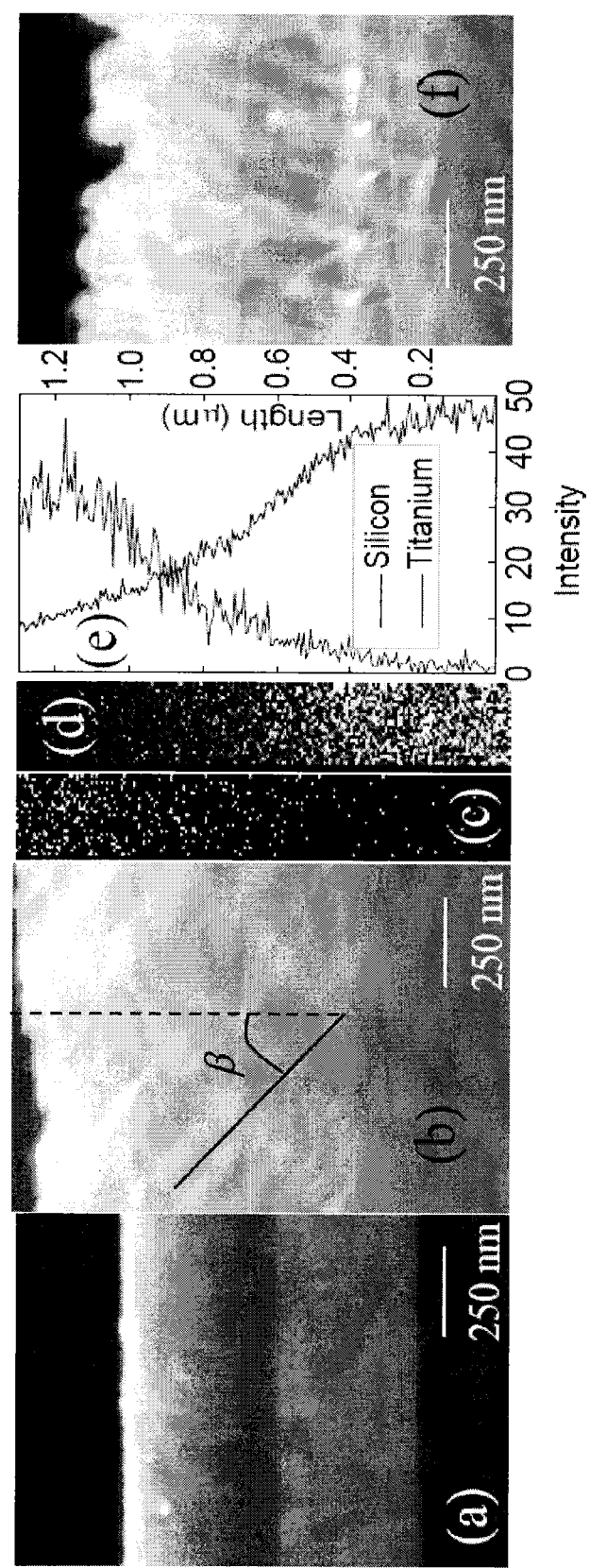
FIG. 1.2

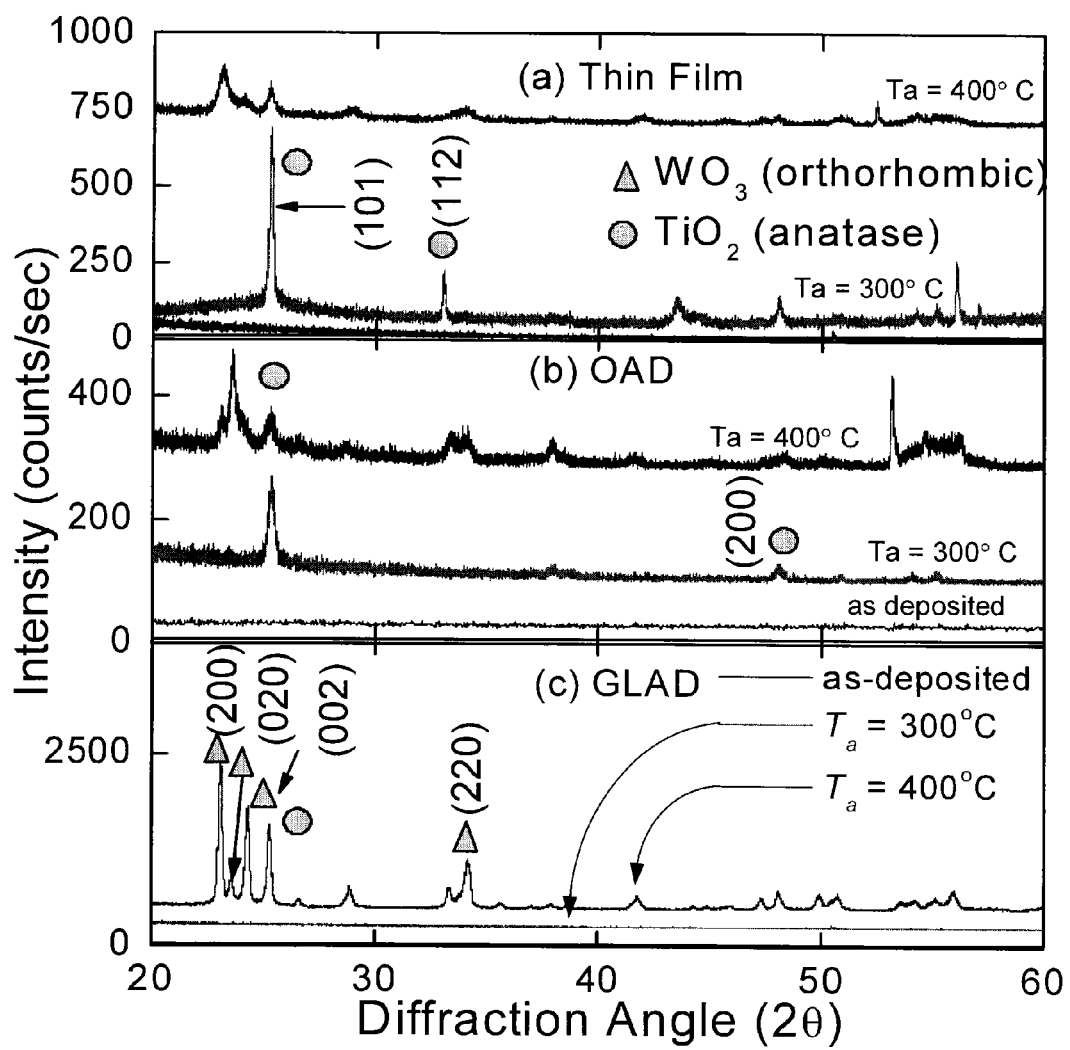
FIG. 1.3

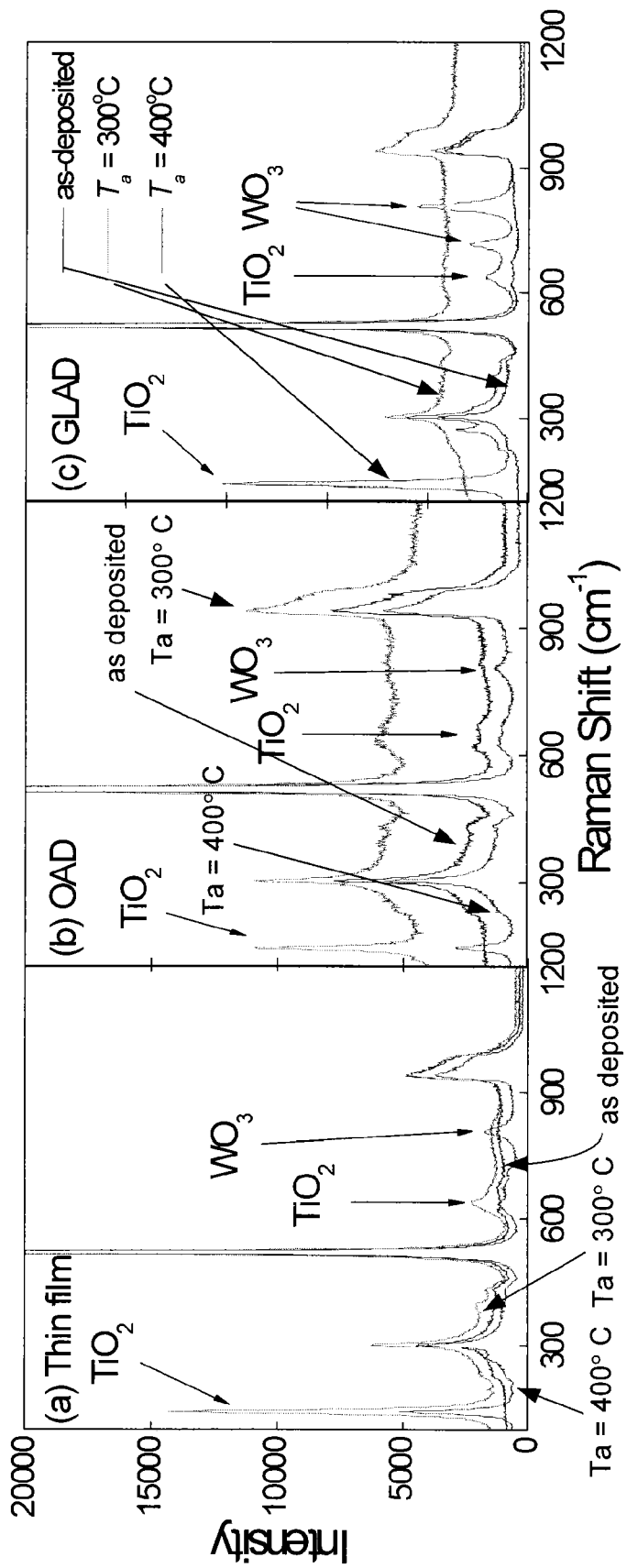
FIG. 1.4

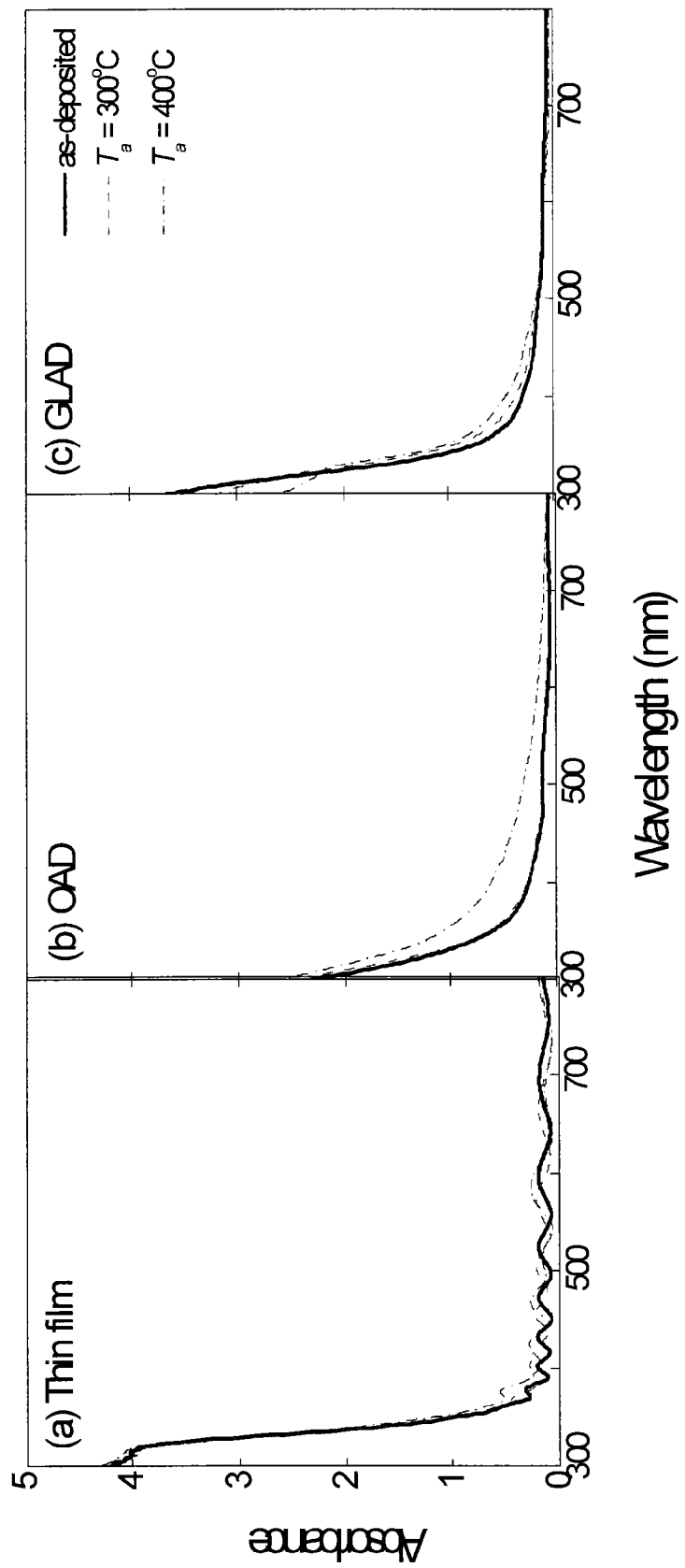
FIG. 1.5

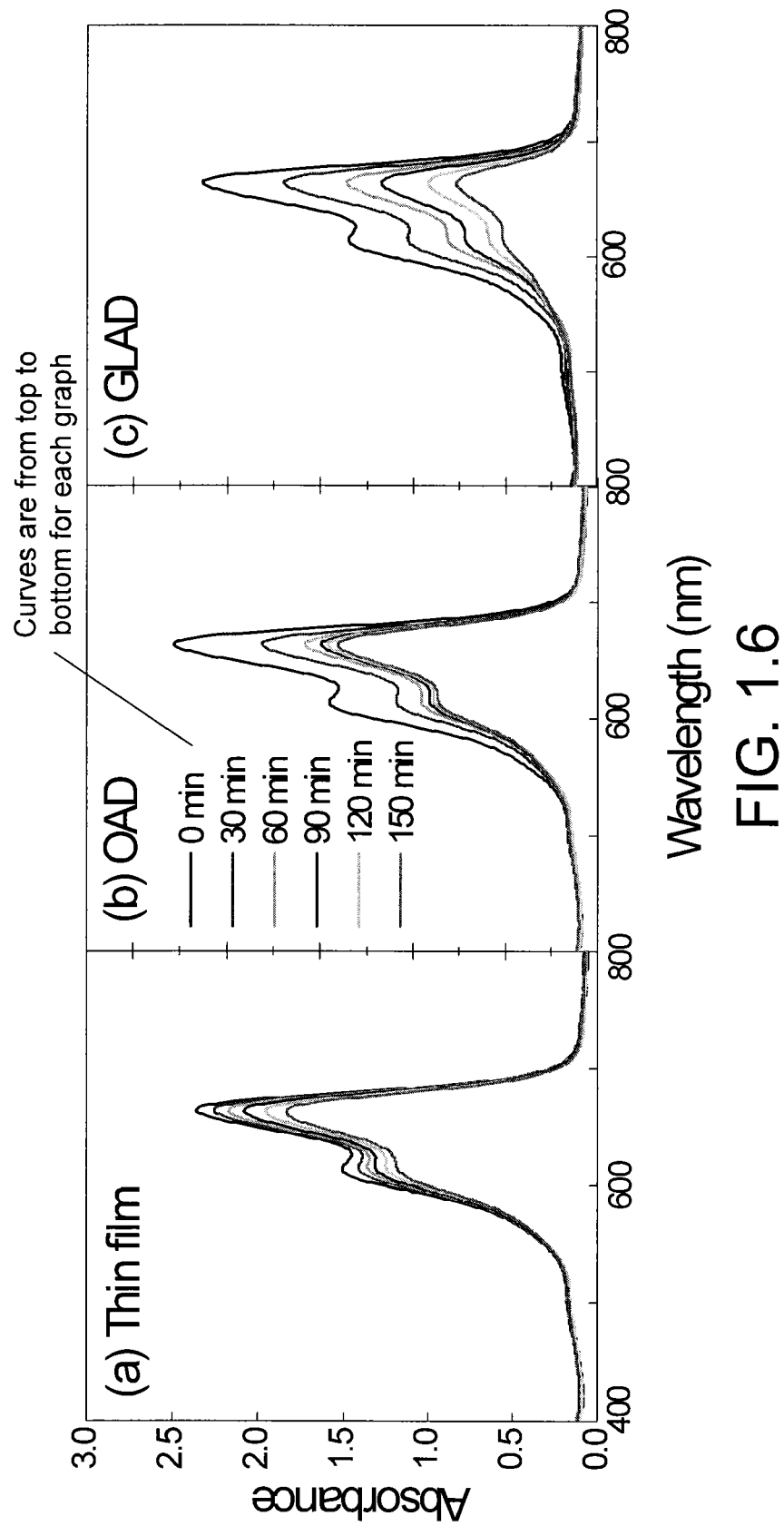
FIG. 1.6

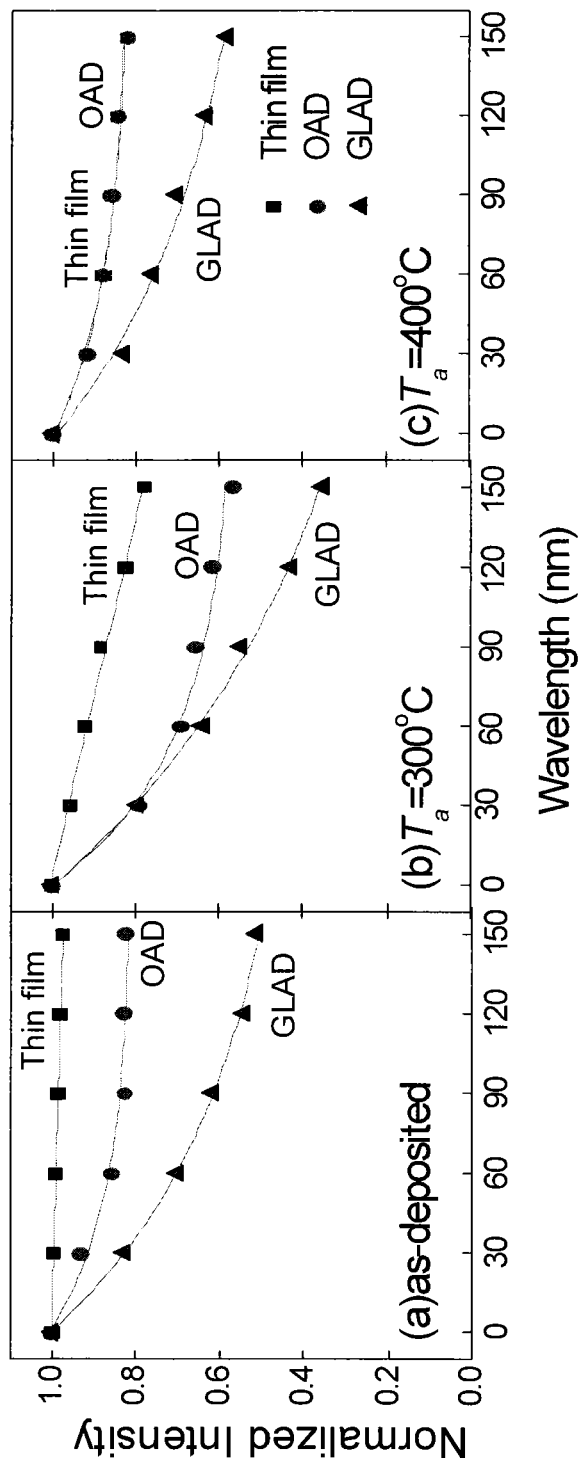
FIG. 1.7

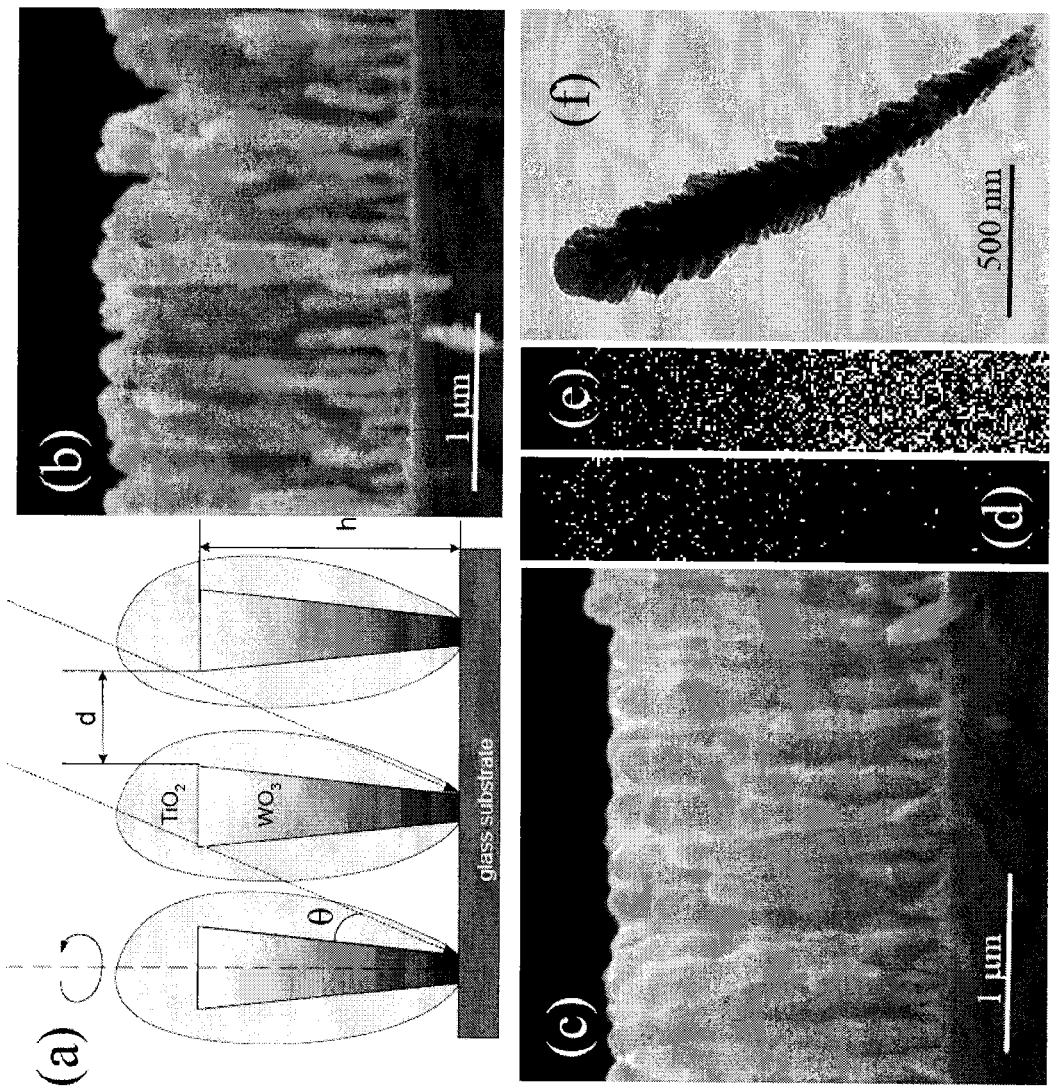
FIG. 2.1

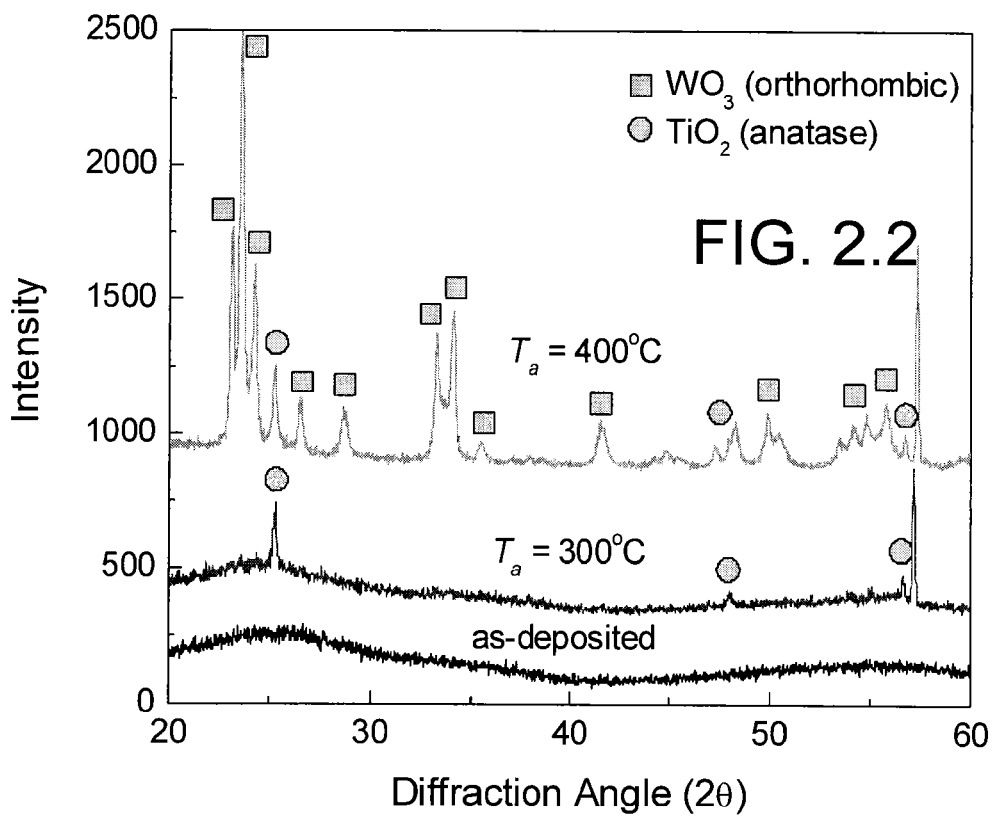
FIG. 2.2
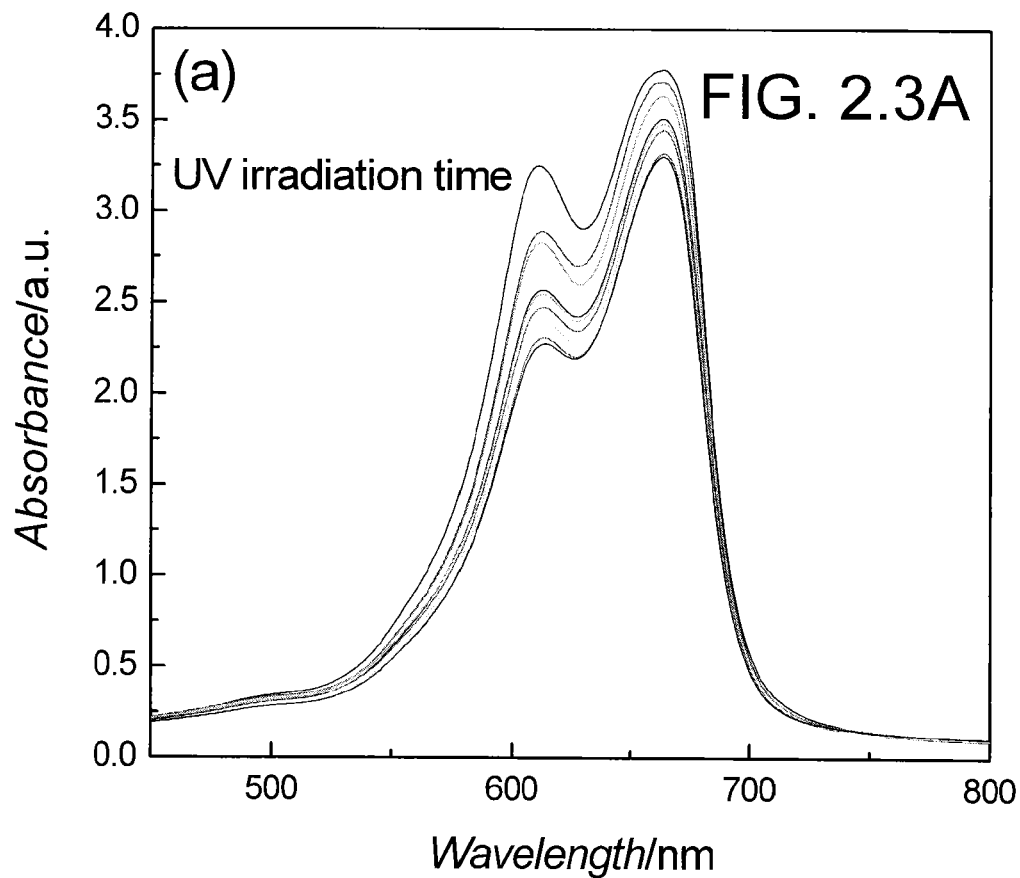
FIG. 2.3A

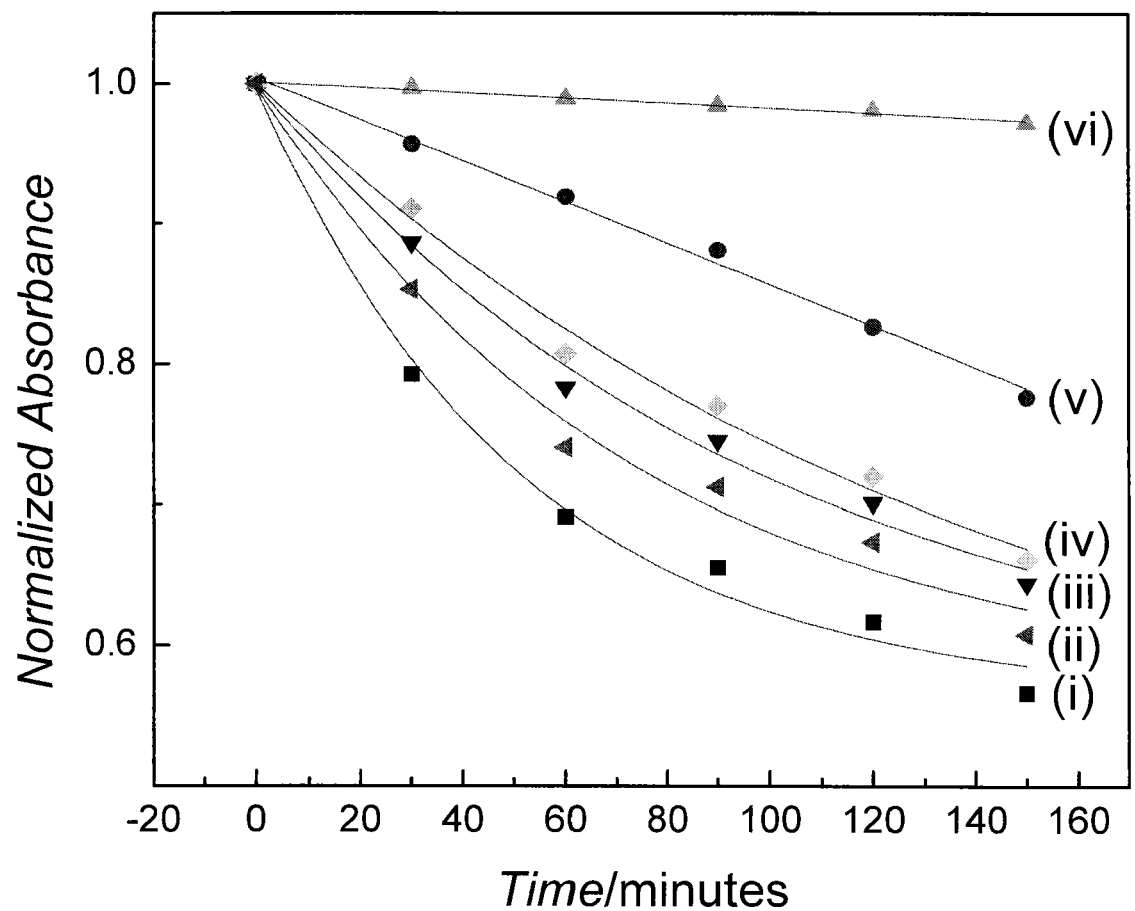
FIG. 2.3B

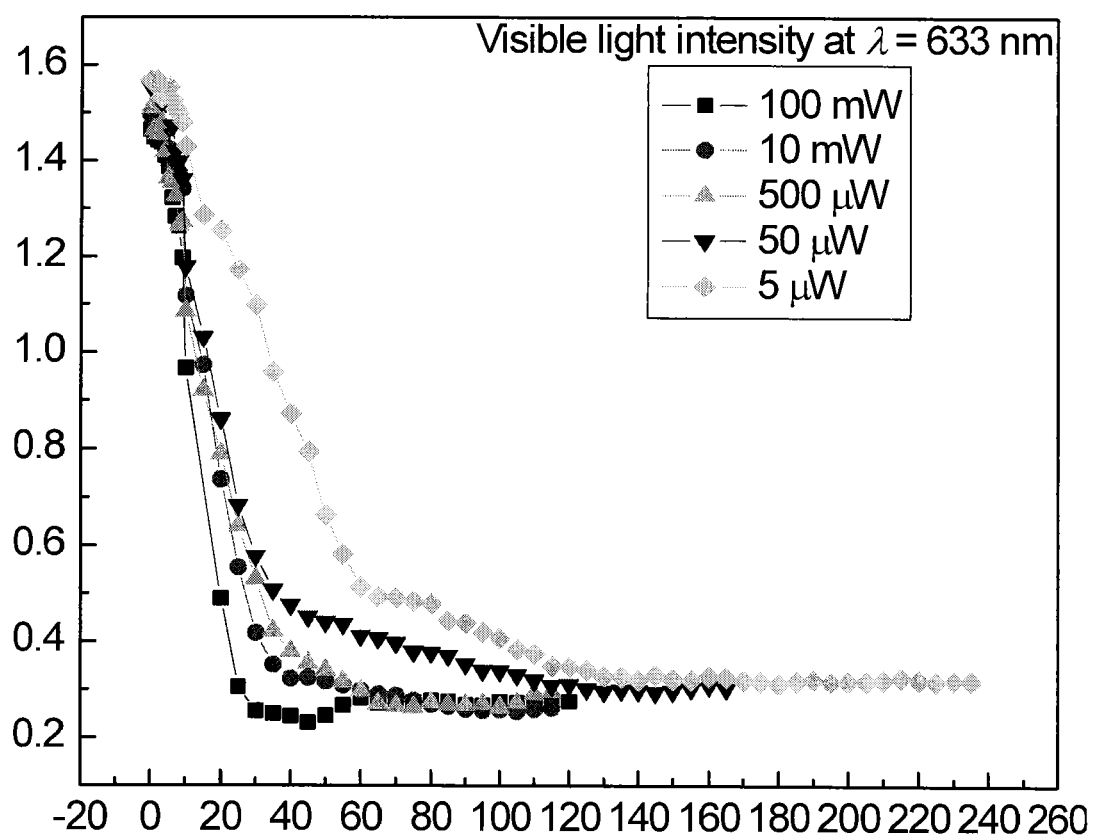
FIG. 3.1

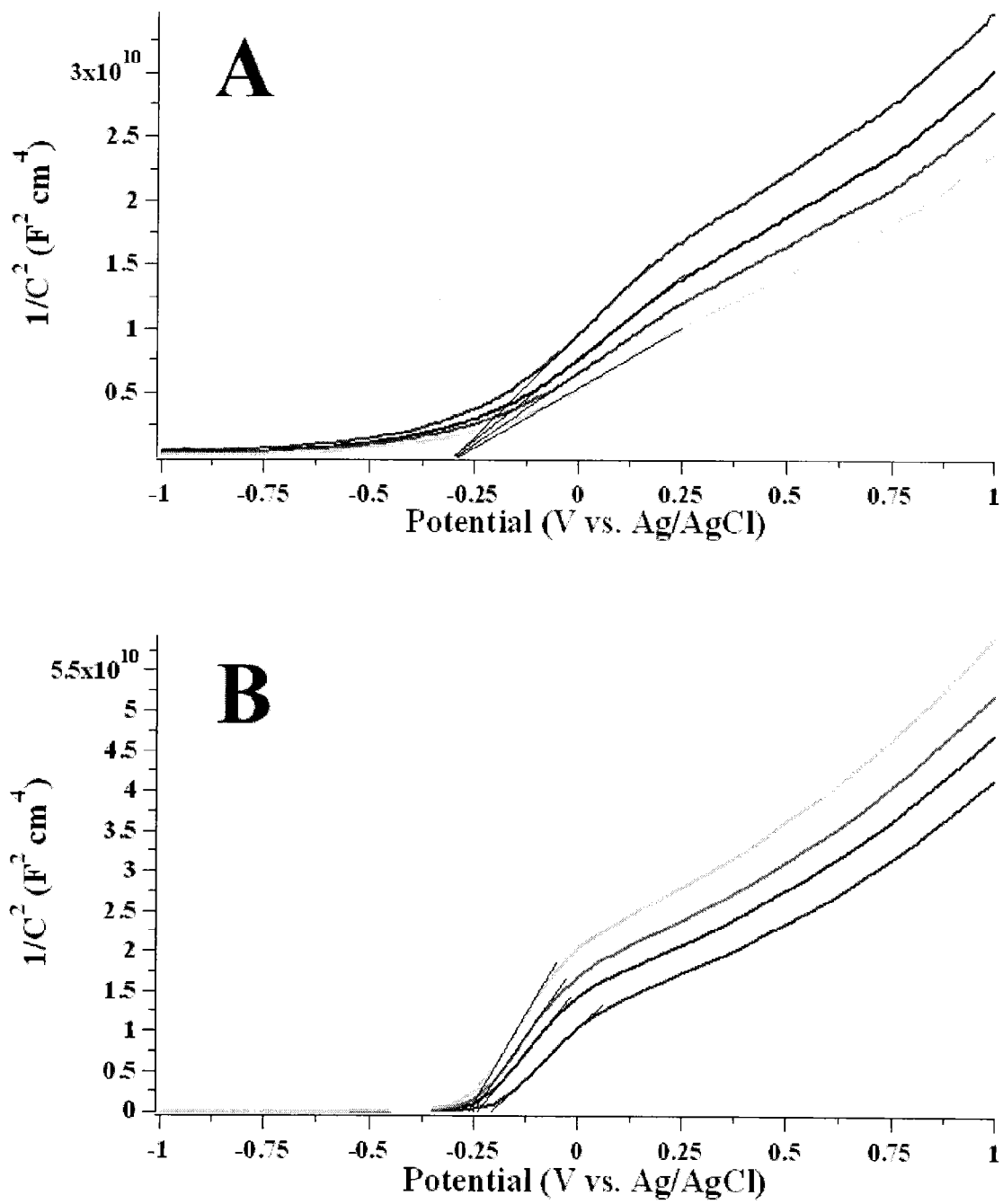
FIG. 3.2

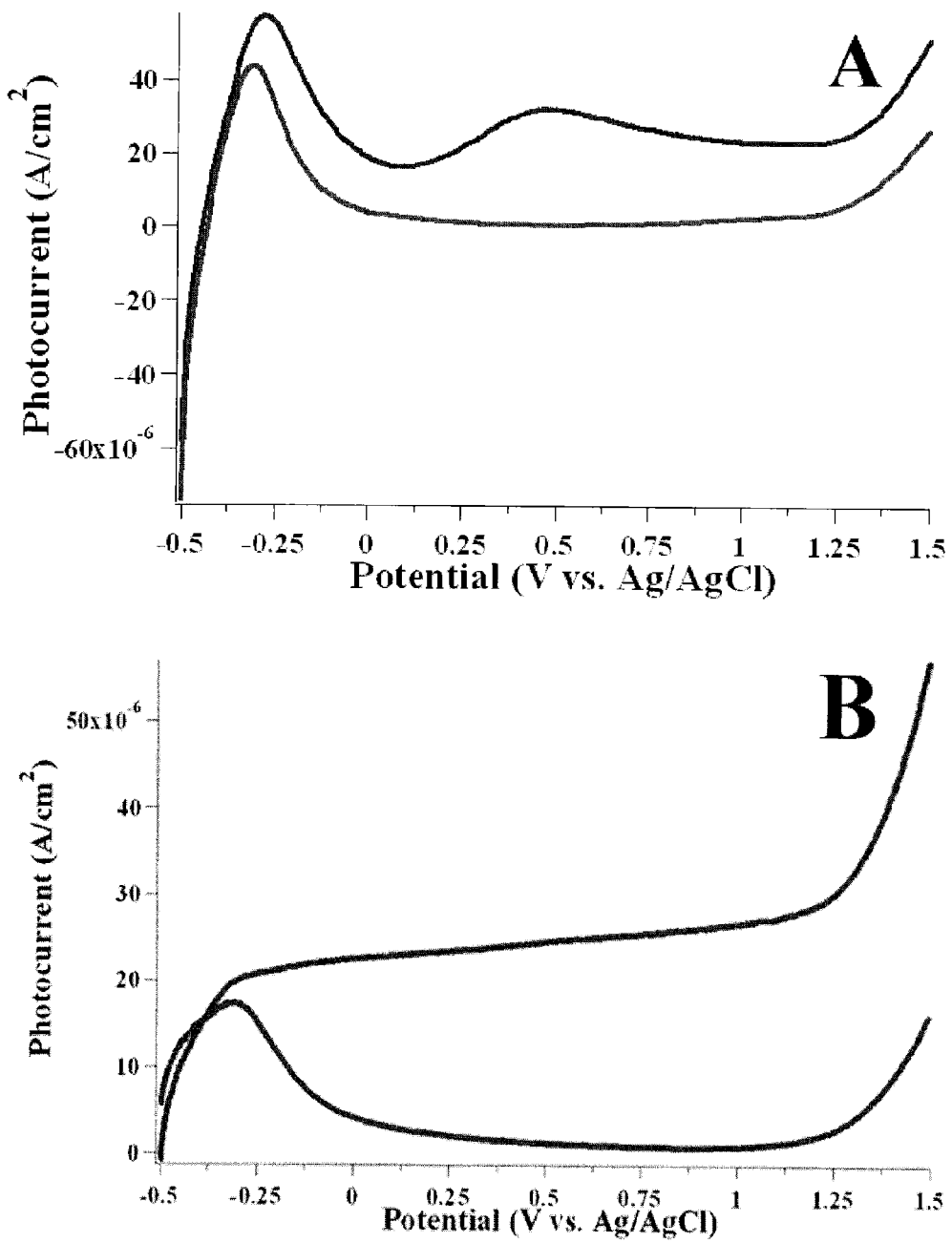
FIG. 3.3

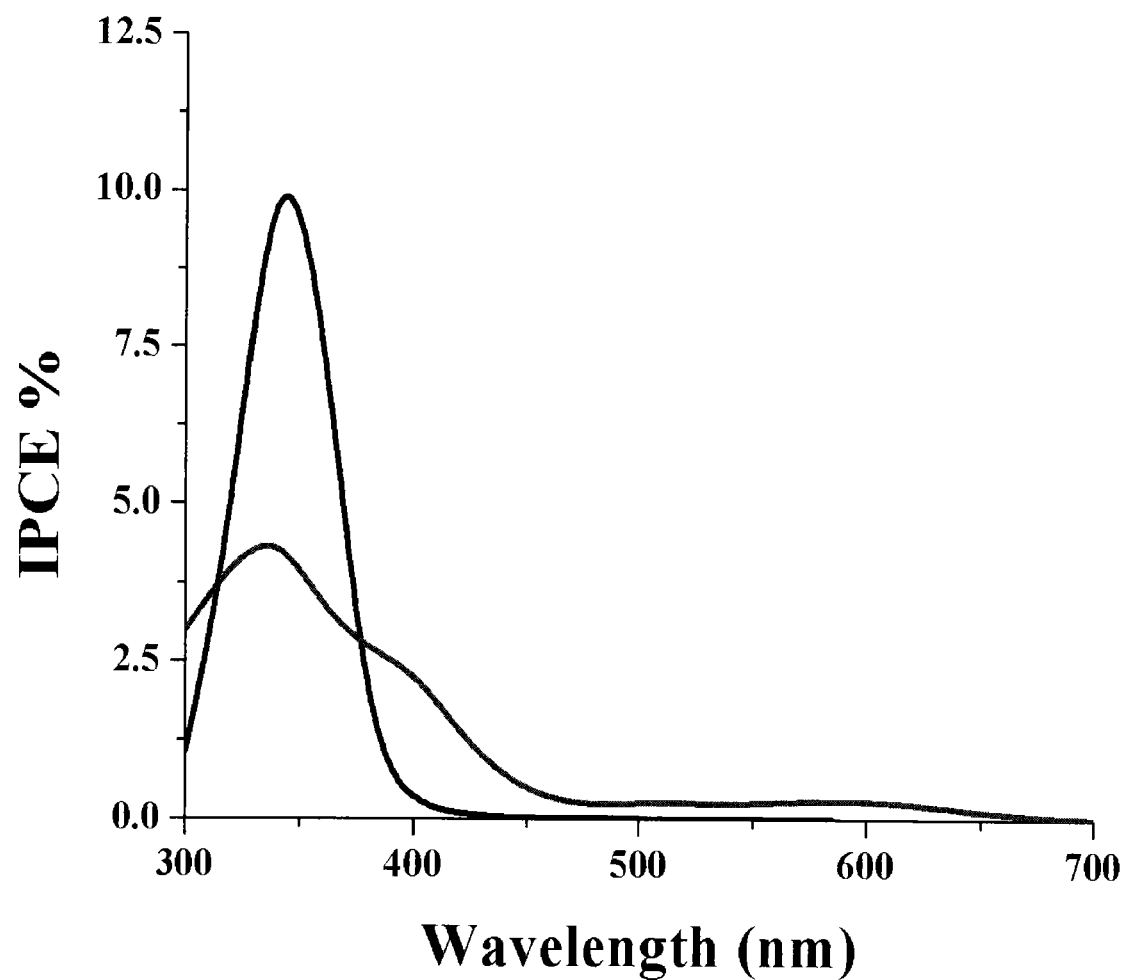
FIG. 3.4

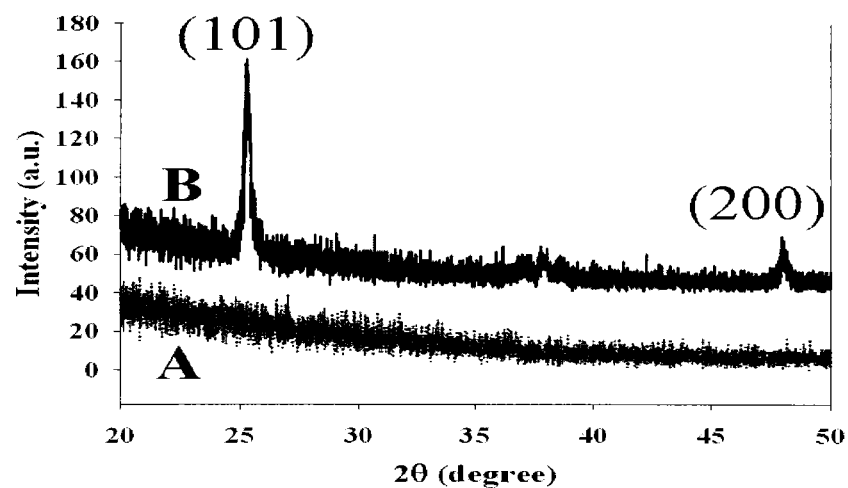
FIG. 4.1
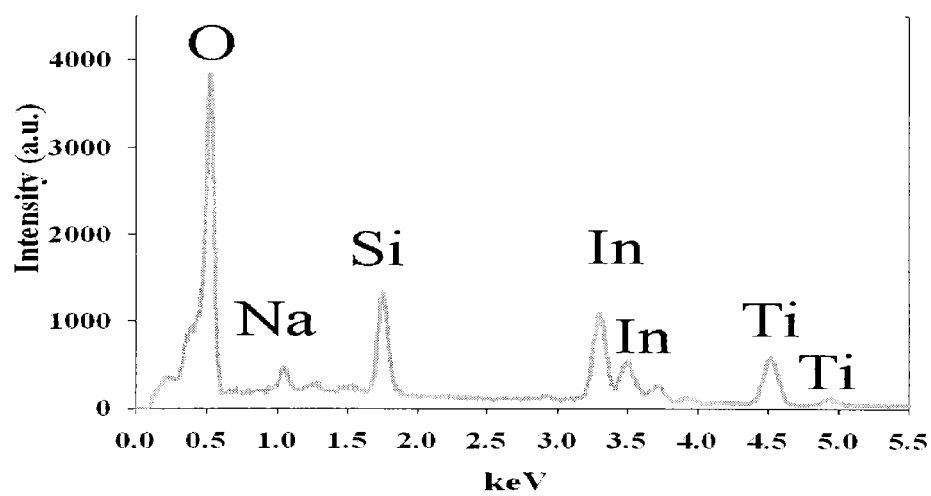
FIG. 4.2

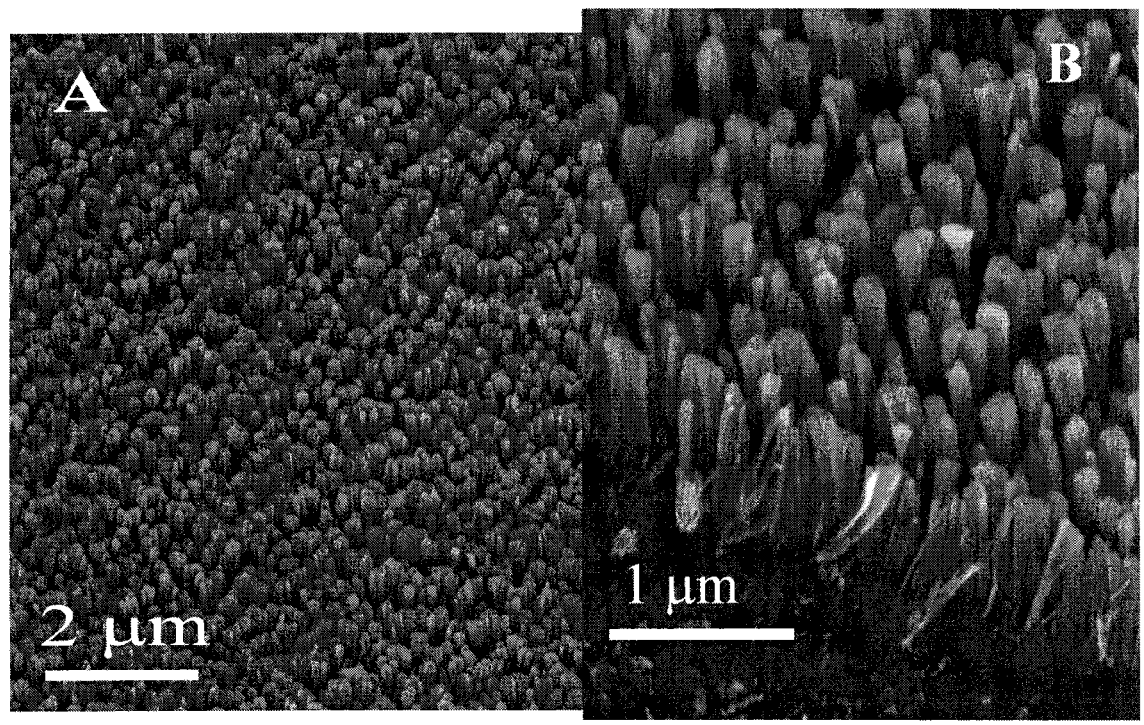
FIG. 4.3
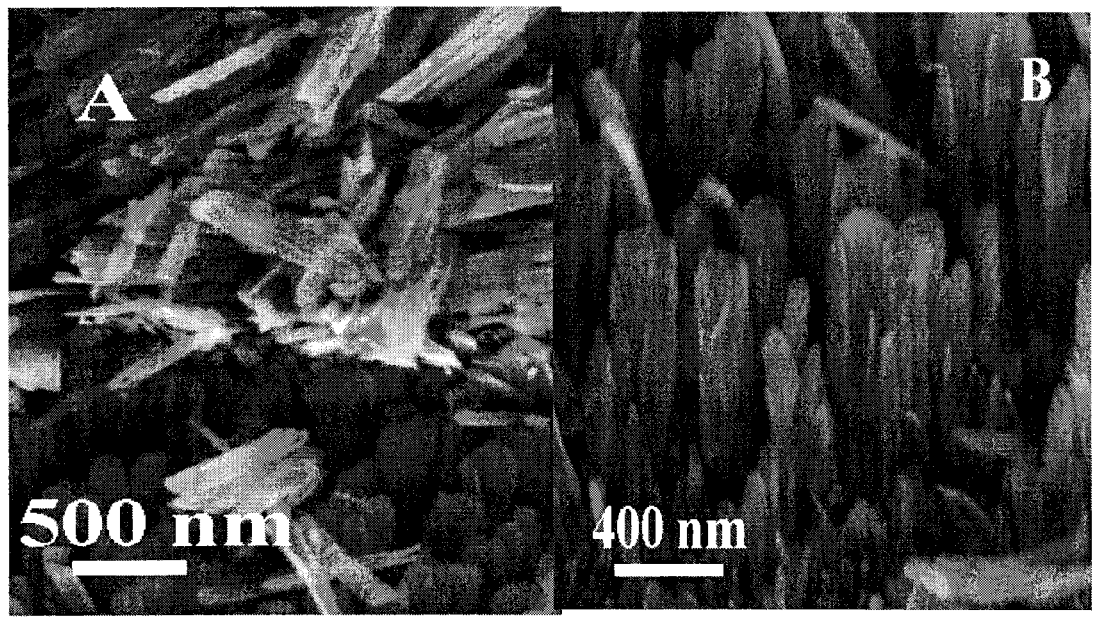
FIG. 4.4

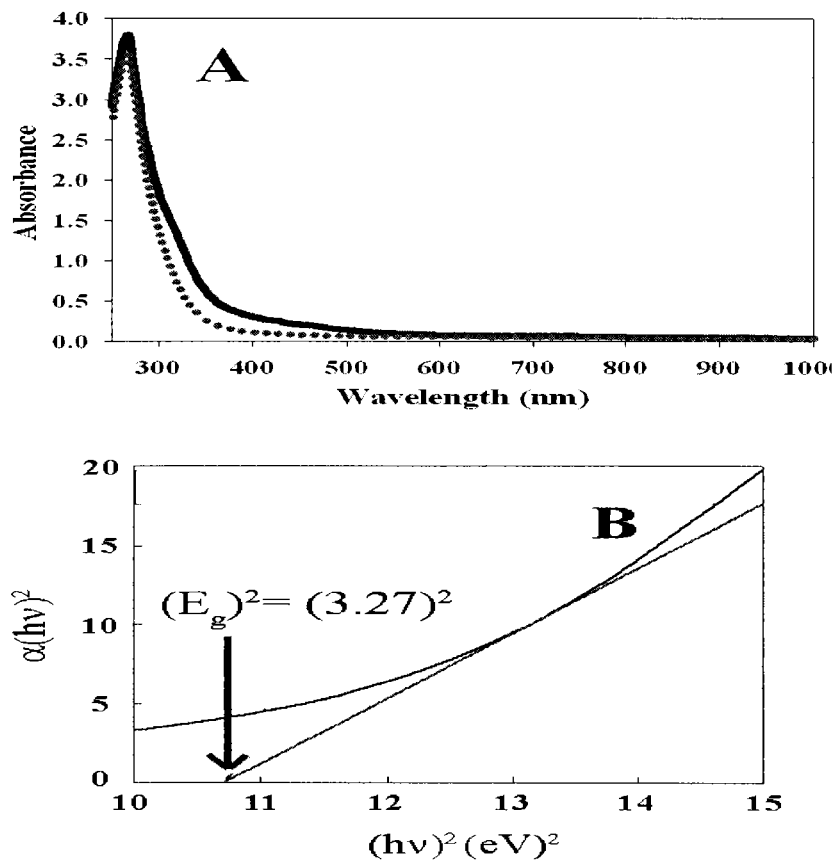
FIG. 4.5
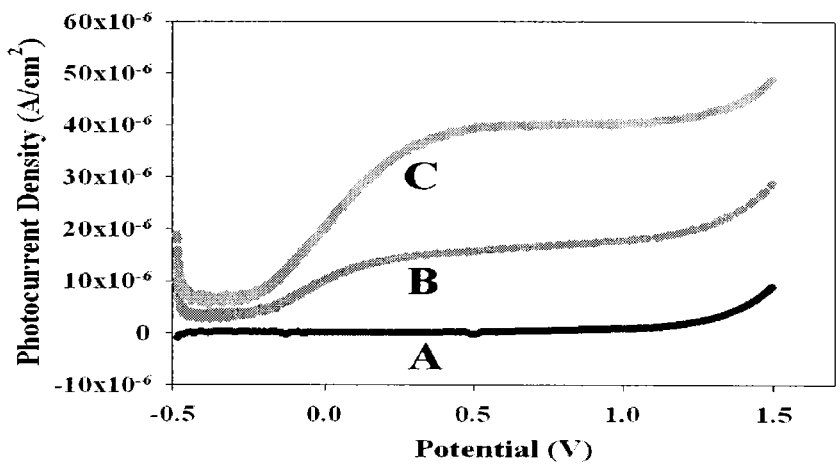
FIG. 4.6

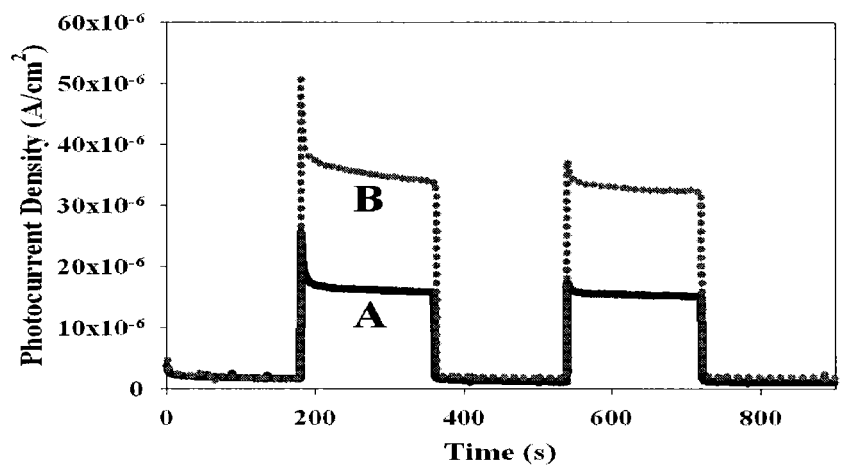
FIG. 4.7
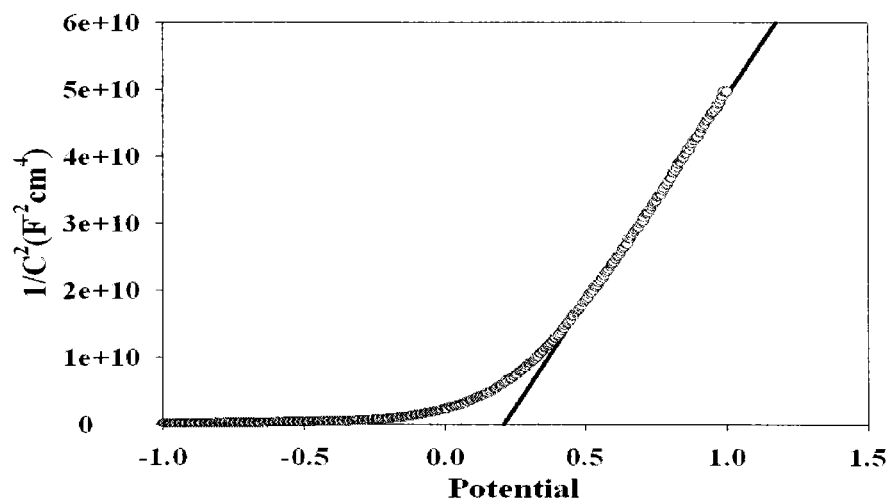
FIG. 4.8

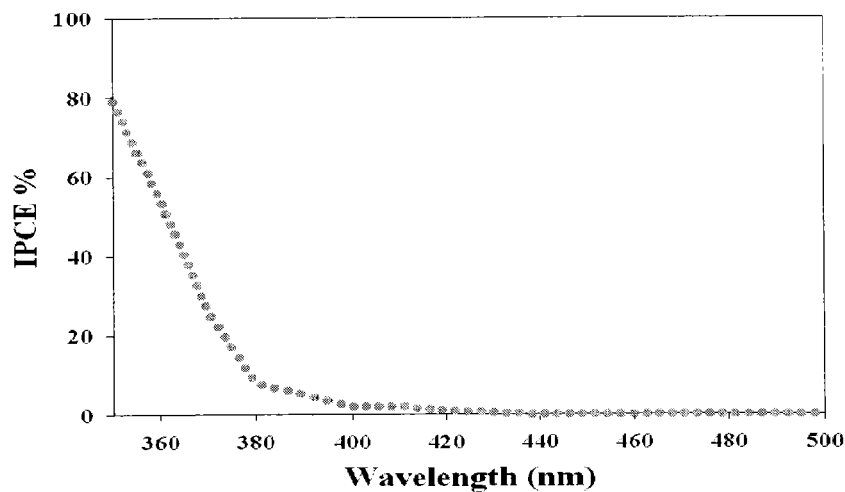
FIG. 4.9
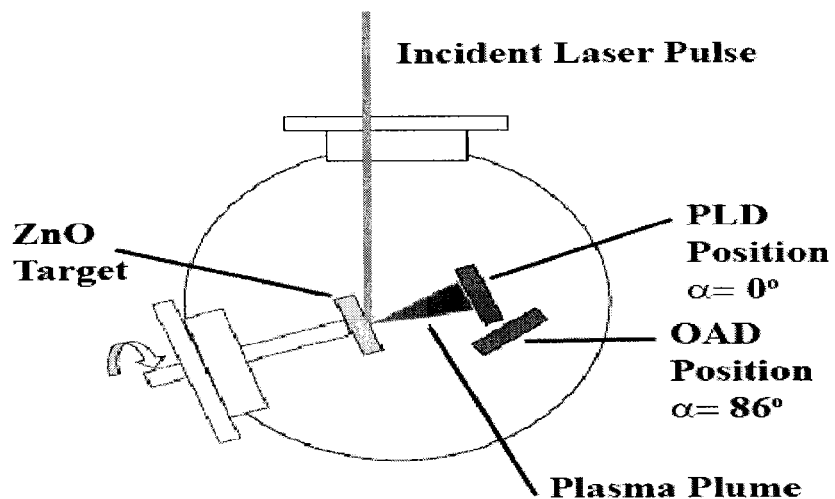
FIG. 5.1

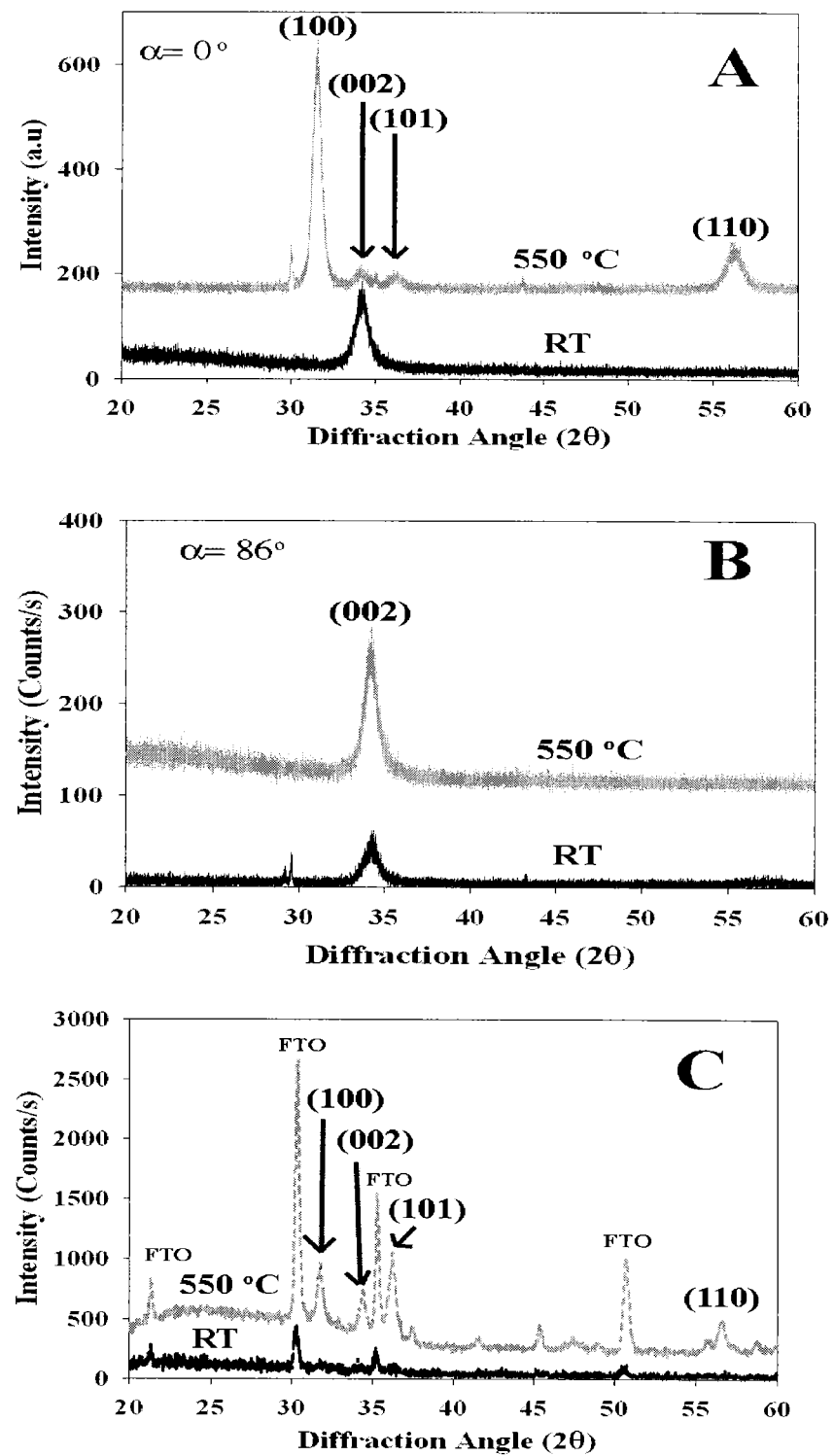
FIG. 5.2

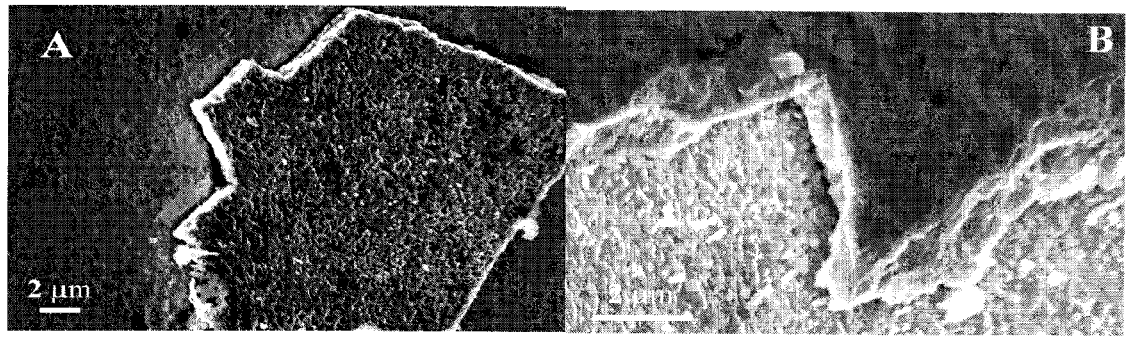
FIG. 5.3
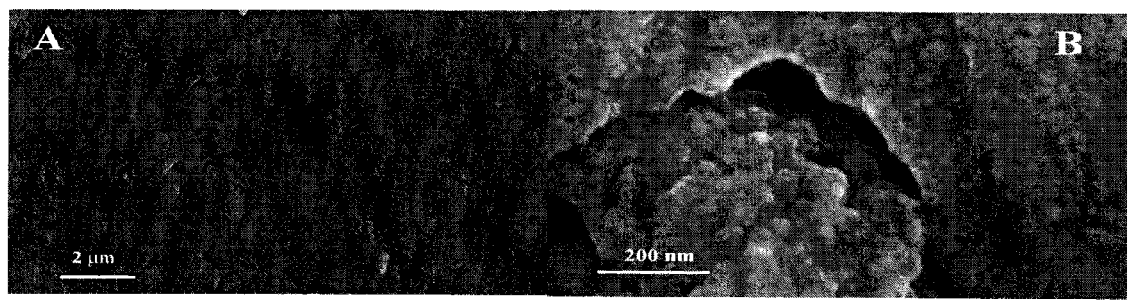
FIG. 5.4
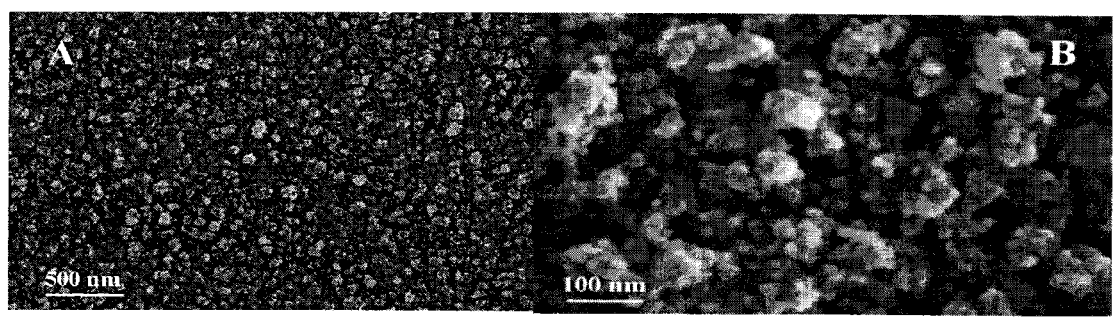
FIG. 5.5

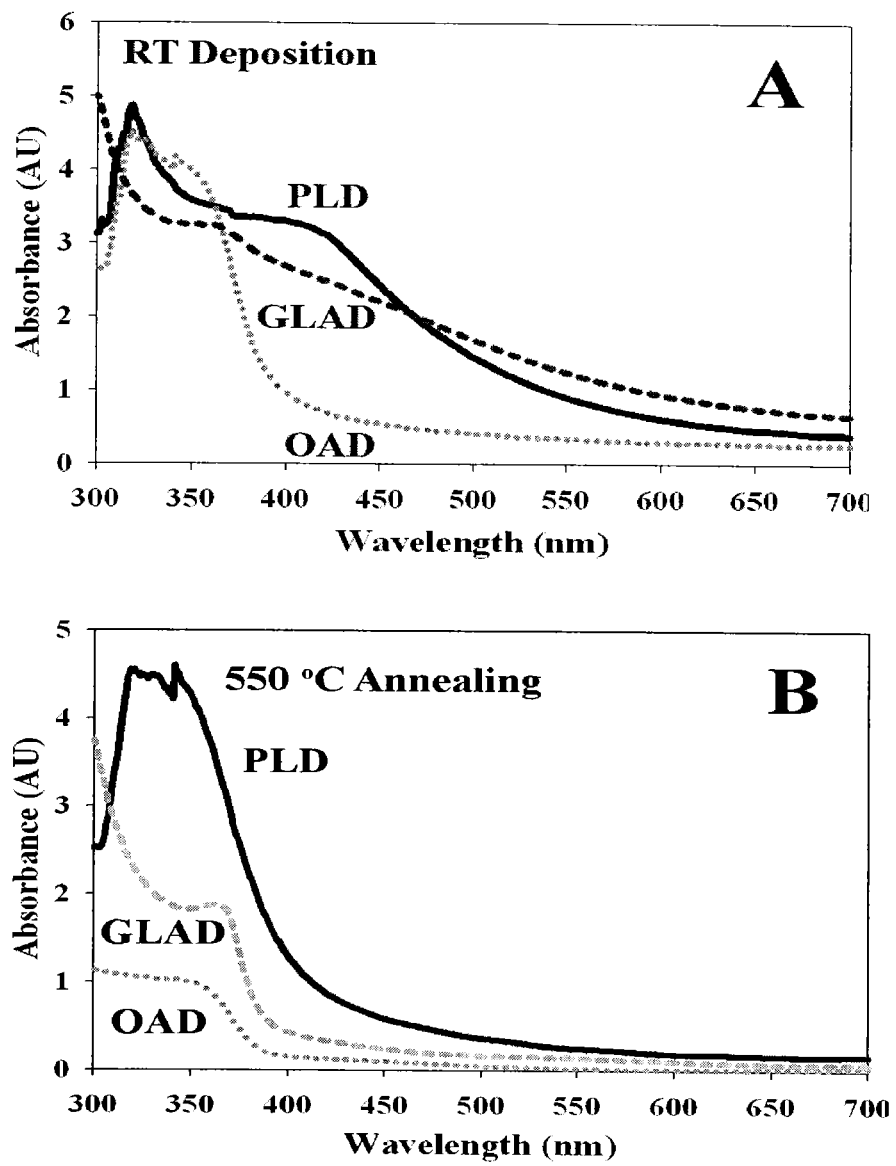
FIG. 5.6

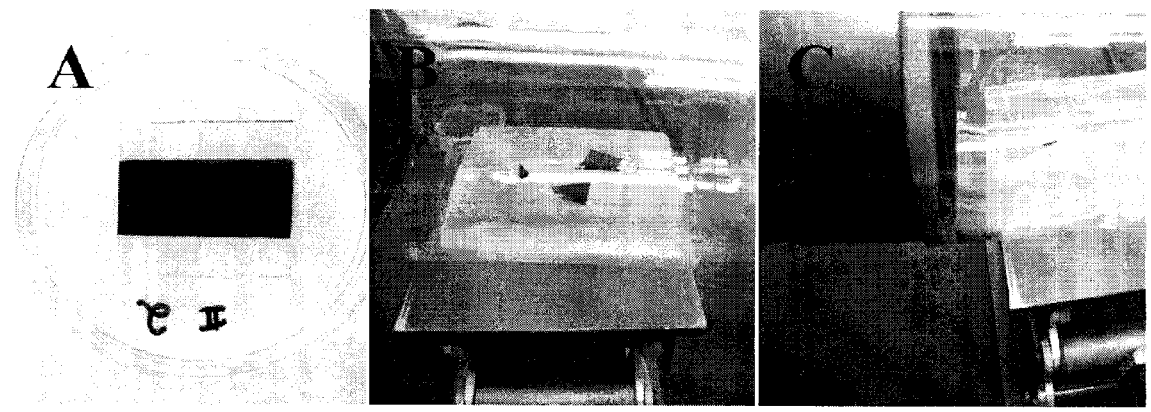
FIG. 5.7
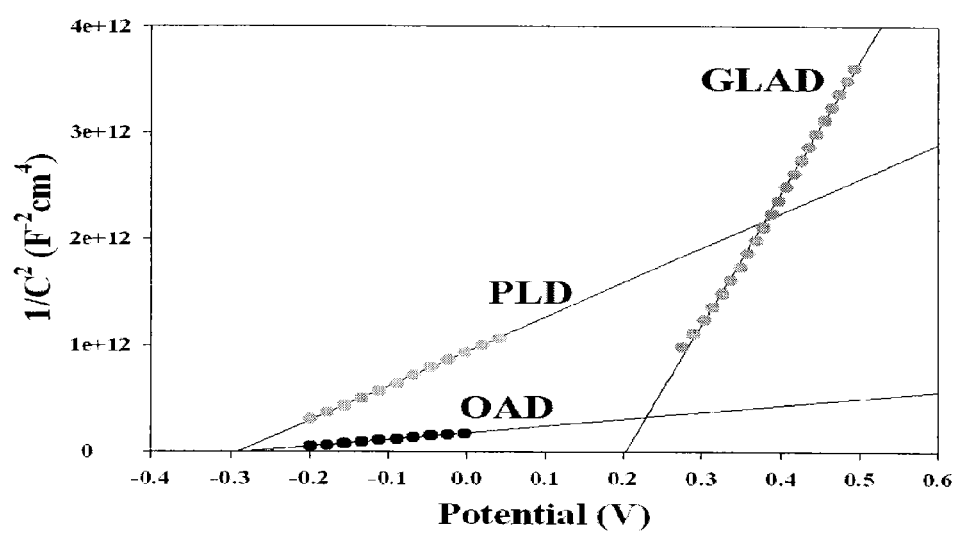
FIG. 5.8

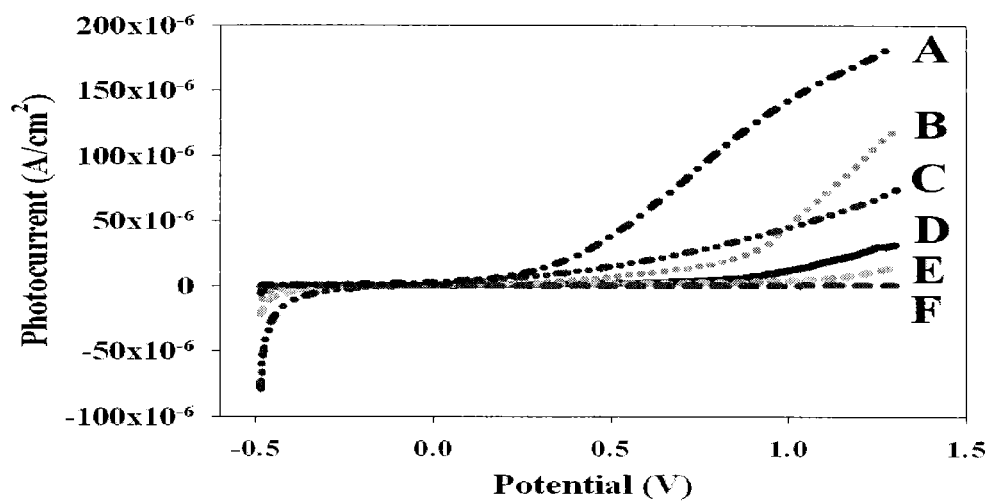
FIG. 5.9
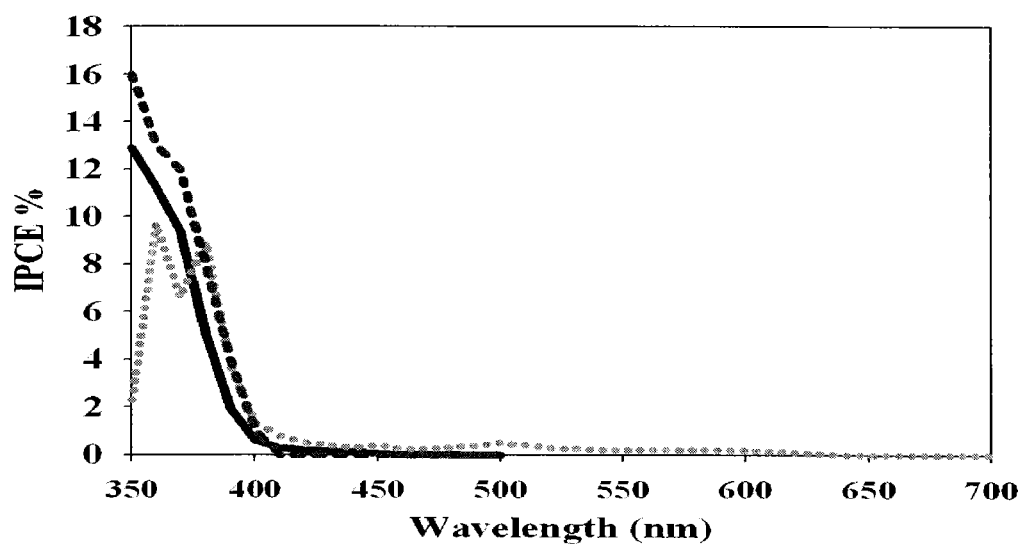
FIG. 5.10

PHOTOCATALYTIC STRUCTURES, METHODS OF MAKING PHOTOCATALYTIC STRUCTURES, AND METHODS OF PHOTOCATALYSIS

CROSS REFERENCE TO RELATED APPLICATION

This application claims priority to PHOTOCATALYTIC STRUCTURES, METHODS OF MAKING PHOTOCATALYTIC STRUCTURES, AND METHODS OF PHOTOCATALYSIS," having serial number PCT/US2009/063825, filed on Nov. 10, 2009. This application also claims priority to and benefit of U.S. Provisional Application No. 61/112,918, filed on Nov. 10, 2008, and U.S. Provisional Application No. 61/144,795, filed on Jan. 15, 2009, both of which are incorporated by reference in their entirety.

STATEMENT REGARDING FEDERALLY SPONSORED RESEARCH OR DEVELOPMENT

This invention was made with government support by a DOE Hydrogen Initiative Award (DE-FG02-05ER46232). The U.S. government has certain rights in the invention.

BACKGROUND $TiO_2$ is an efficient photocatalyst at ultraviolet and near visible light wavelengths for use in hydrogen production, self-cleaning, and decomposing volatile organic compounds. However, $TiO_2$ by itself can only reach a certain level of photocatalytic efficiency due to the quick recombination of the photo-generated electron-hole pairs. To further improve the photocatalytic performance, combining $TiO_2$ with another semiconductor with a similar position in their conduction bands or metal nanoparticles, can produce a so-called charge separation effect to extend the lifetime of the electron-hole pairs. Typically metals such as Ag, Au, and Pt have been used to scavenge photo-generated electrons and have shown significant charge-separation enhancement. However, the most common method to prepare these structures is to coat the $TiO_2$ layer with a metal on top. The metal nanoparticles cover the surface of the $TiO_2$, and thus reduce the surface area between $TiO_2$ and the liquid, which then reduces the area of the catalytically active sites. When combining $TiO_2$ with a semiconductor, the second material can be placed under the $TiO_2$, and thus can have the benefit of allowing all of the $TiO_2$ to be in contact with the liquid while its photocatalytic properties are being enhanced by the other semiconductor.

SUMMARY

Embodiments of the present disclosure include $WO_3/TiO_2$ two-layer and core-shell nanorod arrays imparted with specific morphologies to enhance their catalytic activity and methods of making $WO_3/TiO_2$ two-layer and core-shell nanorod arrays. In particular, embodiments of structures, methods of making structures, photocatalytic structures, methods of making a photocatalytic structures, photoelectrochemical structures, methods of making photoelectrochemical structures, methods of splitting $H_2O$ to generate $H_2$, and the like, are disclosed.

Briefly described, embodiments of the present disclosure include a photocatalytic structure that includes: a substrate; a first layer comprising an aligned array of $WO_3$ nanorods deposited on the substrate; and a second layer deposited on each of the nanorods of the array of the first layer, the second layer comprising $TiO_2$.

Briefly described, embodiments of the present disclosure include a photocatalytic structure that includes: a substrate; a first layer comprising an aligned array of $WO_3$ nanorods deposited on the substrate, wherein the nanorod is made of a material selected from: $WO_3$ and $TiO_2$; and a second layer deposited on each of the nanorods of the array of the first layer, the second layer is made of a material selected from: $WO_3$ and $TiO_2$, wherein the first layer and the second layer form a core-shell nanorod array, wherein each core-shell nanorod includes a first layer core and a second layer shell disposed around the first layer core.

Briefly described, embodiments of the present disclosure include a method of making a photocatalytic structure that includes: providing a substrate; depositing a first layer on the substrate, wherein the first layer comprises an aligned nanorod array, wherein the nanorods of the first layer are made of a material selected from the group consisting of: $WO_3$ and $TiO_2$; and depositing a second layer on each of the nanorods of the array of the first layer, wherein the nanorods of the first layer are made of a material selected from the group consisting of: $WO_3$ and $TiO_2$.

Briefly described, embodiments of the present disclosure include a structure that includes: a substrate having $TiO_2$ nanorods disposed on the substrate, wherein the $TiO_2$ nanorods have a length of about 800 to 1100 nm and a width of about 45 to 400 nm, wherein the density of the nanorods is about 2 to $65 \times 10^6$ mm$^{-2}$, and wherein the nanorods are tilted from the substrate at an angle of about 40° to 65° from substrate normal.

Briefly described, embodiments of the present disclosure include a method of splitting $H_2O$ to generate $H_2$ that includes: providing a photoelectrochemical structure including an indium tin oxide substrate having $TiO_2$ nanorods disposed on the substrate, wherein the $TiO_2$ nanorods have a length of about 800 to 1100 nm and a width of about 45 to 400 nm, wherein the density of the nanorods is about 2 to $65 \times 10^6$ mm$^{-2}$, and wherein the nanorods are tilted from the substrate at an angle of about 40° to 65° from substrate normal; introducing an aqueous solution to the photoelectrochemical structure so that the aqueous solution contacts the $TiO_2$ nanorods; and exposing the photoelectrochemical structure to a light source, wherein the aqueous solution and the photoelectrochemical structure interact to produce $H_2$ from the aqueous solution.

Briefly described, embodiments of the present disclosure include a method of making a structure that includes: depositing $TiO_2$ on a substrate at a rate of about 0.2-0.6 nm/s with the substrate positioned at about 50°-89° from the incident evaporation direction with an azimuthal rotation speed of about 0.4-0.6 rev/s, the temperature is about 25° C.; forming $TiO_2$ nanorods; and annealing the $TiO_2$ nanorods at about 200 to 600° C.

Briefly described, embodiments of the present disclosure include a structure that includes: a nanostructured ZnO thin film disposed on a substrate, wherein the nanostructured ZnO thin film has a surface feature selected from the group consisting of: a thin film with grain size features of about 150 to 250 nm; a thin film with a fishscale morphology, where each fishscale feature is about a 900 nm by 450 nm; and a nanoporous, interconnected network of spherical nanoparticles, where each nanoparticle is about 15 to 40 nm in diameter.

Briefly described, embodiments of the present disclosure include a method of making a structure that includes: depositing ZnO on a substrate at a rate of about 0.1 to 0.6 nm/s with the substrate positioned at about 50 to 89° from the incident evaporation direction with an azimuthal rotation speed of about 0.4 to 0.6 rev/s, the temperature is about 25° C.; forming ZnO nanorods; and annealing the ZnO nanorods at about 100 to 650° C.

Briefly described, embodiments of the present disclosure include a method of splitting $H_2O$ to generate $H_2$ that includes: a nanostructured ZnO thin film disposed on a substrate, wherein the nanostructured ZnO thin film has a surface feature selected from the group consisting of: a thin film with grain size features of about 150 to 250 nm; a thin film with a fishscale morphology, where each fishscale feature is about a 900 nm by 450 nm; and a nanoporous, interconnected network of spherical nanoparticles, where each nanoparticle is about 15 to 40 nm in diameter; introducing an aqueous solution to the photoelectrochemical structure so that the aqueous solution contacts the ZnO thin film; and exposing the photoelectrochemical structure to a light source, wherein the aqueous solution and the photoelectrochemical structure interact to produce $H_2$ from the aqueous solution.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1.1A and 1.1B illustrate the growth geometry sketches for (FIG. 1.1A) OAD and (FIG. 1.1B) GLAD; due to different azimuthal rotation of the substrate, the GLAD nanorod arrays have enhanced $TiO_2/WO_3$ interfacial area.

FIG. 1.2A illustrates a cross-sectional SEM view of the as-deposited two-layer $TiO_2/WO_3$ thin film. FIG. 1.2B illustrates a cross-sectional SEM view of the as-deposited $TiO_2/WO_3$ OAD nanorod array, and their EDX mapping; FIG. 1.2C Titanium, and FIG. 1.2D Silicon (W). FIG. 1.2E illustrates the relative EDX intensity profiles of Titanium and Silicon plotted against nanorod length. FIG. 1.2F illustrates a cross-sectional SEM view of the as-deposited $TiO_2/WO_3$ GLAD nanorod array.

FIGS. 1.3A through 1.3C are graphs that illustrate the XRD spectra of the as-deposited and annealed two-layer $TiO_2/WO_3$ samples: (FIG. 1.3A) thin film, (FIG. 1.3B) OAD nanorods, and (FIG. 1.3C) GLAD nanorods.

FIGS. 1.4A through 1.4C are graphs that illustrate the Raman spectra of the as-deposited and annealed two-layer $TiO_2/WO_3$ samples: (FIG. 1.4A) thin film, (FIG. 1.4B) OAD nanorods, and (FIG. 1.4C) GLAD nanorods.

FIGS. 1.5A through 1.5C are graphs that illustrate absorption spectra for samples annealed at different temperatures for two-layer $TiO_2/WO_3$ samples: (FIG. 1.5A) thin film, (FIG. 1.5B) OAD nanorods, and (FIG. 1.5C) GLAD nanorods.

FIGS. 1.6A through 1.6C are graphs that illustrate absorption spectra of MB solution after sample irradiation for 30-minute intervals for two-layer samples: (FIG. 1.6A) thin film, (FIG. 1.6B) OAD nanorods, and (FIG. 1.6C) GLAD nanorods annealed at 300° C.

FIGS. 1.7A through 1.7C are graphs that illustrate the normalized MB absorbance intensities of the $\lambda$=664 nm peak versus time. FIG. 1.7A is a graph that illustrates the as-deposited $TiO_2/WO_3$ samples. FIG. 1.7B is a graph that illustrates the $TiO_2/WO_3$ samples annealed at 300° C. for 2 hours in air. FIG. 1.7C is a graph that illustrates the $TiO_2/WO_3$ samples annealed at 400° C. for 2 hours in air. All of the curves in FIGS. 1.7A-1.7C correspond to the first-order exponential decay fittings, which were used to find the decay rate, κ.

FIG. 2.1A illustrates a sketch that shows how the core-shell nanorod array was deposited using an electron-beam evaporation system. FIG. 2.1B illustrates a cross-section SEM image of the $WO_3$ "core" nanorod array. FIG. 2.1C illustrates a cross-sectional SEM image of core-shell nanorod array, revealing a vertical array of uniform nanorods after "shell" deposition. FIGS. 2.1D and 2.1E illustrate EDX mappings of Ti (FIG. 2.1D) and W (FIG. 2.1E) versus nanorod length. FIG. 2.1F illustrates a TEM image of a single $WO_3$-core/$TiO_2$-shell nanorod.

FIG. 2.2 is a graph that illustrates XRD patterns of the core-shell nanorod array: the as-deposited sample and the samples annealed at $T_a$=300° C. and $T_a$=400° C., respectively.

FIG. 2.3A is a graph that illustrates absorbance spectra for MB solution over time after UV-irradiation of core-shell nanorod array annealed at $T_a$=300° C. The UV irradiation time interval of each spectrum is 30 minutes. The arrow points to the time increasing direction. FIG. 2.3B is a graph that illustrates the plot of the absorbance of MB at the $\lambda$=664 nm peak versus UV irradiation time for the (i) core-shell sample annealed at $T_a$=300° C., (ii) 1.5 μm long $TiO_2$ nanorod array annealed at $T_a$=500° C., (iii) core-shell sample annealed at $T_a$=400° C., (iv) c-$TiO_2$/a-$WO_3$ two layer thin film (each layer 500 nm thick), (v) anatase $TiO_2$ thin film (500 nm thick), and (vi) amorphous $TiO_2$ thin film (500 nm thick).

FIG. 3.1 is a plot of the decay of the MB solution as a function of time for several light intensities of visible light. The light intensity was measured using a power meter at wavelength $\lambda$=633 nm, and the intensity was varied systematically from 5 μW to 100 mW. From the figure one can see that as the light intensity increases, the time for full degradation decreases.

FIGS. 3.2A and 3.2B are Mott-Schottky Plot at 3 KHz (bottom line in A and top line in B), 5 KHz (second to bottom line in A and second to top in B), 7 KHz (second to top line in A and second to bottom in B) and 10 KHz (top line in A and bottom line in B). The $V_{FB}$ is approximately −0.3 V versus a Ag/AgCl reference electrode.

FIGS. 3.3A and 3.3B are linear sweep voltammagrams of $TiO_2/WO_3$ core-shell nanorods in 0.5 M $NaClO_4$ buffered to pH=7.0. A dark background scan (bottom line in A and B) and a 100 mW/cm² scan (top line in A and B) reveal a sublinear increase in photocurrent. Photocurrent generation is originally seen at ca. 0.0 V versus the Ag/AgCl reference electrode.

FIG. 3.4 is a IPCE action spectra of $TiO_2/WO_3$ and $WO_3/TiO_2$ core-shell nanorods show particularly different photoresponse based on the core material. The $TiO_2/WO_3$ nanorods show a photoresponse in the UV region starting after 400 nm, and represents photocurrent generation based on the intrinsic bandgap of $TiO_2$. The $WO_3/TiO_2$ nanorods show a drastically different action spectra with photoresponse out to ca. 600 nm. The intrinsic bandgap of $WO_3$ is 2.7 eV or 550 nm, and suggests the photocurrent generation is based on the absorption of photons in the core of the $WO_3/TiO_2$ nanorod.

FIG. 4.1 illustrates XRD spectra of unannealed $TiO_2$ nanorods on Si wafers show no discernible diffraction peaks and are therefore assumed to be amorphous. FIG. 4.1 illustrates XED spectra after annealing in open air conditions at 550° C. the emergence of diffraction peaks representing the (101) and (002) crystal facets of anatase $TiO_2$ arise.

FIG. 4.2 illustrates EDS spectra of annealed $TiO_2$ nanorod arrays on ITO substrates show the compositional peaks from O, Na, Si, and In due to the soda lime glass with conductive coating. Ti peaks are then attributed in conjunction with O for the deposited $TiO_2$ nanorod arrays. Relative counts for Ti are low due to the average thinness of the film at 1.0 μm, and overall thickness of the ITO substrate (0.7 mm).

FIG. 4.3A illustrates an SEM image at a substrate tilt of 0° revealing the canted angle of the $TiO_2$ nanorod arrays and the general density of $25*10^6$ nanorods/mm². FIG. 4.3B illustrates an SEM image taken at a sample tilt of 35° reveals the morphology of the nanorods from contact at the ITO substrate to the tip. Slight increases in overall nanorod diameter are seen to increase from bottom to top, and range in width from 45-400 nm.

FIG. 4.4A illustrates HRSEM images of dislodged $TiO_2$ nanorods lying parallel to the ITO conducting substrate allowed for effective measurement of the $TiO_2$ nanorods. The $TiO_2$ nanorods were measured to be 800-1100 nm in length and 45-400 nm in width. FIG. 4.4B illustrates further magnification of the $TiO_2$ nanorods by HRSEM showed a feathered appearance to the surface. Overall the surface appears to be non-uniform with multiple steps and flanges protruding from individual $TiO_2$ nanorods.

FIG. 4.5A illustrates UV-visible absorption spectra of unannealed (dots) and annealed (solid line) $TiO_2$ nanorod arrays on ITO show a drastic increase in absorption in the UV region after 400 nm. Increase in the absorption of annealed samples is attributed to the higher crystallinity and incorporation of oxygen vacancies. FIG. 4.5B illustrates a plot of $\alpha(h\nu)^2$ versus $(eV)^2$ for the anatase $TiO_2$ nanorods showed an effective bandgap of 3.27 eV, very close to the bulk bandgap of 3.2 eV.

FIG. 4.6 illustrates linear sweep voltammagrams taken at a 10 mV/s scan rate in a 0.5 M $NaClO_4$ electrolyte solution with a Ag/AgCl reference electrode, a Pt coiled counter electrode, and a $TiO_2$ nanorod array working electrode. Curve A illustrates a linear sweep voltammagram in complete darkness showing little background dark current in the scan region of −0.5 V to 1.5 V. Curve B illustrates a linear sweep voltammagram at an illumination at AM 1.5 (100 mW/cm²) reveals a photoresponse as early as −0.2 V and a photocurrent by ~0.5 V at 15 μA/cm². There is a continued increase in $I_{PH}$ to 18 μA/cm² by 1.0 V. Curve C illustrates an increase of the illumination to 230 mW/cm² (2.3×AM 1.5) shows an above linear increase of $I_{PH}$ to $J_{LIGHT}$ relationship with a saturation photocurrent at 0.5 V with 40 μA/cm².

FIG. 4.7 illustrates amperometric I-t curves of the $TiO_2$ nanorod arrays at an applied external potential of 1.0 V in a 0.5 M $NaClO_4$ electrolyte with 180 second on/off cycles. Curve A illustrates I-t curve photoresponse data at AM 1.5 illumination with an immediate photoresponse spike, and then an $I_{PH}$ decay profile to 15 μA/cm². Curve B illustrates a I-t curve data with an increased linear $I_{PH}$ to $J_{LIGHT}$ relationship at a substrate irradiance of 230 mW/cm² with a large photoresponse spike and a decay profile to a steady state $I_{PH}$ of 35 μA/cm².

FIG. 4.8 illustrates a Mott-Schottky plot of $1/C^2$ versus applied potential (V) in complete darkness at a frequency of 10000 Hz and an AC current of 7 mV. From the extrapolated linear portion of the Mott-Schottky plot the $V_{FB}$ was determined to be 0.20 V (versus Ag/AgCl) at a pH=7.0. From the Mott-Schottky plot further information was attained with a calculated donor density of $4.5\times10^{17}/cm^3$ and a space charge layer thickness of 99 nm.

FIG. 4.9 illustrates IPCE action spectra of the $TiO_2$ nanorod arrays in the region from 350-500 nm reveals a drastic increase in photogenerated electron collection at the back-contact due to illumination above the bandgap. Prior to 400 nm there is little photoresponse, and this changes drastically with an IPCE % of 79% at 350 nm and 54% at 360 nm. This drops immediately to an IPCE % of only 2% at 400 nm, due to the below bandgap photon energy.

FIG. 5.1 is a general illustration depicts the process by which pulsed laser deposition (PLD), oblique angle deposition (OAD) and glancing angle deposition (GLAD) is performed. An incident pulsed laser (Nd:YAG) ablates a target material, which in turn creates an adatom plume which deposits onto a substrate at a normal angle ($\alpha=0°$) for PLD. During OAD the substrate is turned to $\alpha=86°$ which allows for a shadowing effect to occur. GLAD samples used an electron beam as the ablation tool, and also had $\alpha=86°$, but also had the substrate rotating at 0.5 revolutions/minute.

FIGS. 5.2A to 5.3C illustrate XRD patterns of the as deposited ZnO films at room temperature (RT) and after annealing at 550° C. in open air conditions. FIG. 5.2A illustrates a PLD thin films showed only a single diffraction peak representative of the (002) after deposition, but after annealing with increased crystallinity the (100), (002), (101) and (110) diffraction peaks arose of the zincite crystal phase. FIG. 5.2B illustrates the OAD XRD pattern only shows the (002) both before and after annealing due to the directional growth of the ZnO at $\alpha=86°$. FIG. 5.3C illustrates GLAD ZnO nanoparticle films deposited on FTO conducting substrates showed no discernible zincite diffraction peaks after RT deposition. After annealing, sharp peaks representing the (100), (002), (101) and (110) zincite crystal facets arose due to a transition from an amorphous to crystalline phase.

FIGS. 5.3A and 5.3B illustrates scanning electron microscopy (SEM) images of PLD ZnO thin films on FTO conducting substrates reveal a dislodged piece of the ZnO, and its underlying morphology template from the FTO substrate. The PLD were very dense thin films with grain boundaries on the order of 200 nm (FIG. 5.3B).

FIG. 5.4A illustrates SEM images of the OAD ZnO nanoplatelet thin films showed the films to have increased porosity over the PLD samples and individual nanoplatelets with an average size of 900 nm by 450 nm. FIG. 5.4B illustrates a high resolution SEM revealed that the nanoplatelets were made of smaller ZnO agglomerates, and that the shadowing effect of the OAD produced a directed growth with individual nanoplatelets over lapping each other in a fishscale-like pattern.

FIG. 5.5A illustrates SEM images of the ZnO nanoparticle (NP) thin films produced by GLAD revealed an increase in nanporosity of the 15-40 nm ZnO NPs on the FTO substrate. FIG. 5.5B illustrates HRSEM that shows the interconnected nature of the individual NPs, and areas where the GLAD deposition technique was producing stalagmite-like formations.

FIG. 5.6A illustrates the UV-visible absorption spectra of RT deposited ZnO on FTO substrates by PLD, OAD and GLAD techniques. PLD thin films with a brownish tone absorbed through the visible starting at about 700 nm. OAD samples which were colorless after deposition, had weak absorption throughout the visible, and increased absorption in the UV region. GLAD samples which were a brownish tone after RT deposition also had broad absorption out to 700 nm, and an increased absorption once bandgap photoexcitation had been reached in the UV region. FIG. 5.6B illustrates the ZnO after annealing at 550° C. in open air conditions PLD samples remained a brownish tone and had extended absorption out into the visible. OAD nanoplatelet films retained their general absorption profile with a sharp rise in the UV. GLAD NP films after annealing went through an amorphous to crystalline phase change and also changed from a broad UV-visible absorption to a typical absorption pattern starting at about 400 nm with a pronounced peak at 360 nm.

FIGS. 5.7A to 5.7C illustrate ZnO a series of photographs taken during the annealing process to show the phase transition of the GLAD samples from RT (FIG. 5.7A), 400° C. (FIG. 5.7B) and 550° C. in a Leister heat gun. The brownish tone of the ZnO GLAD samples remained up until 550° C. wherein they became colorless within about 30 seconds when placed in close proximity to the heating element (FIG. 5.7C). We believe at this critical temperature the majority of defects from oxygen vacancies and Zn interstitials were removed.

FIG. 5.8 illustrates Mott-Schottky plots of the three samples showed changes of flatband potential ($V_{FB}$), donor density ($N_D$), and space charge layer (W) based on deposition technique. PLD, OAD and GLAD ZnO samples had $V_{FB}$ of −0.29 V, −0.28 V and +0.20 V, $N_D$ of $3.2 \times 10^{16}$ $(cm^3)^{-1}$, $2.8 \times 10^{17}$ $(cm^3)^{-1}$ and $1.4 \times 10^{16}$ $(cm^3)^{-1}$ and W of 165 nm, 95 nm and 235 nm, respectively. Porosity, semiconductor electrolyte interaction and defect density all played critical components to the varying degrees of all three components.

FIG. 5.9 illustrates linear sweep voltammagrams in the dark and AM 1.5 were performed in a 0.5 M NaClO4 solution buffered to pH=7.4. Dark currents for PLD (D), OAD (E) and GLAD (F) showed increased dark current for the PLD sample which had a pronounced increase at 0.8 V. Photocurrent measurements under AM 1.5 (100 mW/cm²) for PLD (B), OAD (C) and GLAD (A) all showed significant photoresponse, but the GLAD NP samples had superior characteristics with a photocurrent of 142 μA/cm² at 1.0 V in comparison to the PLD and OAD samples.

FIG. 5.10 illustrates incident-photo-to-current-conversion efficiency (IPCE) action spectra at an applied potential of 0.5 V for the PLD, OAD and GLAD ZnO films showed varied degrees of photoresponse. PLD samples had weak photocurrent generation in the visible and increased in the UV only to drop to 2.3% at 350 nm. OAD samples and GLAD samples behaved more traditionally with a large increase in the UV region with IPCE % of 12.9% and 16% at 350 nm.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DEFINITIONS

Anatase is a form found as small, isolated, and sharply developed crystals.

Amorphous refers to a solid in which there is no long range order of the position of the atoms.

Orthorhombic refers to a crystal structure that is three-dimensionally rectangular and highly aligned.

Pulsed laser deposition (PLD) uses a high energy laser to ablate a source material, which then turns into a plasma and migrates toward a substrate in a vacuum chamber, where it condenses back to a solid material.

Oblique angle deposition (OAD) is a physical vapor deposition technique that places the substrate surface at a large angle (>70°) with respect to the incident vapor direction.

Glancing angle deposition (GLAD) is similar to OAD, where the substrate is placed at a large angle with respect to the incident vapor direction, however the substrate is also rotated azimuthally during the deposition.

Dynamic shadowing growth (DSG) is a modified GLAD technique that uses smaller angles (<70°) to deposit material using physical vapor deposition. Because the angle is smaller, this method leads to less porous nanostructures, and typically is used for small thin film coatings.

A photocatalytic structure is a structure that can absorb photons (light) that accelerate a catalytic reaction, usually at the surface of the material.

A photoelectrochemical structure is a structure that absorbs light that accelerates an electrochemical reaction as a photosensitive anode, with a reduction and oxidation reaction occurring simultaneously.

Discussion:

Embodiments of the present disclosure include structures, photocatalytic structures, and photoelectrochemical structures (e.g., structures including nanorods, thin films with nanostructure features, nanostructures, two layer nanostructures, core-shell nanostructure, and the like), methods of making these structures, methods of making photocatalysis, methods of splitting $H_2O$, methods of splitting $CO_2$, and the like.

Embodiments of the present disclosure include structures and photocatalytic structures including two-layer (e.g., $TiO_2/WO_3$) nanostructures. In an embodiment, the nanostructures are fabricated by electron beam deposition. Embodiments of these structures can be used to split $H_2O$ to produce $H_2$. Embodiments of these structures can be used to split $CO_2$. Specifically, embodiments of the present disclosure include $WO_3/TiO_2$ two-layer and core-shell nanorod arrays imparted with specific morphologies to enhance their catalytic activity. The advantages of this technique allow the use of significantly less photocatalytic material ($TiO_2$) than with traditional single layered photocatalytic materials. Furthermore, by combining $TiO_2$ with $WO_3$, the range of absorption of light, and thus the excitation spectra is shifted out from the UV region towards the visible wavelength region, which allows a larger spectra of light to initiate the photoreactions.

Embodiments of the present disclosure include structures and photocatalytic structures including high-density and aligned $TiO_2$ nanorod arrays. In an embodiment, the $TiO_2$ nanorods have PEC properties for hydrogen generation by water splitting. Embodiments of these structures can be used to split $H_2O$ to produce $H_2$. Embodiments of these structures can be used to split $CO_2$. The $TiO_2$ nanorod array can be used in photoelectrochemical cells.

Embodiments of the present disclosure include structures and photocatalytic structures including ZnO thin films with nanostructure features. In an embodiment, the ZnO thin films are fabricated using pulsed laser deposition (PLD), oblique angle deposition (OAD), and glancing angle deposition (GLAD). Embodiments of these structures can be used to split $H_2O$ to produce $H_2$. Embodiments of these structures can be used to split $CO_2$. The ZnO thin films can be used in can be used in photoelectrochemical cells. These ZnO structures did not have as good IPCE characteristics compared to $TiO_2$ structures, but displayed improved $H_2$ generation characteristics.

Each of the embodiments is described below and in the corresponding Examples.

$TiO_2$ and $WO_3$ Nanostructures

Embodiments of the present disclosure include core-shell nanostructures and two layer nanorods made of $TiO_2$ and $WO_3$. Structures including the core-shell nanostructures and two layer nanorods can be photocatalytic. Combining $TiO_2$ with $WO_3$ produces a charge separation effect to extend the lifetime of the electron hole pairs. The addition of the $WO_3$ layer causes the charge separation in $TiO_2$ and results in more electrons accumulating in the $WO_3$ layer as well as more holes accumulating in the $TiO_2$ layer. A surplus of holes accumulating in the $TiO_2$ layer leads to an overall enhancement of photo-degradation abilities.

Embodiments of the core-shell nanostructures (e.g., $TiO_2/WO_3$ or $WO_3/TiO_2$) can be created using a physical vapor deposition method that produces photocatalytic structures and photoelectrochemical structures that have photocatalytic enhancement up to about 70 times over amorphous single layer $TiO_2$ thin films, about 13 times enhancement over crystalline (anatase) $TiO_2$ thin films, and about 3 times enhancement over c-$TiO_2$/a-$WO_3$ two-layer thin films, with $1/7^{th}$ the load of $TiO_2$. In an embodiment, although not intending to be bound by theory, the mechanism for the photocatalytic enhancement is from the increased charge separation of the electron-hole pairs aided by the $WO_3$ layer, the interfacial area between the two layers, and the large surface area from the porous nanostructure. In another embodiment, a physically deposited core-shell nanostructured array has enhanced photocatalytic capabilities with a significantly reduced (e.g., about 85% less) amount of the active photocatalyst $TiO_2$. Thus, embodiments of the present disclosure are advantageous over previous materials.

In an embodiment of the present disclosure, the photocatalytic structures or photoelectrochemical structures include a substrate, a first layer comprising an aligned nanorod array of $WO_3$ deposited on the substrate, and a second layer comprising $TiO_2$ deposited on each of the nanorods of the array of the first layer. In an embodiment, the first layer and the second layer form an aligned two-layer nanorod array. Two-layer oxide nanostructures of a specific design greatly enhance photocatalytic performance.

In an embodiment, the first layer and the second layer can each have a diameter of about 20 nm to 1000 nm or about 45 nm to 350 nm. In an embodiment, the first layer and the second layer can each have a height of about 100 nm to 5000 nm or about 1000 nm to 2500 nm. In an embodiment, the distance between two nanorods is about 45 nm to 750 nm or about 150 nm to 350 nm.

Embodiments of the present disclosure include substrates comprising silicon (Si) wafers, glass microscope slides, and indium tin oxide (ITO) coated glass slides (e.g., which can be used in photoelectrochemistry).

Embodiments of the present disclosure include aligned two-layer $TiO_2/WO_3$ nanorod arrays fabricated using oblique angle deposition (OAD) and glancing angle deposition (GLAD) techniques. These techniques are described in more detail in the Examples.

An embodiment of the present disclosure includes a photocatalytic structure or photoelectrochemical structure where the aligned two-layer nanorod array is vertical. In an embodiment, the photocatalytic structure comprises a vertical aligned two-layer nanorod array and has a density of about 8 to 12 nanorods/$\mu m^2$, an average length of about 750 to 850 nm, and an average diameter on top of about 70 to 90 nm.

An embodiment of the present disclosure includes vertical aligned two-layer $TiO_2/WO_3$ nanorod arrays where the crystal structure of the $TiO_2$ and the $WO_3$ is amorphous (after annealing at about 300° C.). In another embodiment, the vertical aligned two-layer $TiO_2/WO_3$ nanorod arrays have a $TiO_2$ crystal structure of anatase, and a $WO_3$ crystal structure of orthorhombic (after annealing at about 400° C.).

An embodiment of the present disclosure includes a photocatalytic structure or photoelectrochemical structure where the aligned two-layer nanorod array is tilted. In an embodiment, the photocatalytic structure comprises a tilted aligned two-layer nanorod array and has a density of about 35-45 rods/µm², an average length of about 1.1-1.5 µm, an average diameter of about 40-50 nm, and a tilting angle (with respect to the surface normal) of about 30° to 70° or about 53°-57°.

An embodiment of the present disclosure includes tilted aligned two-layer $TiO_2/WO_3$ nanorod arrays where the crystal structure of the $TiO_2$ is anatase and the crystal structure of the $WO_3$ is amorphous (after annealing at about 300° C.). An embodiment of the present disclosure includes tilted aligned two-layer $TiO_2/WO_3$ nanorod arrays where the crystal structure of the $TiO_2$ is anatase and the crystal structure of the $WO_3$ is orthorhombic (after annealing at about 400° C.).

An embodiment of the present disclosure includes a photocatalytic structure or photoelectrochemical structure where the first layer and the second layer form a core-shell nanorod array. A core-shell nanorod array includes a $WO_3$ "core" nanorod array on which $TiO_2$ is deposited on each nanorod of the array so as to form a "shell" over each $WO_3$ "core" as illustrated in FIG. 2.1A ($WO_3/TiO_2$ core-shell nanorod). In an embodiment, the core-shell nanorod array has morphological parameters comprising: a height of about 0.5 to 5 µm or about 1.5 to 1.7 µm, a base diameter of about 15 to 50 nm or about 25 to 35 nm, a diameter at the top of about 250 to 450 nm or about 320 to 340 nm, and a density of about 5 to 15 or about 7 to 11 rods/µm². Embodiments of the present disclosure include amorphous oxide nanostructures with superior photocatalytic behavior.

An embodiment of the present disclosure includes core-shell aligned two-layer $WO_3/TiO_2$ nanorod arrays where the crystal structure of the $TiO_2$ and the $WO_3$ is amorphous. An embodiment of the present disclosure includes core-shell aligned two-layer $WO_3/TiO_2$ nanorod arrays where the crystal structure of the $TiO_2$ is anatase and the crystal structure of the $WO_3$ is amorphous (after annealing at about 300° C.). An embodiment of the present disclosure includes core-shell aligned two-layer $WO_3/TiO_2$ nanorod arrays where the crystal structure of the $TiO_2$ is anatase and the crystal structure of the $WO_3$ is orthorhombic (after annealing at about 400° C.).

In an embodiment of the present disclosure a $WO_3$-core/$TiO_2$-shell nanorod array shows significant photocatalytic enhancement (up to 370 times) over amorphous $TiO_2$ thin films, and anatase $TiO_2$ films (7 times).

An embodiment of the present disclosure includes $WO_3/TiO_2$ two-layer and core-shell nanorod arrays where the surface density of the separated charges is maximized by maximizing the $WO_3$—$TiO_2$ interfacial area. This increases the decay rate significantly.

An embodiment of the present disclosure includes a photocatalytic structure or photoelectrochemical structure where the first layer and the second layer form a core-shell nanorod array. A core-shell nanorod array includes a $TiO_2$ "core" nanorod array on which $WO_3$ is deposited on each nanorod of the array so as to form a "shell" over each $TiO_2$ "core" ($TiO_2/WO_3$ core shell nanorod). In an embodiment, the core-shell nanorod array has morphological parameters comprising: a height of about 0.5 to 5 µm or about 1.5 to 1.7 µm, a base diameter of about 15 to 50 nm or about 25 to 35 nm, a diameter at the top of about 250 to 500 nm or about 320 to 340 nm, and a density of about 5 to 15 or about 7 to 11 rods/µm². Embodiments of the present disclosure include amorphous oxide nanostructures with superior photocatalytic behavior.

An embodiment of the present disclosure includes core-shell aligned two-layer $TiO_2/WO_3$ nanorod arrays where the crystal structure of the $TiO_2$ and the $WO_3$ is amorphous. An embodiment of the present disclosure includes core-shell aligned two-layer $TiO_2/WO_3$ nanorod arrays where the crystal structure of the $TiO_2$ is anatase and the crystal structure of the $WO_3$ is orthorhombic after annealing at about 500° C.

An embodiment of the present disclosure includes a method of making photocatalytic structures. The method includes providing a substrate (e.g., silicon, glass slides, and ITO coated glass slides), depositing a first layer of a $WO_3$ aligned nanorod array on the substrate (or $TiO_2$ for the other embodiment). Subsequently, the method includes depositing a second layer of $TiO_2$ on each nanorod of the first layer (or $WO_3$ for the other embodiment). In an embodiment, the method includes depositing the first layer and the second layer using DSG or dynamic shadowing growth. In an embodiment, the method includes depositing the first layer and the second layer using glancing angle deposition (GLAD). In another embodiment, the method includes depositing the first layer and the second layer using oblique angle deposition (OAD).

Embodiments of the present disclosure include a method of making $WO_3/TiO_2$ (or $TiO_2/WO_3$) photocatalytic structures, where the $TiO_2$ is deposited at a small angle of 0°-30° (e.g., 11°, as determined by the $WO_3$ "core" morphological parameters) to cover the maximum surface area of the $WO_3$ nanorods.

Embodiments of the present disclosure include another method of making photocatalytic structures or photoelectrochemical structures. The nanorods can be made using a GLAD system. The method includes depositing the $WO_3$ (or $TiO_2$) on the substrate at a rate of about 0.1 to 1.0 nm/s or about 0.2 to 0.6 nm/s, with the substrate positioned at about 75° to 88° or about 85° to 87° from the incident evaporation direction, with an azimuthal rotation speed of about 0.2 to 1.0 rev/s or about 0.4 to 0.6 rev/s until the thickness reaches about 4 to 6 µm or about 5 µm, measuring the height (h) and separation (d) of the $WO_3$ nanorods. Next, the method includes determining the $TiO_2$ (or $WO_3$) deposition angle ($\theta_s$) according to the formula: $\tan(\theta_s)=d/h$. Subsequently, the method includes depositing the $TiO_2$ at the deposition angle at a rate of about 0.1 to 1.0 nm/s or about 0.1 to 0.5 nm/s with a substrate azimuthal rotation speed of about 0.2 to 1.0 rev/s or about 0.4 to 0.6 rev/s, until the thickness reaches about 70 to 80 nm or about 75 nm. In an embodiment, the height (h) is about about 1.2 to 5 µm or 1.5 to 1.7 µm, the separation (d) is about 75 to 250 nm or about 135 to 165 nm, and the $TiO_2$ deposition angle ($\theta_s$) is about 8° to 45° or about 10° to 12° with respect to the incident vapor flux.

Embodiments of the present disclosure include a method of making photocatalytic structures where the photocatalytic structure or photoelectrochemical structure is annealed at about 100 to 350° C. or about 290-310° C. In an embodiment, the photocatalytic structure is annealed at about 350 to 500° C. or about 390-410° C.

Embodiments of the present disclosure can be used to split $H_2O$ to produce $H_2$. In an embodiment, the method of splitting $H_2O$ to generate $H_2$ includes introducing an aqueous solution to one of the photoelectrochemical structures described herein so that the aqueous solution contacts the nanorods. Next, the photoelectrochemical structure is exposed to a light source (e.g., a white light source, the sun, etc), where the aqueous solution and the photoelectrochemical structure interact to produce $H_2$ from the aqueous solution. The aqueous solution can be water, hydrogen peroxide, isopropyl alcohol, ethanol, or a combination thereof. Additional details regarding photoelectrochemical structures are described in the Examples.

In addition, embodiments of the present disclosure can by used to split $CO_2$. In an embodiment, the method of splitting $CO_2$ to create hydrocarbons, for example, includes introducing an aqueous solution to one of the photoelectrochemical structures described herein so that the aqueous solution contacts the nanorods. Next, the photoelectrochemical structure is exposed to a light source (e.g. a white light source, the sun, etc.) where the aqueous solution and the photoelectrochemical structure interact to decompose $CO_2$. The aqueous solution can be water, hydrogen peroxide, isopropyl alcohol, ethanol, or a combination thereof. Additional details regarding photoelectrochemical structures are described in the Examples.

Additional details regarding these embodiments are described in Examples 1 and 2.

$TiO_2$ Nanostructures

As mentioned above, embodiments of the present disclosure include structures, photocatalytic structures, and photoelectrochemical structures including $TiO_2$ nanorods. Embodiments of the present disclosure can be used to split $H_2O$ or $CO_2$. In particular, the structures include a substrate having $TiO_2$ nanorods disposed on the substrate. Embodiments of the present disclosure include substrates comprising silicon (Si) wafers, glass microscope slides, and indium tin oxide (ITO) coated glass slides (e.g., which can be used in photoelectrochemistry). In an embodiment, the $TiO_2$ nanorods have an anatase crystal structure.

Embodiments of the present disclosure include $TiO_2$ nanorods fabricated using glancing angle deposition (GLAD) techniques. This technique is described in more detail in the Examples.

In an embodiment, the $TiO_2$ nanorods have a length of about 400 to 3000 nm or about 800 to 1100 nm. In an embodiment, the $TiO_2$ nanorods have a width of about 25 to 600 nm or about 45 to 400 nm.

In an embodiment, the density of the nanorods is about 2 to $65 \times 10^6$ $mm^{-2}$ or about $25 \times 10^6$ $mm^{-2}$. In an embodiment, the nanorods are tilted from the substrate at an angle of about 30° to 75° or about 53° to 55°, from substrate normal.

Embodiments of the present disclosure include methods of making structures, photocatalytic structures, and photoelectrochemical structures including $TiO_2$ nanorods. The nanorods can be made using GLAD. In particular, the method includes depositing $TiO_2$ on a substrate at a rate of about 0.1 to 1.0 nm/s or about 0.2 to 0.6 nm/s with the substrate positioned at about 50° to 89° or about 85° to 87°, from the incident evaporation direction with an azimuthal rotation speed of about 0.1 to 1.0 rev/s or about 0.4 to 0.6 rev/s, the temperature is about 25° C. Subsequently, the $TiO_2$ nanorods are formed. After the $TiO_2$ nanorods are formed, the $TiO_2$ nanorods are annealed at about 200 to 600° C. or about 550° C. Additional details are described in the Examples.

Embodiments of the present disclosure can be used to split $H_2O$ to generate $H_2$. An embodiment of a method of splitting $H_2O$ to generate $H_2$ include providing a photoelectrochemical structure including an indium tin oxide substrate having $TiO_2$ nanorods disposed thereon. In an embodiment, the method of splitting $H_2O$ to generate $H_2$ includes introducing an aqueous solution to the photoelectrochemical structures so that the aqueous solution contacts the nanorods. Next, the photoelectrochemical structure is exposed to a light source (e.g., a white light source, the sun, etc), where the aqueous solution and the photoelectrochemical structure interact to produce $H_2$ from the aqueous solution. The aqueous solution can be water, hydrogen peroxide, isopropyl alcohol, ethanol or a combination thereof. Additional details regarding photoelectrochemical structures are described in the Examples.

In addition, embodiments of the present disclosure can by used to split $CO_2$. In an embodiment, the method of splitting $CO_2$ to possibly create hydrocarbons includes introducing an aqueous solution to one of the photoelectrochemical structures described herein so that the aqueous solution contacts the nanorods. Next, the photoelectrochemical structure is exposed to a light source (e.g. a white light source, the sun, etc.) where the aqueous solution and the photoelectrochemical structure interact to decompose $CO_2$. The aqueous solution can be water, hydrogen peroxide, isopropyl alcohol, ethanol, or a combination thereof. Additional details regarding photoelectrochemical structures are described in the Examples.

Additional details regarding these embodiments are described in Example 3.

Nanostructured ZnO Thin Films

As mentioned above, embodiments of the present disclosure include structures, photocatalytic structures, and photoelectrochemical structures including nanostructured ZnO thin films. Embodiments of the present disclosure can be used to split $H_2O$ or $CO_2$. In particular, the structures include a substrate having nanostructured ZnO thin films deposited on the substrate. Embodiments of the present disclosure include substrates comprising silicon (Si) wafers, glass microscope slides, and indium tin oxide (ITO) coated glass slides (e.g., which can be used in photoelectrochemistry).

Embodiments of the present disclosure include nanostructured ZnO thin films fabricated using pulsed laser deposition (PLD), oblique angle deposition (OAD), and glancing angle deposition (GLAD) techniques. This technique is described in more detail in the Examples.

Each of the fabrication techniques produced a different nanostructured ZnO thin film having different surface features. PLD produced a thin film with grain size features of about 100 to 500 nm or about 190 to 210 nm. The nanostructured ZnO thin film has a thickness of about 1 to 5 μm or about 1.4 to 1.6 μm. The nanostructured ZnO thin film produced using PLD can be used in a structure to split $H_2O$ or $CO_2$. Additional details regarding the nanostructured ZnO thin film produced using PLD are described below.

OAD produced a thin film with a fishscale morphology. Each fishscale feature is about 200 to 1500 nm or about a 900 nm by 450 nm. The nanostructured ZnO thin film has a thickness of about 0.5 to 2.5 μm or about 1.4 to 1.6 μm. The nanostructured ZnO thin film produced using OAD can be used in a structure to split $H_2O$ or $CO_2$. Additional details regarding the nanostructured ZnO thin film produced using OAD are described below.

GLAD produced thin film with a nanoporous, interconnected network of spherical nanoparticles, where each nanoparticle is about 5 to 100 nm or about 15 to 40 nm in diameter. The nanostructured ZnO thin film produced using GLAD can be used in a structure to split $H_2O$ or $CO_2$. Additional details regarding the nanostructured ZnO thin film produced using GLAD are described below.

Embodiments of the present disclosure include methods of making structures, photocatalytic structures, and photoelectrochemical structures including ZnO nanoporous, interconnected network of spherical nanoparticles. In particular, the method includes depositing ZnO on a substrate at a rate of about 0.1 to 1.0 nm/s or about 0.2 to 0.6 nm/s with the substrate positioned at about 75° to 89° or about 85° to 87°, from the incident evaporation direction with an azimuthal rotation speed of about 0.1-1.0 rev/s or about 0.4 to 0.6 rev/s, the temperature is about 25° C. Subsequently, the ZnO nanoporous, interconnected network of spherical nanoparticles are formed. After the ZnO nanoporous, interconnected network of spherical nanoparticles are formed, the ZnO nanoporous, interconnected network of spherical nanoparticles are annealed at about 100 to 650° C. or about 550° C. Additional details are described in the Examples.

Embodiments of the each of the nanostructured ZnO thin films present disclosure can be used to split $H_2O$ to generate $H_2$. An embodiment of a method of splitting $H_2O$ to generate $H_2$ includes providing a photoelectrochemical structure (e.g., a conductive substrate such as ITO or the like) having a nanostructured ZnO thin film disposed thereon. In an embodiment, the method of splitting $H_2O$ to generate $H_2$ includes introducing an aqueous solution to the photoelectrochemical structures so that the aqueous solution contacts the nanorods. Next, the photoelectrochemical structure is exposed to a light source (e.g., a white light source, the sun, etc), where the aqueous solution and the photoelectrochemical structure interact to produce $H_2$ from the aqueous solution. The aqueous solution can be water, hydrogen peroxide, isopropyl alcohol, ethanol, or a combination thereof. Additional details regarding photoelectrochemical structures are described in the Examples.

In addition, embodiments of the present disclosure can by used to split $CO_2$. In an embodiment, the method of splitting $CO_2$ to possibly create hydrocarbons includes introducing an aqueous solution to one of the photoelctrochemical structures described herein so that the aqueous solution contacts the nanorods. Next, the photoelectrochemical structure is exposed to a light source (e.g. a white light source, the sun, etc.) where the aqueous solution and the photoelectrochemical structure interact to decompose $CO_2$. The aqueous solution can be water, hydrogen peroxide, isopropyl alcohol, ethanol, or a combination thereof. Additional details regarding photoelectrochemical structures are described in the Examples.

Additional details regarding these embodiments are described in Example 4.

EXAMPLES

Example 1

Introduction $TiO_2$ is an efficient photocatalyst at ultraviolet and near visible light wavelengths for use in hydrogen production (A. Fujishima, K. Honda, *Nature* 238, 37 (1972); M-S. Park, M. Kang, M, *Materials Letters* 62, 183 (2007); N. Strataki, V. Bekiari, D. Kondarides, P. Lianos, *Applied Catalysis B: Environmental* 77, 184 (2007); J. F. Houlihan, D. P. Madasci, *Materials Research Bulletin* 11, 1191 (1976); J.-L. Desplat, *Journal of Applied Physics* 47, 5102 (1976), which are herein incorporated by reference for the corresponding discussion), self-cleaning (M. Houmard, D. Riassetto, F. Roussel, A. Bourgeois, G. Berthome, J. C. Joud, M. Langlet, *Applied Surface Science* 254, 1405 (2007); Y. Daiko, H. Yajima, T. Kasuga, *Journal of European Ceramic Society* 28, 267 (2007); S. S. Madaeni, N. Ghaemi, *Journal of Membrane Science* 303, 221 (2007), which are herein incorporated by reference for the corresponding discussion), and decomposing volatile organic compounds (V. Augugliaro, S. Coluccia, V. Loddo, L. Marchese, G. Martra, M. Palmisano, M. Schiavello, *Studies in Surface Science and Catalysis* 110, 663 (1997); A. O'Malley, B. K. Hodnett, *Studies in Surface Science and Catalysis* 110, 1137 (1997); F. Fresno, J. M. Coronado, D. Tudela, J. Soria, *Applied Catalysis B: Environmental* 55, 159 (2004), which are herein incorporated by reference for the corresponding discussion). However, $TiO_2$ by itself can only reach a certain level of photocatalytic efficiency due to the quick recombination of the photo-generated electron-hole pairs. It has been shown that the photocatalytic efficiency of $TiO_2$ can be improved by reducing defects, increasing surface area, and extending the lifetime of electron-hole pairs.

When $TiO_2$ is prepared by physical vapor deposition (PVD) methods or other methods, it may be in the amorphous phase and has many structural defects. Those defects form trapped states that could reduce the lifetime of the photogenerated electron-hole pairs, thus deteriorating the photocatalytic activity. By annealing $TiO_2$ at temperatures above 200° C., the crystal structure changes from amorphous to anatase, and the number of defect sites is reduced, thus helping to improve the photocatalytic efficiency (B. Huber, A. Brodyanksi, M. Scheib, A. Orendorz, C. Ziegler, H. Gnaser, *Thin Film Solids* 472, 114 (2005); B. Huber, H. Gnaser, C. Ziegler, *Surface Science* 566, 419 (2004), which are herein incorporated by reference for the corresponding discussion). In addition, photocatalytic effects always occur at the surface of the photocatalytic materials. For example, both hydrogen generation from water splitting and the decomposition of organic dyes in aqueous solutions occur at the solid-liquid interface between $TiO_2$ and the solution (O. Zywitzki, T. Modes, P. Frach, D. Gloss, *Surface and Coatings Technology* 202, 2488 (2008); K. M. Parida, N. Sahu, N. R. Biswai, B. Naik, A. C. Pradhan, *Journal of Colloid and Interface Science* 318, 231 (2008), which are herein incorporated by reference for the corresponding discussion). By increasing the surface area of $TiO_2$ via porous structures, more photogenerated electrons or holes can be in contact with the reactants, thus the photocatalytic efficiency will also increase. To further improve the photocatalytic performance, combining $TiO_2$ with another semiconductor with a similar position in their conduction bands or metal nanoparticles, can produce a so-called charge separation effect to extend the lifetime of the electron-hole pairs (J. F. Wager, *Thin Film Solids* 516, 1755 (2008); H. Xu, G. Vanamu, Z. Nie, H. Konishi, R. Yeredla, J. Phillips, Y. Wang, *Journal of Nanomaterials* 2, 1 (2006); J. Sa, M. Fernandez-Garcia, J. A. Anderson, *Catalysis Communications* 9, 1991 (2008), which are herein incorporated by reference for the corresponding discussion). This is possible because the photo-generated electrons that are excited to the conduction band in the first material, can move to the conduction band of the second material and delay the recombination with the photo-generated holes.

Typically metals such as Ag, Au, and Pt have been used to scavenge photo-generated electrons and have shown significant charge-separation enhancement (H. Xu, G. Vanamu, Z. Nie, H. Konishi, R. Yeredla, J. Phillips, Y. Wang, *Journal of Nanomaterials* 2, 1 (2006); J. Sa, M. Fernandez-Garcia, J. A. Anderson, *Catalysis Communications* 9, 1991 (2008), which are herein incorporated by reference for the corresponding discussion). However, the most common method to prepare these structures is to coat the $TiO_2$ layer with a metal on top (H. Xu, G. Vanamu, Z. Nie, H. Konishi, R. Yeredla, J. Phillips, Y. Wang, *Journal of Nanomaterials* 2, 1 (2006); J. Sa, M. Fernandez-Garcia, J. A. Anderson, *Catalysis Communications* 9, 1991 (2008), which are herein incorporated by reference for the corresponding discussion). The metal nanoparticles cover the surface of the $TiO_2$, and thus reduce the surface area between $TiO_2$ and the liquid, which then reduces the area of the catalytically active sites. $TiO_2/WO_3$ coupled structures are one such composition that holds great promise (C. Shifu, C. Lei, G. Shen, C. Gengyu, *Powder Technology* 160, 198 (2005); V. Puddu, R. Mokaya, G. L. Puma, *Chemical Communications* 4749 (2007); H. Gomez, F. Orellana, H. Lizama, H. D. Mansilla, E. A. Dachiele, *Journal of the Chil-* ean *Chemical Society* 51, 1006 (2006), which are herein incorporated by reference for the corresponding discussion), since WO$_3$ (E$_g$=2.8 eV) has a similar conduction band level to TiO$_2$ (E$_g$=3.2 eV). Several methods have been used to create these combo-structures such as ball milling (C. Shifu, C. Lei, G. Shen, C. Gengyu, *Powder Technology* 160, 198 (2005), which is herein incorporated by reference for the corresponding discussion), hydrothermal synthesis (V. Puddu, R. Mokaya, G. L. Puma, *Chemical Communications* 4749 (2007), which is herein incorporated by reference for the corresponding discussion), and sol-gel processing (H. Gomez, F. Orellana, H. Lizama, H. D. Mansilla, E. A. Dachiele, *Journal of the Chilean Chemical Society* 51, 1006 (2006), which is herein incorporated by reference for the corresponding discussion). These methods produce a random mixture of TiO$_2$ and WO$_3$ nanoparticles. Although these structures have improved the overall photocatalytic behavior, due to the small band gap of WO$_3$, and the randomness of the particle orientations, the optical absorbance efficiency of the structure is not optimized.

It has been reported by Miyauchi et al. that by having TiO$_2$ facing the incident UV-light instead of WO$_3$ leads to enhanced photocatalysis (M. Miyauchi, A. Nakajima, T. Watanabe, K. Hashimoto, *Chemistry of Materials* 14, 4714 (2002), which is herein incorporated by reference for the corresponding discussion). This is because the addition of the WO$_3$ layer causes the charge-separation in TiO$_2$, and results in more electrons accumulating in the WO$_3$ layer, and more holes accumulating in the TiO$_2$ layer. This enhances the photocatalytic properties because the holes in the TiO$_2$ layer have a strong oxidation potential and can breakdown the organic material adsorbed on the surface, so with a surplus of holes accumulating in the TiO$_2$ layer, this leads to an overall enhancement of its photo-degradation abilities.

It has also been reported by Irie et al. that the interfacial area between the TiO$_2$ layer and WO$_3$ layer plays an important role in charge separation, and thus affecting the photocatalytic activity (H. Irie, H. Mori, K. Hashimoto, *Vacuum* 74, 625 (2004), which is herein incorporated by reference for the corresponding discussion). By increasing the contact area between the TiO$_2$ and WO$_3$ surfaces, more separated electron-hole pairs can stay open longer due to the charge separation effect. In addition, the crystal phase of both the TiO$_2$ and WO$_3$ layers play an important role in the overall photocatalytic performance. Higashimoto et al. has reported that a two-layer TiO$_2$/WO$_3$ system yields higher efficiency in photo-electrochemical experiments with the TiO$_2$ layer being crystalline and the WO$_3$ phase being amorphous than with both layers being crystalline (S. Higashimoto, Y. Ushiroda, M. Azuma, *Top. Catal.* 47, 148 (2008); S. Higashimoto, N. Kitahata, K. Mori, M. Azuma, *Catalysis Letters* 101, 49 (2004), which are herein incorporated by reference for the corresponding discussion). The explanation for this effect is that the amorphous WO$_3$ has its conduction band level closer to that of TiO$_2$, and thus allows for easier charge-carrier transfer. By combining the large surface and interfacial area, proper crystalline structure, and ordered layer structure, one could greatly enhance the photocatalytic activity. However, the current nanofabrication techniques can only partially meet those requirements.

Recently, oblique angle deposition (OAD) and glancing angle deposition (GLAD) have shown the advantages to fabricate uniform aligned arrays of tilted and vertical nanorods from arbitrarily selected materials (N. O. Young, J. Kowal, *Nature* 183, 104 (1959); T. Motohiro, Y. Taga, *Applied Optics* 28, 2466 (1989); K. Robbie, M. J. Brett, *Journal of Vacuum Science and Technology A* 15, 1460 (1997); K. Robbie, M. J. Brett, A. Lakhtakia, *Nature* 384, 616 (1996); R. Messier, V. C. Venugopal, P. D. Sunal, *Journal of Vacuum Science and Technology A* 18, 1538 (2000); M. Malac, R. F. Egerton, *Journal of Vacuum Science and Technology A* 19, 158 (2001); Y.-P. Zhao, D.-X. Ye, G.-C. Wang, T.-M. Lu, *Nano Letters* 2, 351 (2002); D.-X. Ye, Y.-P. Zhao, G.-R. Yang, Y.-G. Zhao, G.-C. Wang, T.-M. Lu, *Nanotechnology* 13, 615 (2002); Y.-P. Zhao, D.-X. Ye, P.-I. Wang, G.-C. Wang, T.-M. Lu, *International Journal of Nanoscience* 1, 87 (2002); J. Fan, Y.-P. Zhao, *Journal of Vacuum Science and Technology B* 23, 947 (2005); W. Smith, Z.-Y. Zhang, Y.-P. Zhao, *Journal of Vacuum Science and Technology B* 25, 1875 (2007); Y. P. He, Y. P. Zhao, J. S. Wu, *Applied Physics Letters* 92, 063107 (2008); Y.-P. He, Z.-Y. Zhang, C. Hoffmann, and Y.-P. Zhao, *Advanced Functional Materials* 18, 1676 (2008); R. Blackwell and Y.-P. Zhao, *Journal of Vacuum Science and Technology B* 26, 1344 (2008), which are herein incorporated by reference for the corresponding discussion). These methods are based on a physical vapor deposition technique and are implemented by positioning the substrate at a large angle with respect to the incident vapor flux of the evaporated material. The vapors initially randomly nucleate on the surface of the substrate, and a so-called geometric shadowing effect helps the tall islands to grow taller, thus forming an aligned nanorod array. For OAD, the substrate remains fixed at a large angle, and the shadowing effect builds an array of tilted nanorods, which are tilted towards the direction of the incident vapor flux. For GLAD, the substrate is rotated azimuthally with a constant speed, and an array of vertically aligned nanorods is formed. This versatile technique can also be used to deposit several materials on top of each other, that is, multi-layered nanorod arrays (J. Fan, Y.-P. Zhao, *Journal of Vacuum Science and Technology B* 23, 947 (2005); S. V. Kesapragada, D. Gall, *Thin Solid Films* 494, 234 (2006); Y. He, J.-S. Wu, and Y.-P. Zhao, *Nano Letters* 7, 1369 (2007); Y. P. He, J. Fu, Y. Zhang, Y. Zhao, L. Zhang, A. Xia, J. Cai, *Small* 3, 153 (2007); A. K. Kar, P Morrow, X-T Tang, T. C. Parker, H. Li, J.-Y. Dai, M. Shima, and G-C Wang. *Nanotechnology* 18, 295702 (2007) P. Morrow, X.-T. Tang, T. C. Parker, M. Shima, and G.-C. Wang, *Nanotechnology* 19, 065712 (2008); J.-X. Fu, Y.-P. He, and Y.-P. Zhao, *IEEE Sensors* 8, 989 (2008), which are herein incorporated by reference for the corresponding discussion).

Fan et al. has used OAD method to deposit Si/Ag two layer structures on optical fiber (J. Fan, Y.-P. Zhao, *Journal of Vacuum Science and Technology B* 23, 947 (2005), which is herein incorporated by reference for the corresponding discussion). Kesapragada et al. used GLAD to grow Si/Cr multilayer vertical nanopillar structures (S. V. Kesapragada, D. Gall, *Thin Solid Films* 494, 234 (2006), which is herein incorporated by reference for the corresponding discussion). He et al. have designed a multilayer Si/Ni helical spring and studied its magnetic properties (Y. He, J.-S. Wu, and Y.-P. Zhao, *Nano Letters* 7, 1369 (2007), which is herein incorporated by reference for the corresponding discussion), and they also designed different catalytic nanomotors through multilayer OAD and GLAD of Pt/Si and Ag/Si nanostructures (Y. P. He, J. Fu, Y. Zhang, Y. Zhao, L. Zhang, A. Xia, J. Cai, *Small* 3, 153 (2007), which is herein incorporated by reference for the corresponding discussion). Kar et al. used OAD to epitaxially grow Co/Cu multilayered nanocolumns and investigated their magnetoresistance (Y. P. He, J. Fu, Y. Zhang, Y. Zhao, L. Zhang, A. Xia, J. Cai, *Small* 3, 153 (2007); A. K. Kar, P Morrow, X-T Tang, T. C. Parker, H. Li, J.-Y. Dai, M. Shima, and G-C Wang, *Nanotechnology* 18, 295702 (2007), which are herein incorporated by reference for the corresponding discussion). Both OAD and GLAD techniques could satisfy the fabrication requirements to design better photocatalytic structures.

In this disclosure, we designed aligned two-layer $TiO_2$/ $WO_3$ nanorod arrays by OAD and GLAD to demonstrate the feasibility of such photocatalytic nanostructures. Their photocatalytic degradation rates of methylene blue (MB) were compared to two-layer thin films and to morphologically similar single layer $TiO_2$ nanostructures. Our results have demonstrated that two-layer oxide nanostructures of a specific design could greatly enhance the photocatalytic performance.

Experimental

A custom-built electron beam evaporation system (Torr International, New Windsor, N.Y.) was used to deposit the two-layer $TiO_2/WO_3$ nanostructures. The source materials used to deposit were $TiO_2$ (99.9%, Kurt J. Lesker) and $WO_3$ (99.8%, Alfa Aesar) with no other gases present in the chamber during depositions, and chamber background pressure was at $1-2\times10^{-6}$ Torr. Both Si wafers and glass microscope slides were used as substrates for different characterizations.

For thin film deposition, the substrate normal was faced parallel to the direction of the incident vapor flux. For OAD and GLAD, the substrate normal was positioned 86° from the vapor incident direction as shown in FIGS. 1.1A and 1.1B. For GLAD, the substrate was also rotated azimuthally at a constant rate of 0.5 rev/second (FIG. 1.1B). The growth rate and thickness of the deposition were both monitored by a quartz crystal microbalance (QCM) facing the vapor flux direction directly. For both $WO_3$ and $TiO_2$ depositions, the rate was fixed at 0.3 nm/s and each layer was deposited until a reading of 500 nm was reached on the QCM.

For comparisons, the single layer $TiO_2$ thin film, OAD nanorods, and GLAD nanorods with the same deposition configurations and conditions to their two-layer counterparts were also prepared. After the depositions, the samples were annealed in air for 2 hours at $T_a=300°$ C., and $T_a=400°$ C., respectively. The samples were characterized by a field-emission scanning electron microscopy (SEM) with energy-dispersive x-ray spectroscopy (EDX) (FEI Inspect F), x-ray diffraction (XRD, PANalytical X'Pert PRO MRD), and Raman spectroscopy (Renishaw). To determine the photocatalytic activities of each sample, the optical absorbance of methylene blue (MB: $C_{16}H_{18}ClN_3S$, Alfa Aesar) in an aqueous solution was measured by a UV-Vis spectrophotometer (JASCO V-570). The samples were cut into $9.0\times30.0$ $mm^2$ rectangular shape, and placed into a clear methacrylate cuvette with dimensions $10\times10\times45$ $mm^3$ filled with approximately 4.0 ml of 65 µM MB solution. Each sample was irradiated by a UV-lamp (UVP LLC, Model B-100AP), and the surface of the sample was illuminated by a constant intensity of ~10 $mW/cm^2$ at $\lambda=365$ nm. Each irradiation interval was 30 minutes long, and the illumination area on the photocatalytic samples was kept at 27 $cm^2$. Before each radiation interval, the absorbance spectra of the solution were measured through the sides of the cuvette without the sample. The absorption peak at $\lambda=664$ nm for the MB solution was used as a measurement for photo-degradation.

Results and Discussions

Morphological and Structural Characterization

Each two-layer sample was made by first depositing roughly 500 nm of $WO_3$, on top of which roughly 500 nm of $TiO_2$ was added. The cross-sectional SEM image of the $TiO_2$/ $WO_3$ thin films sample is shown in FIG. 1.2A. The two layers can be seen by different shades of gray in the SEM image, with a thickness of each layer approximately d=500 nm. As a comparison, in FIG. 1.2B, the cross-sectional SEM image of the $TiO_2/WO_3$ OAD nanorod samples is shown. The surface consists of an array of aligned nanorods with the rods tilted towards the direction of the incident vapor. The nanorod array has a density of $\eta\cong40$ rods/µm$^2$, an average length of l=1.33 µm, an average diameter of D=45 nm, and a tilting angle of $\beta=55°$. The actual surface area is about 7.5 times the projected area. The $TiO_2$ layer area is about 3.75 times the area of the projected $TiO_2$ surface (assuming half the nanorod length is from $TiO_2$). To confirm the composition of the nanorods, the component of the cross-section OAD nanorod array was mapped by EDX, with the resulting Ti and Si compositional mappings shown in FIGS. 1.2C and 1.2D. The EDX peaks for W (M-α, 1.775 eV) and Si (K-α, 1.740 eV) cannot be resolved by the energy analyzer, so the mapping for Si was used since its signal was more apparent from the substrate. From these images it can be seen that composition of Si (W) is found to be more dense towards the bottom (surface) of the substrate, while the mapping of Ti is found to be more dense towards the top of the image, confirming our expected composition. The integrated composition profiles from EDX for both Si (W) and Ti as a function of distance (from substrate to the top of the two-layer nanorod array) are shown in FIG. 1.2E. The cross-sectional SEM images of a $TiO_2/WO_3$ GLAD sample (FIG. 1.2F), shows an array of vertically aligned nanorods, and they have a density of $\eta\cong10$ rods/µm$^2$, an average length of l=800 nm and an average diameter on top of D=80 nm. The estimated actual surface area is about 3 times the projected area. The $TiO_2$ layer is about 1.5 times the projected $TiO_2$ surface area. Compared to the OAD nanorods, the GLAD nanorods are shorter, wider, and less dense.

The single layer $TiO_2$ samples had similar morphological properties to the two-layered samples. The thin film of $TiO_2$ was found to be approximately 500 nm thick. The OAD $TiO_2$ samples had an estimated density of $\eta\cong30$ rods/µm$^2$, an average vertical thickness of h≈500 nm, an average diameter of D=40 nm, and the tilting angle $\beta=50°$. The surface area is 3 times the projected area. The GLAD $TiO_2$ nanorod array had an estimated density of $\eta\cong10$ rods/µm$^2$, an average length of l=400 nm and an average diameter on top of D=65 nm. The surface area is estimated to be roughly 1.8 times the projected area.

The crystalline structures of these three two-layer structures were characterized by x-ray diffraction (XRD) and Raman spectroscopy. FIG. 1.3A shows the XRD patterns of the two-layer thin film at various temperatures. The as-deposited two-layer thin film sample showed no distinct XRD peaks, which corresponds to the amorphous phase. After annealing the samples at $T_a=300°$ C. for 2 hours, three sharp peaks at $\theta=25.5°$, 33°, and 48°, corresponding to the (101), (112), and (200) orientations of the anatase phase of $TiO_2$, were observed. After annealing at $T_a=400°$ C. for 2 hours, new XRD peaks appear at $\theta=22°$, 24°, 28°, 34°, and 53°. Those peaks correspond to the (200), (002), (112), (120), (300), and (420) crystal orientations of the orthorhombic phase of $WO_3$. The XRD patterns of the as-deposited OAD two-layer nanorod samples, shown in FIG. 1.3B, are also amorphous. After annealing at $T_a=300°$ C. for 2 hours, the XRD patterns show peaks corresponding to the crystal orientations of the anatase phase of $TiO_2$. After annealing at $T_a=400°$ C. for 2 hours, XRD peaks of the orthorhombic phase of $WO_3$ were observed, similar to the two-layer thin film sample. However, the GLAD two-layer samples exhibited different structural changes (FIG. 1.3C). The as-deposited GLAD sample is still amorphous. After annealing at $T_a=300°$ C. for 2 hours, no detectable XRD peaks are present, again revealing the amorphous phase for both $TiO_2$ and $WO_3$. However, after annealing at $T_a=400°$ C. for 2 hours, peaks corresponding to both the anatase phase of $TiO_2$, and the orthorhombic phase of WO$_3$ were observed. Compared to the OAD two-layer structure, the GLAD TiO$_2$ nanorods became more orientated, while the WO$_3$ nanocrystals oriented more randomly.

The XRD pattern for the single layer TiO$_2$ structures was also investigated and found to correspond directly with the TiO$_2$ layer of the two-layer structures. These results show the phase transition temperatures for TiO$_2$ remain the same in both single-layer, and two-layer morphologies.

The structural changes for the two-layer samples at different annealing temperatures were also investigated by Raman spectroscopy. The results confirm the XRD results and show distinct peaks for both anatase TiO$_2$ and orthorhombic WO$_3$. For the thin films samples shown in FIG. 1.4A, the as-deposited spectrum shows only the Raman peaks from the silicon substrate at $\Delta v=300$ cm$^{-1}$, $\Delta v=510$ cm$^{-1}$, and $\Delta v=925\sim1025$ cm$^{-1}$, confirming an amorphous phase for the deposited materials. The sample annealed at T$_a$=300° C. shows distinct peaks at $\Delta v=150$ cm$^{-1}$ and $\Delta v=625$ cm$^{-1}$ corresponding to the anatase phase of TiO$_2$ (D. Wang, J. Zhao, B. Chen, C. Zhu, *Journal of Physics: Condensed Matter* 20, 085212 (2008), which is herein incorporated by reference for the corresponding discussion). The peak at $\Delta v=150$ cm$^{-1}$ is known to be the O—Ti—O vibrational mode of anatase TiO$_2$ (T. Ohsaka, F. Izumi, Y. Fujiki, *Journal of Raman Spectroscopy* 7, 321 (1978); K. Gao, *Physica Status Solidi B* 244, 2597 (2007), which is herein incorporated by reference for the corresponding discussion). After annealing at T$_a$=400° C., the Raman spectra shows a new peak at $\Delta v=800$ cm$^{-1}$, corresponding to the O—W$^{6+}$—O vibrational mode of the orthorhombic phase of WO$_3$ (K. J. Lethy, D. Beena, R. Vinod Kumar, V. P. Mahadevan Pillai, V. Ganesan, V. Sathe, *Applied Surface Science* 254, 2369 (2008); Y. P. He, Y. P Zhao, *Journal of Physical Chemistry C* 112, 61 (2007), which are herein incorporated by reference for the corresponding discussion). For the OAD two-layer sample, the as-deposited sample shows no Raman peaks other than those for the Si substrate (FIG. 1.4B). The sample annealed at T$_a$=300° C. shows distinct peaks for the anatase phase of TiO$_2$. After annealing at T$_a$=400° C. for 2 hours, a peak corresponding to the orthorhombic phase of WO$_3$ appears. For the two-layer GLAD sample, the spectra for the as-deposited sample and sample annealed at T$_a$=300° C. show no distinct Raman peaks other than those from the Si background (FIG. 1.4C). However, after annealing at T$_a$=400° C., Raman peaks for the anatase phase of TiO$_2$ and for the orthorhombic phase of WO$_3$ can be seen in the spectra. These Raman results confirm our XRD patterns, and reveal the same phase changes for TiO$_2$ and WO$_3$ for all morphologies and temperatures with the structural changes of the three samples before and after annealing summarized in Table 1.

Optical Properties

The optical absorbance spectra for all two-layer samples are shown in FIG. 1.5. FIG. 1.5A shows the two-layer thin film samples at all annealing temperatures. The oscillations that extend throughout the graph are from the constructive and destructive interference of light waves in the thin films. By visual inspection, we can see that the apparent wavelength absorption edge for the as-deposited sample starts around $\lambda=360$ nm, and increases with annealing temperature. For the thin film sample annealed at T$_a$=300° C., the absorption edge slightly increases to $\lambda=370$ nm, and for the sample annealed at T$_a$=400° C., the edge pushes further to $\lambda=390$ nm. For the OAD two-layer samples, similar trends are observed (FIG. 1.5B). The as-deposited OAD sample has a wavelength absorption edge around $\lambda=350$ nm, with the edge being slightly larger for the sample annealed at T$_a$=300° C. The spectrum for the OAD sample annealed at T$_a$=400° C. shows a much broader absorption edge, starting around $\lambda=385$ nm. In addition to the increased absorption edge, the tail of the spectrum is much larger for the sample annealed at T$_a$=400° C. For the GLAD samples, the spectra closely follow the results for the thin films (FIG. 1.5C). The as-deposited GLAD has an absorption edge around $\lambda=355$ nm, the sample annealed at T$_a$=300° C. has an edge around $\lambda=365$ nm, and the sample annealed at T$_a$=400° C. has an edge around $\lambda=370$ nm. In addition to the lateral movement of the absorption spectra to higher wavelengths, the intensity of the absorbance for wavelengths $\lambda \leq 400$ nm also increases with annealing temperature for every sample.

For all of the two-layer samples, the apparent wavelength absorption edge increases as the post-deposition annealing temperature increases, which means that the effective band gap decreases with annealing temperature. The thin film and GLAD samples show small increases in the band edge, where the OAD sample shows the largest increase after annealing at T$_a$=400° C. This reveals that the optical absorbance of light in these two-layered structures is morphology dependent.

Photo-Degradation Characterization

Representative absorbance spectra of MB solution over UV exposure time, t, for the thin film, OAD, and GLAD two-layer samples annealed at T$_a$=300° C. are shown in FIG. 1.6. The spectra all show characteristic peaks for methylene blue at $\lambda=664$ nm and $\lambda=612$ nm. After UV irradiation of the sample in the MB solution for 30-minute intervals, the absorbance in all the spectra decreases, with the thin film samples showing the least amount of decay and the GLAD samples showing the most decay. In order to find the decay rates for each sample, the intensity of the $\lambda=664$ nm absorbance peak of MB was normalized by the absorbance at t=0 and plotted against UV exposure time for all of the two-layer and single-layer structures, with the plots for the two-layer samples shown in FIG. 1.7. From these plots, the decay rates were determined by fitting the data of the normalized MB absorbance intensity versus UV exposure time with a first order exponential decay equation $$\alpha(t)=\alpha_0 e^{-\kappa t}, \quad (2)$$

where $\alpha_0$ is the initial normalized absorbance intensity, t is time, and $\kappa$ is the decay rate (Y. P. He, Z. Y. Zhang, Y. P. Zhao, *Journal of Vacuum Science and Technology B* 26, 1350 (2008), which is herein incorporated by reference for the corresponding discussion). The estimated decay rate $\kappa$ for different two-layer samples annealed at different temperatures is summarized in Table II. Also, in order to compare the effectiveness of the two-layer structures, the photo-degradation rates for single layer TiO$_2$ samples are all listed in Table II.

(1) Photo-Degradation Behavior of Single-Layer TiO$_2$ Structures

The photodecay rate, k, in Table II for the TiO$_2$ single layer structures has exhibited two trends. The first trend is the surface area effect. With increasing surface area of the TiO$_2$ samples by making the thin film samples more porous with OAD or GLAD, the decay rate is also found to increase, confirming our earlier predictions. The decay rate for the as-deposited $TiO_2$ thin film sample was estimated to be $\kappa=6.15\times10^{-5}$ min$^{-1}$. The OAD sample had a decay rate of $\kappa=6.47\times10^{-4}$ min$^{-1}$, which is about 10 times higher than that for the thin film. The GLAD sample had a decay rate of $\kappa=4.33\times10^{-4}$ min$^{-1}$, which is about 7 times larger than the thin film sample. The increase in photo-degradation rate for as-deposited sample is found to be proportional to the increase in surface area for the nanorod structures, i.e. 3-fold for the OAD samples and 1.8-fold for the GLAD samples.

The second trend is the effect of the annealing. Table II shows that for different morphologies of $TiO_2$, the photo-degradation decay rates increase with increasing annealing temperature. The samples annealed at $T_a=300°$ C. have a higher decay rate than the as-deposited samples, and the gains are proportional to the increase in surface area. For the OAD sample annealed at $T_a=300°$ C., the OAD rate is 2.5 times the rate for the thin film sample, with a surface area roughly 3 times that of the thin film. For the GLAD sample annealed at $T_a=300°$ C., the decay rate is 2.0 times the rate for the thin film, with a surface area approximately 1.8 times as large. The samples annealed at $T_a=400°$ C. have a higher decay rate than the samples annealed at $T_a=300°$ C. However, this annealing temperature effect is not proportional to the surface area. The degradation rate of the thin film after annealing at $T_a=400°$ C. is comparable to that of the OAD nanorods annealed at the same temperature, and is even larger than that of GLAD nanorods. Clearly, after annealing, the crystalline structure of the $TiO_2$, rather than the surface area, plays the dominant role for determining the decay rate. The amount of crystalline phase changes from amorphous to anatase in OAD and GLAD nanorods could be significantly less than that in the thin film, which causes the fast increase in decay rate for thin film sample.

(2) Photo-Degradation Behavior of Two-Layer $TiO_2/WO_3$ Structures

The photo-degradation decay rates for the two-layer samples displayed some similarities to the single layer samples, but also had an interesting difference. The as-deposited two-layer thin film sample shows little degradation over time (FIG. 1.7A) with a decay rate estimated to be $\kappa=1.80\times10^{-4}$ min$^{-1}$. The as-deposited OAD sample showed an improved degradation, with a decay rate $\kappa=1.34\times10^{-3}$ min$^{-1}$, which is over 7 times that of the thin film, while the as-deposited GLAD sample showed superior photo-degradation abilities, with a rate $\kappa=4.81\times10^{-3}$ min$^{-1}$. This rate is about 27 times the rate of the thin film sample. The increase in decay rate for OAD sample is comparable to the $TiO_2$ surface area enlargement (5 times), but the decay rate for GLAD sample is far larger than the area increment, 27 versus 3. A possible explanation for this huge enhancement in decay rate has to do with the interfacial area between the $TiO_2$ and $WO_3$ layers: the interfacial area between $TiO_2$ and $WO_3$ in GLAD structure is much larger than that in OAD structure, and the total number of charge separations is greatly enhanced, thus the decay rate increases significantly. This increment of interfacial area is due to the growth nature of OAD and GLAD. FIG. 1.1 shows a simplified growth model to illustrate the interfacial areas of the OAD and GLAD nanorod arrays. For OAD process, since the substrate is held still and both the $TiO_2$ and $WO_3$ vapors come from the same angle, the $TiO_2$ nanorod layer is deposited directly on top of the $WO_3$ nanorod array as shown in FIG. 1.1A. The intersection of the two materials is estimated to be proportional to the diameter of the nanorod. For GLAD deposition, since the substrate continuously rotates azimuthally, the resulting nanorod density is much lower than that of the OAD nanorods (10/μm$^2$ comparing to 40/μm$^2$), and the separation between two adjacent nanorods is much larger. Thus, although the incoming $TiO_2$ vapor still has the same incident angle as $WO_3$ vapor, it will have the opportunity to coat the top and side surface of the $WO_3$ nanorods, as shown in FIG. 1.1B. Thus, a relatively high interfacial area between $TiO_2$ and $WO_3$ is predicted, compared to that of the OAD sample. According to Irie et al. (H. Irie, H. Mori, K. Hashimoto, *Vacuum* 74, 625 (2004), which is herein incorporated by reference for the corresponding discussion), this may be the primary reason for the high decay rate of GLAD sample.

For the two-layer samples annealed at $T_a=300°$ C. for 2 hours, the photo-degradation rates are all enhanced, shown by a larger rate constant for each sample (FIG. 1.6B). The two-layer thin films sample had a rate constant of $\kappa=1.64\times10^{-3}$ min$^{-1}$, almost a 10-fold improvement compared to its as-deposited state, the OAD sample had a decay rate of $\kappa=3.81\times10^{-3}$ min$^{-1}$, about 3 times better, and the GLAD sample had a decay rate of $\kappa=6.92\times10^{-3}$ min$^{-1}$. However, for samples annealed at $T_a=400°$ C., shown in FIG. 1.6C, the photo-degradation rates for all the two-layer samples decreases, compared to the samples annealed at $T_a=300°$ C. For the thin films, the decay rate is $\kappa=1.22\times10^{-3}$ min$^{-1}$, while for the samples of OAD and GLAD, their decay rates dropped to $\kappa=1.25\times10^{-3}$ min$^{-1}$ and $\kappa=3.61\times10^{-3}$ min$^{-1}$ respectively. This trend is not the same as the single layer samples. Clearly, the samples annealed at 300° C. give the best photo-degradation results. Structurally, the difference between the two-layer samples annealed at $T_a=300°$ C. and $T_a=400°$ C. is the phase change of $WO_3$, from amorphous to orthorhombic. It has been shown by Higashimoto et al. that the conduction band level of amorphous $WO_3$ is closer to that of the anatase $TiO_2$ (M. Miyauchi, A. Nakajima, T. Watanabe, K. Hashimoto, *Chemistry of Materials* 14, 4714 (2002); H. Irie, H. Mori, K. Hashimoto, *Vacuum* 74, 625 (2004), which are herein incorporated by reference for the corresponding discussion), and so the photogenerated electrons can transfer between the two easier than when the conduction band for $WO_3$ is in the position for the orthorhombic phase. Our results confirm this assertion.

(3) Comparing the Photo-Degradation Behaviors of Two-Layer $TiO_2/WO_3$ and Single Layer $TiO_2$ Structures It is also very interesting to compare the decay rate of the two-layer samples to that of their corresponding single layer samples. The data in the brackets in Table II show the ratio of the decay rate of two-layer structure to that of single layer structure. Those ratios show some interesting trends: both the thin film and OAD samples show the same trend for annealing at different temperature, while the GLAD samples show a very different trend. For the thin film and OAD samples, the decay ratio is about 2.0-3.0 for the as-deposited samples, while the ratio increases to about 5 when the sample are annealed at $T_a=300°$ C. The 2-3 times enhancement of the photocatalytic behavior due to the two-layer thin film is well documented in literature (H. Xu, G. Vanamu, Z. Nie, H. Konishi, R. Yeredla, J. Phillips, Y. Wang, *Journal of Nanoma-* terials 2, 1 (2006); J. Sa, M. Fernandez-Garcia, J. A. Anderson, *Catalysis Communications* 9, 1991 (2008); C. Shifu, C. Lei, G. Shen, C. Gengyu, *Powder Technology* 160, 198 (2005), which are herein incorporated by reference for the corresponding discussion). This is mainly due to the effect of electron-hole pair charge separation. Annealing at $T_a=300°$ C., this ratio becomes more than doubled for both thin film and OAD samples, and from Table I, the $TiO_2$ layer becomes the anatase phase while the $WO_3$ layer is still amorphous for these two kinds of samples. The only possible reason for such an improved ratio is due to better charge-separation at the $TiO_2/WO_3$ interface after the phase transition of $TiO_2$, and it is consistent with the results by Higashimoto et al. (S. Higashimoto, Y. Ushiroda, M. Azuma, *Top. Catal.* 47, 148 (2008); S. Higashimoto, N. Kitahata, K. Mori, M. Azuma, *Catalysis Letters* 101, 49 (2004), which are herein incorporated by reference for the corresponding discussion). However, after the samples are annealed at $T_a=400°$ C., the ratio becomes smaller than unity, ~0.37, which means the two-layer samples are worse than single layer samples. The only difference for samples annealed at $T_a=400°$ C. is the phase change of $WO_3$ from amorphous state to the orthorhombic phase. This change clearly shows that the charge separation has been significantly reduced once the $WO_3$ layer becomes orthorhombic, and even produced a negative impact on the decay rate.

For the GLAD sample, the ratio for as-deposited nanorods is 11.1, and for annealed samples at $T_a=300°$ C., the ratio is 10.2, which is not significantly different from as-deposited samples. This is understandable since from Table I the structures of both $TiO_2$ and $WO_3$ layers did not change before and after annealing at $T_a=300°$ C. However, this ratio is significantly higher than that of the thin film or OAD samples. As discussed above, the significant increase of the decay rate for OAD samples could be due to additional $TiO_2/WO_3$ interfacial area formed during deposition. This result further demonstrates this idea. The ratio of samples annealed at $T_a=400°$ C. is significantly decreased, and this qualitatively agrees with the results from the thin film and OAD samples.

Conclusion

This study has shown several ways to enhance the photocatlaytic activity of $TiO_2$. By increasing the surface area of $TiO_2$ through different morphologies, such as thin film, tilted nanorod arrays, and vertical nanorod arrays, we are able to find that the photo-degradation decay rate of an organic dye solution is roughly proportional to the actual surface area of the photocatalyst structure. The crystalline structure of the $TiO_2$ is also very important for the decay rate. The addition of a layer of $WO_3$ could cause the charge separation effect, which can enhance the photo-degradation behavior. The crystallinity of the $WO_3$ layer is also very critical for the overall photocatalytic behavior. When the $WO_3$ layer is amorphous, the decay rate could increase 5-10 times; if the $WO_3$ layer is orthorhombic, the photo-degradation rate could be greatly reduced, and could be even worse than that of a single layer structure. The interfacial area of the $TiO_2/WO_3$ could play a very important role in determining the decay rate. Not intending to be bound by theory, these results reveal the delicacy to design good photocatalyst structures, and the important parameters affecting the catalytic performance. The results further confirm that the versatile OAD and GLAD method can ensure the most beneficial coupling of $TiO_2$ and $WO_3$ for photocatalytic behaviors.

TABLE I

Example 1. Crystal phase for two-layer $TiO_2/WO_3$ samples at different annealing temperatures.

| Two-layer sample | As-deposited | | $T_a = 300°$ C. | | $T_a = 400°$ C. | |
| --- | --- | --- | --- | --- | --- | --- |
| | $TiO_2$ | $WO_3$ | $TiO_2$ | $WO_3$ | $TiO_2$ | $WO_3$ |
| Thin film | Amorphous | Amorphous | Anatase | Amorphous | Anatase | Orthorhombic |
| OAD | Amorphous | Amorphous | Anatase | Amorphous | Anatase | Orthorhombic |
| GLAD | Amorphous | Amorphous | Amorphous | Amorphous | Anatase | Orthorhombic |

TABLE II

Example 1. Photo-degradation decay rate of MB solution for single layer $TiO_2$ and two-layer $TiO_2/WO_3$ nanostructures at different annealing temperatures.

| | | As-deposited | $T_a = 300°$ C. | $T_a = 400°$ C. |
| --- | --- | --- | --- | --- |
| Single layer samples | Thin Film | $6.15 \times 10^{-5}$ min$^{-1}$ | $3.22 \times 10^{-4}$ min$^{-1}$ | $3.25 \times 10^{-3}$ min$^{-1}$ |
| | OAD | $6.47 \times 10^{-4}$ min$^{-1}$ | $8.08 \times 10^{-4}$ min$^{-1}$ | $3.34 \times 10^{-3}$ min$^{-1}$ |
| | GLAD | $4.33 \times 10^{-4}$ min$^{-1}$ | $6.75 \times 10^{-4}$ min$^{-1}$ | $1.80 \times 10^{-3}$ min$^{-1}$ |
| Two-layer samples | Thin Film | $1.80 \times 10^{-4}$ min$^{-1}$ (2.9)* | $1.64 \times 10^{-3}$ min$^{-1}$ (5.0) | $1.22 \times 10^{-3}$ min$^{-1}$ (0.375) |
| | OAD | $1.34 \times 10^{-3}$ min$^{-1}$ (2.1) | $3.81 \times 10^{-3}$ min$^{-1}$ (4.7) | $1.25 \times 10^{-3}$ min$^{-1}$ (0.374) |
| | GLAD | $4.81 \times 10^{-3}$ min$^{-1}$ (11.1) | $6.92 \times 10^{-3}$ min$^{-1}$ (10.2) | $3.61 \times 10^{-3}$ min$^{-1}$ (2.0) |

*The values in the bracket are the ratio of decay rate of the two-layer sample to that of their corresponding single layer sample.

Example 2

Using two consecutive regarding glancing angle depositions at different deposition angles and with different materials, a $WO_3$-core $TiO_2$-shell nanostructure has been fabricated and has photocatalytic enhancement up to 70 times over amorphous single layer $TiO_2$ thin films, 13 times enhancement over crystalline (anatase) $TiO_2$ thin films, and 3 times enhancement over c-$TiO_2$/a-$WO_3$ two-layer thin films, with much less the load of $TiO_2$. Without being bound by any particular theory, we believe that the mechanism for the photocatalytic enhancement is from the increased density of charge separated electron-hole pairs aided by the $WO_3$ layer, the interfacial area between the two layers, and the large surface area from the porous nanostructure.

Two layered oxide nanostructures can significantly improve photocatalytic performance (A. Rampaul, I. Parkin, S. O'Neil, J. DeSouza, A. Mills, N. Elliot, *Polyhedron* 2003, 22, 35~44; W. Gao, M. Li, R. Klie, E. I. Altman, *J. Electron Spectrosc. Relat. Phenom.* 2006, 150, 136~149; X. Lin, F. Huang, J. Xing, W. Wang, F. Xu, *Acta Mater.* 2008, 56, 2699~2705, which are herein incorporated by reference for the corresponding discussion). $TiO_2$ is an effective photocatalyst under ultraviolet irradiation for decomposing volatile organic compounds (A. J. Maira, K. L. Yeung, J. Soria, J. M. Coronado, C. Belver, C. Y. Lee, V. Augugliaro, *Appl. Catal. B*. 2001, 29, 327~336; T.-X. Liu, F.-B. Li, X.-Z. Li, *J. Hazard. Mater.* 2008, 152, 347~355; F. Fresno, J. M. Coronado, D. Tudela, J. Soria, *Appl. Catal., B* 2004, 55, 159~167, which are herein incorporated by reference for the corresponding discussion), smart-windows (M. Houmard, D. Riassetto, F. Roussel, A. Bourgeois, G. Berthome, J. C. Joud, M. Langlet, *Appl. Surf. Sci.* 2007, 254, 1405~1414; C. G. Granqvist, A. Azens, P. Heszler, L. B. Kish, L. Osterlund, *Sol. Energy Mater. Sol. Cells* 2007, 91, 355~365; S. S. Madaeni, N. Ghaemi, *J. Membr. Sci.* 2007, 303, 221~233, which are herein incorporated by reference for the corresponding discussion), and water electrolysis for hydrogen production (A. Fujishima, K. Honda, *Nature* 1972, 238, 37~38; M-S. Park, M. Kang, M, *Mater. Lett.* 2008, 62, 183~187; N. Strataki, V. Bekiari, D. Kondarides, P. Lianos, *Appl. Catal. B* 2007, 77, 184~189; J. F. Houlihan, D. P. Madasci, *Mater. Res. Bull.* 1976, 11, 1191~1197; J.-L. Desplat, *J. Appl. Phys.* 1976, 47, 5102~5104, which are herein incorporated by reference for the corresponding discussion). When combined with another oxide such as $WO_3$, the spectral range of absorption is increased due to the small $WO_3$ band gap (2.8 eV, $\lambda$=443 nm) compared to $TiO_2$ (3.2 eV, $\lambda$=388 nm). This allows light with $\lambda \leq 443$ nm to be absorbed by the heterogeneous structure, and the photocatalytic activity can be extended to a larger spectral range (F. Bosc, A. Ayral, N. Keller, V. Keller, *J. Solar Energy Engineering* 2008, 130, 041006, which is herein incorporated by reference for the corresponding discussion). In addition, the $WO_3$ can act as an electron scavenger and pull the photogenerated conduction band electrons of $TiO_2$ to its own conduction band, which keeps the electron-hole pairs apart longer (charge separation), and improves the overall photocatalytic performance (X. Lin, F. Huang, J. Xing, W. Wang, F. Xu, *Acta Mater.* 2008, 56, 2699~2705; J. F. Wager, *Thin Solid Films* 2008, 516, 1755~1764, which are herein incorporated by reference for the corresponding discussion).

Many experiments have demonstrated that a two layer $WO_3$/$TiO_2$ thin film could improve the photocatalytic performance by 2-3 times as compared to a single $TiO_2$ layer (H. Irie, H. Mori, K. Hashimoto, *Vacuum* 2004, 74, 625~629, which is herein incorporated by reference for the corresponding discussion). Further improvement depends on the structure design such as enlarged surface area or optimal crystalline structure. Recently we have shown that a heterostructured $TiO_2$/$WO_3$ nanorod array can significantly improve the photocatalytic performance by 10 times over single layered $TiO_2$ nanorod arrays (W. Smith, Y.-P. Zhao, *J. Phys. Chem. C* 2008, 112, 19635~19641, which is herein incorporated by reference for the corresponding discussion). This improvement is mainly due to the surface area increase in the $TiO_2$ layer and the relative good match of crystalline states between the two layers (S. Higashimoto, N. Kitahata, K. Mori, M. Azuma, *Catal. Lett.* 2004, 101, 49~51; S. Higashimoto, Y. Ushiroda, M. Azuma, *Top. Catal.* 2008, 47, 148~154, which are herein incorporated by reference for the corresponding discussion). A rational design to further improve photocatalytic behavior would be to maximize the charge separation effect, or in other words, the surface density of the separated charges, which could be accomplished by maximizing the $WO_3$—$TiO_2$ interfacial area. These parameters would be optimized in a core-shell nanostructured morphology.

Core-shell nanostructures have received much attention lately due to their unique electronic and charge transfer properties and have been used to improve photocatalytic performance (Y. Li, X. Xu, D. Qi, C. Deng, P. Yang, X. Zhang, *J. Proteome Res.* 2008, 7, 2526~2538; W.-J. Chen, P.-J. Tsai, Y.-C. Chen, *Small* 2008, 4, 485~491; J.-H. Xu, W.-L. Dai, J. Li, Y. Cao, H. Li, K. Fan, *J. Photochem. Photobiol. A* 2008, 195, 284~294; X.-L. Yang, W.-L. Dai, C. Guo, H. Chen, Y. Cao, H. Li, H. He, K. Fan, *J Catal.* 2005, 234, 438~450; P. Cheng, C. Deng, X. Dai, B. Li, D. Liu, J. Xu, *J. Photochem. Photobiol. A* 2008, 195, 144~150, which are herein incorporated by reference for the corresponding discussion.). Yang et al. created $TiO_2$/$WO_3$ core-shell nanospheroids, and found that different loading percentages of $WO_3$ on top of $TiO_2$ led to improved photocatalytic behavior (X.-L. Yang, W.-L. Dai, C. Guo, H. Chen, Y. Cao, H. Li, H. He, K. Fan, *J Catal.* 2005, 234, 438~450, which is herein incorporated by reference for the corresponding discussion). These improved results were determined to be due to the interaction between the tungsten and $TiO_2$ layers, creating abundant oxygen defects in the lattice. Cheng et. al. found similar results when adding $WO_3$ to nano-crsytalline $TiO_2$ in dye-sensitized solar cells (P. Cheng, C. Deng, X. Dai, B. Li, D. Liu, J. Xu, *J. Photochem. Photobiol. A* 2008, 195, 144~150, which are herein incorporated by reference for the corresponding discussion). In this case, the enhanced photocatalytic properties were determined to be from the $WO_3$ layer reducing surface states of $TiO_2$, which led to the suppression of interfacial charge recombination.

So far, the most popular way to fabricate core-shell structures is by a self-assembly wet-chemistry method (H. Irie, H. Mori, K. Hashimoto, *Vacuum* 2004, 74, 625~629; B. Huber, A. Brodyanksi, M. Scheib, A. Orendorz, C. Ziegler, H. Gnaser, *Thin Solid Films* 2005, 472, 114~124; B. Huber, H. Gnaser, C. Ziegler, *Surf. Sci.* 2004, 566, 419~424; C. Guo, W.-L. Dai, Y. Cao, K. Fan, *Chem. J. Chin. Univ.* 2003, 24, 1097~1099; M. A. Cortes-Jacome, C. Angeles-Chavez, M. Morales, E. Lopez-Salinas, J. A. Toledo-Antonio, *J. Solid State Chem.* 2007, 180, 2682~2689; M. Sastry, A. Swami, S. Mandal, P. R. Selvakannan, *J. Mater. Chem.* 2005, 15, 3161~3174; Q. Wei, J. Mu, *J. Dispersion Sci. Technol.* 2007, 28, 916~919, which are herein incorporated by reference for the corresponding discussion). Although this method is very simple to fabricate uniform core-shell nanoparticles, it has some disadvantages. Since the core-shell structures are formed in a chemical reaction, the crystalline structure is not easy to manipulate. This also leads to a random orientation of particles, which can be a problem for optimized absorbance. In addition, the nanoparticles are usually suspended in a solution, and thus the reuse of these particles becomes an issue.

Those problems could be overcome by core-shell nanostructures fabricated by a glancing angle deposition (GLAD) technique. GLAD is a nanofabrication technique that has shown the ability to create uniform aligned arrays of vertical nanorods from numerous materials (N. O. Young, J. Kowal, Nature 1959, 183, 104~105; T. Motohiro, Y. Taga, Appl. Opt. 1989, 28, 2466~2482; K. Robbie, M. J. Brett, J. Vac. Sci. Technol. A 1997, 15, 1460~1465; K. Robbie, M. J. Brett, A. Lakhtakia, Nature 1996, 384, 616; R. Messier, V. C. Venugopal, P. D. Sunal, J. Vac. Sci. Technol. A 2000, 18, 1538~1545; M. Malac, R. F. Egerton, J. Vac. Sci. Technol. A 2001, 19, 158~166; Y.-P. Zhao, D.-X. Ye, G.-C. Wang, T.-M. Lu, Nano Lett. 2002, 2, 351~354; D.-X. Ye, Y.-P. Zhao, G.-R. Yang, Y.-G. Zhao, G.-C. Wang, T.-M. Lu, Nanotechnology 2002, 13, 615~618; Y.-P. Zhao, D.-X. Ye, P.-I. Wang, G.-C. Wang, T.-M. Lu, Int. J. Nanosci. 2002, 1, 87~97; J. Fan, Y.-P. Zhao, J. Vac. Sci. Technol. B 2005, 23, 947~953; W. Smith, Z.-Y. Zhang, Y.-P. Zhao, J. Vac. Sci. Technol. B 2007, 25, 1875~1881; Y.-P. He, Y.-P. Zhao, J. S. Wu, Appl. Phys. Lett. 2008, 92, 063107; Y.-P. He, Z.-Y. Zhang, C. Hoffmann, and Y.-P. Zhao, Adv. Funct. Mater. 2008, 18, 1676~1684; R. Blackwell, Y.-P. Zhao, J. Vac. Sci. Technol. B 2008, 26, 1344~1349, which are herein incorporated by reference for the corresponding discussion). This technique is based on physical vapor deposition and shadowing effect by positioning the substrate normal at a very large angle ($\alpha \geq 70°$) with respect to the incident vapor direction. When the substrate is rotated azimuthally at a constant speed, an array of vertically aligned nanorods is formed. The versatility of this technique allows for several materials to be deposited on top of each other, and the formed hetero-nanorod structures have been demonstrated by several groups (S. V. Kesapragada, D. Gall, Thin Solid Films 2006, 494, 234~239; Y.-P. He, J.-S. Wu, Y.-P. Zhao, Nano Lett. 2007, 7, 1369~1375; Y.-P. He, J.-X. Fu, Y. Zhang, Y.-P. Zhao, L. Zhang, A. Xia, J. Cai, Small 2007, 3, 153~16; A. K. Kar, P Morrow, X.-T. Tang, T. C. Parker, H. Li, J.-Y. Dai, M. Shima and G.-C. Wang, Nanotechnology 2007, 18, 295702; P. Morrow, X.-T. Tang, T. C. Parker, M. Shima, G.-C. Wang, Nanotechnology 2008, 19, 065712; J.-X. Fu, Y.-P. He, Y.-P. Zhao, IEEE Sensors 2008, 8, 989~997, which are herein incorporated by reference for the corresponding discussion). Using this dynamic physical vapor deposition method and combining the morphological information of the GLAD nanorod arrays, we have designed a $WO_3$-core/$TiO_2$-shell nanorod array which shows significant photocatalytic enhancement (up to 70 times) over amorphous $TiO_2$ thin films, anatase $TiO_2$ films (13 times), and c-$TiO_2$/a-$WO_3$ two-layer thin films (3 times), with only $1/7^{th}$ load of $TiO_2$. These results show that we have successfully developed a unique physically deposited core-shell nanostructured array that not only has enhanced photocatalytic capabilities, but can do so with a significantly reduced (85% less) amount of the active photocatalyst, $TiO_2$.

Experimental

The $TiO_2$/$WO_3$ core-shell nanorod array was fabricated in a custom-built electron beam evaporation system (Torr International, New Windsor, N.Y.). The source materials used to deposit were $TiO_2$ (99.9%, Kurt J. Lesker) and $WO_3$ (99.8%, Alfa Aesar) with no other gases present in the chamber during depositions, and the chamber background pressure was at $1-2 \times 10^{-6}$ Torr. Si wafers and glass microscope slides were both used as substrates for different characterizations. The deposition thickness and rate were both monitored by a quartz crystal microbalance (QCM) facing the vapor flux direction directly. The core-shell structure was fabricated through two consecutive GLAD depositions of different materials at different incident angles as shown in FIG. 2.1A. For the $WO_3$ deposition, the deposition rate was fixed at 0.4 nm/s, and for the $TiO_2$ deposition the rate was fixed at 0.3 nm/s. To deposit the $WO_3$ nanorod "core" structure, the GLAD procedure was used, with the substrate positioned $\alpha = 86°$ from the incident evaporation direction and an azimuthal rotation speed of 0.5 rev/s. The deposition stopped when the QCM reached 5 μm. After this deposition, the samples were examined in an SEM to determine the height, h, and separation, d, of the nanorods, which would determine the "shell" deposition angle $\theta_s$, tan $(\theta_s) = d/h$, according to the geometric shadowing effect. A diagram for this shadowing effect is shown in FIG. 2.1A. The substrate was then placed back into the chamber at an angle of $\theta_s$ with respect to the incident vapor flux, and $TiO_2$ was deposited at a rate of 0.3 nm/s with the substrate rotating azimuthally at 0.5 rev/s until the QCM read 75 nm. After the depositions, some samples were annealed in air for 2 hours at $T_a = 300°$ C., and $T_a = 400°$ C., respectively. The samples were characterized by a field-emission scanning electron microscopy (SEM) and X-ray diffraction (XRD, PANalytical X'Pert PRO MRD). The photocatalytic activity of each sample was characterized by the photodegradation of methylene blue (MB: $C_{16}H_{18}ClN_3S$, Alfa Aesar) in an aqueous solution. The samples were cut into a $9.0 \times 30.0$ mm$^2$ rectangular shape, and placed into a clear methacrylate cuvette ($10 \times 10 \times 45$ mm$^3$) filled with approximately 4.0 ml of 65 μM MB solution. Each sample was irradiated by a UV-lamp (UVP LLC, Model B-100AP), with the surface of each sample being illuminated by a constant intensity of ~10 mW/cm$^2$ at $\lambda = 365$ nm. The absorption spectrum of the MB solution was then measured by a UV-Vis spectrophotometer (JASCO V-570). Each irradiation interval was 10 minutes long, and the illumination area on the photocatalytic samples was kept at 27 cm$^2$. Before and after each radiation interval, the absorbance spectrum of the solution was measured through the sides of the cuvette without the sample. The absorption peak at $\lambda = 664$ nm for the MB solution was used as a measurement for photo-degradation.

Results and Discussion

FIG. 2.1B shows a representative SEM cross-section image of the as-deposited $WO_3$-core nanorod array. All the nanorods stand on the surface vertically with a smaller diameter close to the bottom (Si substrate) and larger diameter on the top. From FIG. 2.1B, we obtain $h = 1.5 \pm 0.1$ μm, $d = 280 \pm 20$ nm, and the average diameter at the bottom $D_b$ of the nanorods is $25 \pm 5$ nm while the average diameter $D_t$ at the top is $220 \pm 10$ nm. The density of the nanorod array is estimated as 9 rods/μm$^2$. Thus the "shell" deposition angle $\theta_s$ of $TiO_2$ is determined to be 11°. FIG. 2.1C shows the cross-sectional SEM image of the nanorod array after $TiO_2$ deposition, and the nanorods appear fatter than $WO_3$-core nanorods shown in FIG. 2.1B. The morphological parameters change to $h = 1.6 \pm 0.1$ μm, $D_b = 30 \pm 5$ nm, $D_t = 330 \pm 10$ nm, and $d = 150 \pm 15$ nm, with a density of roughly 9 rods/μm$^2$. The nanorod array has about the same density as the $WO_3$ "core" nanorods, revealing that the addition of $TiO_2$ did not change the overall lateral arrangement of the nanorod array. However, compared to the pure $WO_3$ nanorods, the core-shell nanorods became fatter and taller. To verify the distribution of the $TiO_2$ layer on top of the $WO_3$ nanorods, energy-dispersive X-ray spectroscopy (EDX) mapping was used to find the composition of Titanium and Tungsten across a cross-sectional image of the nanorods (FIGS. 2.1D and 2.1E). These elemental mappings show both W and Ti are almost uniformly distributed among the nanorod array, with a higher density of W than Ti. The mapping for W extends down through the substrate since the EDX peak for W (M-α, 1.775 eV) is very close to Si (K-α, 1.740 eV), which was used as our substrate for EDX characterization. The mappings confirm that the $TiO_2$ "shell" is indeed coated along the $WO_3$ "core" nanorod, ensuring the intended core-shell morphology. A detailed image of a single core-shell nanorod was observed by TEM, shown in FIG. 2.1F. The image shows a single core-shell nanorod with h~1.4 μm, $D_b$~50 nm, and $D_t$~300 nm. This image also shows that the nanorods are not uniform along their edges, rather they fan out and have a very porous surface. These results confirm our SEM estimations of the dimensions of each individual nanorod.

The crystal properties of the as-deposited and annealed core-shell nanorod arrays were determined by X-ray diffraction (XRD), and the corresponding XRD patterns are shown in FIG. 2.3. The as-deposited sample shows no distinct diffraction peaks, corresponding to the amorphous phase for both materials. After annealing at $T_a$=300° C., the XRD pattern shows sharp peaks at 25.5° and 48°, corresponding to the (101) and (200) crystal orientations of the anatase phase of $TiO_2$. No peaks are present for $WO_3$, showing that at $T_a$=300° C. the $TiO_2$ layer has become crystalline and the $WO_3$ layer is still amorphous. After further annealing at $T_a$=400° C., distinct peaks appear at 22°, 23°, 24°, 28°, 34°, 51°, 54°, 55° corresponding to the (200), (020), (002), (112), (120), (420), (211), and (201) crystal orientations of the orthorhombic phase of $WO_3$.

The photocatalytic behavior of the annealed core-shell nanorods was measured by the photo-degradation of methylene blue (MB) over UV irradiation time. The absorbance intensity of the λ=664 nm peak, which is characteristic for MB, was used to determine the decay rate of the photocatalytic reaction. The MB absorbance spectra after irradiating the core-shell sample annealed at $T_a$=300° C. for 10 minute intervals is shown in FIG. 2.3A. As the irradiation time increases, the two absorption peaks at λ=612 nm and λ=664 nm of the MB solution decreased, while the shape of the spectra kept the same. A similar trend was observed for the sample annealed at $T_a$=400° C.

To determine the decay rate of the as-deposited and annealed core-shell samples, the intensity of the absorbance peak of MB at λ=664 nm was plotted against irradiation time t, and is shown in FIG. 2.3B. Also included in the figure are decay rate plots for an amorphous $TiO_2$ thin film (500 nm thick), a crystalline (anatase) $TiO_2$ thin film (500 nm thick), a crystalline (anatase) $TiO_2$ nanorod array (1.5 μm long), and a crystalline $TiO_2$ (500 nm)/amorphous $WO_3$ (500 nm) two-layer thin film as a comparison (W. Smith, Y.-P. Zhao, *J. Phys. Chem. C* 2008, 112, 19635~19641, which is herein incorporated by reference for the corresponding discussion). From the exponential decay fittings, the decay rate for the core-shell sample annealed at $T_a$=300° C. was determined to be κ=4.33×$10^{-3}$ $min^{-1}$, and for the sample annealed at $T_a$=400° C., was κ=1.75×$10^{-3}$ $min^{-1}$. Comparing these decay rates with amorphous $TiO_2$ thin films (κ=6.15×$10^{-5}$ $min^{-1}$), anatase $TiO_2$ thin films (κ=3.22×$10^{-4}$ $min^{-1}$), anatase $TiO_2$ nanorods (κ=2.51×$10^{-3}$ $min^{-1}$), and a crystalline $TiO_2$/amorphous $WO_3$ two-layer thin film (κ=1.64×$10^{-3}$ $min^{-1}$), the decay rate of the 300° C. annealed core-shell sample is roughly 70 times, 13 times, 2 times, and 3 times better than each sample, respectively.

In addition, compared to the $TiO_2$ thin film the amount of $TiO_2$ deposited onto the $WO_3$ "core" (~75 nm), is far less than that on the film (500 nm). The $TiO_2$ nanorod array used as a comparison has a length (1.5 μm) comparable to the length of the core-shell nanorods. By adding a layer of $WO_3$ under the $TiO_2$, the decay rate doubles while the length of $TiO_2$ is kept almost the same, showing the addition of $WO_3$ has a beneficial effect. Our experiments also found that for pure $TiO_2$ nanorod arrays, the photo decay rate under the same experimental conditions increases proportionally with the nanorod length. This increase in $TiO_2$ surface area can be one factor that is responsible for the increase in photocatalytic activity in the core-shell nanorods, since the $TiO_2$ is more porous than a thin film. To quantify this result, we can define a loading percentage for $TiO_2$ as the amount of the active photocatalyst used compared to the amount of the overall material used in the photocatalytic reaction. If we divide the reaction rate by this loading percentage, we can determine a relationship between the amount of $TiO_2$ used and the photodegradation abilities, with units ($nm^{-1}$ $min^{-1}$), or decay rate per nm $TiO_2$. Calculating this ratio for each sample, the amorphous $TiO_2$ thin film has a ratio of 1.23×$10^{-7}$ $nm^{-1}$ $min^{-1}$, the anatase $TiO_2$ film has 6.44×$10^{-7}$ $nm^{-1}$ $min^{-1}$, the anatase $TiO_2$ nanorod array has 3.33×$10^{-6}$ $nm^{-1}$ $min^{-1}$, the c-$TiO_2$/a-$WO_3$ has 3.28×$10^{-1}$, and $nm^{-1}$ $min^{-1}$, the core-shell sample annealed at $T_a$=300° C. has 5.77×$10^{-5}$ $nm^{-1}$ $min^{-1}$, and the core-shell sample annealed at $T_a$=400° C. has 2.33×$10^{-5}$ $nm^{-1}$ $min^{-1}$. From these ratios we can see that the core-shell nanostructures are much more efficient in the amount of photodegradation abilities that can be extracted per nm of $TiO_2$ deposited. For the core-shell nanostructures annealed at $T_a$=300° C., this ratio is 470 times, 90 times, 17 and 18 times more efficient than the amorphous $TiO_2$ film, anatase $TiO_2$ film, anatase $TiO_2$ nanorods, and multi-layered $TiO_2$/$WO_3$ films. This huge improvement in the decay rate per amount of $TiO_2$ used can be directly correlated to the relatively large amount of interfacial area between $TiO_2$ and $WO_3$, which is optimized in this core-shell morphology. Although only $1/7^{th}$ the amount of $TiO_2$ is used in the core-shell structures compared to the thin films, the large interfacial area between the layers allows the charge separation effect to become dominant, as many charge carriers are able to directly transfer in between layers.

Conclusions

Using the GLAD method to create a novel core-shell heterogeneous nanostructure, we have been able to effectively enhance the overall photocatalytic properties of $TiO_2$. This versatile method allows for controlled growth of both the $WO_3$ "core" as well as the $TiO_2$ "shell", which maximizes the interfacial area between the two materials, but also optimizes the area of $TiO_2$ that is in contact with the solution. The results show that we have created a superior heterogeneous photocatalytic nanostructure that can out perform other two-layered nanostructures with using much less the amount of the active photocatalyst, $TiO_2$.

Example 3

This Example describes the photocatalytic activity of the core-shell embodiments in the visible light range. The following structures were fabricated and tested for photodegradation of methylene blue (MB). The samples were tested by putting them into a cuvette with ~35 μM MB solution, and irradiated with different intensities of visible light. The range of visible light was from about 500 nm to 750 nm, with the strongest intensity lying between 600~650 nm. We systematically changed the power intensity of the light hitting our photocatalytic samples, and measured the decay of MB over time for each sample. FIG. 3.1 is a plot of the decay of the MB solution as a function of time for several light intensities of visible light.

FIG. 3.1 illustrates that the MB solution degrades with visible light intensity ranging from 100 mW to 5 μW. The impact of this is that the solar spectrum of light from the sun is dominated by visible light, with an average light intensity of around 100 mW in that region. Here, we were able to use significantly less energy than is available from the sun to photodegrade our dye solution. In addition, we tested the samples by placing them out in the sunlight for 2 hours, and found the solution was degraded after this time, showing that with our white light simulation and actual sunlight we are able to break down our organic dye solution. As a result, these embodiments could be used to degrade other dye compounds or volatile organic compounds (VOC's).

This Example also sows that embodiments of the present disclosure can be used in a photoelectrochemical cell (PEC) to create photocurrent and to split water.

To determine various semiconductor and semiconductor-electrolyte-interface (SEI) characteristics, impedance measurements were performed. Mott-Schottky (MS) plots for both $TiO_2/WO_3$ and $WO_3/TiO_2$ nanorod PEC systems are shown in FIGS. 3.2A and 3.2B. FIGS. 3.2A and 3.2B show Mott-Schottky Plots at 3 KHz, 5 KHz, 7 KHz and 10 KHz. Derivations for the flatband potential ($V_{FB}$), carrier density ($N_d$) and space charge thickness (W) from MS data can be found elsewhere. Overall the $TiO_2/WO_3$ MS plot does not strictly follow MS behavior in FIG. 3.2A. Impedance measurements taken at four different frequencies illustrate this point. At 3 kHz the linear portion is within the potential range of −0.125 to +0.125 V, thereafter having a shallower slope with a linear profile. As the scan frequency gets progressively higher we see a flattening of the plot from 3 kHz→10 kHz. At 10 kHz, the $1/C^2$ versus V is close to linear, and the general linear range has expanded from −0.125 V to ~+0.7. While not strict to the MS derivation, the $TiO_2/WO_3$ nanorod sample is following a trend that is not as complicated to interpret as sol gel ZnO thin films studied previously. From our study a frequency of 10 kHz best fits the capacitance model, and therefore illustrates the basic form of a semiconductor capacitance ($C_{SC}$) in series with the semiconductor bulk resistance. The MS plot of the $TiO_2/WO_3$ nanorod cells at 10 kHz reveals a flatband potential ($V_{FB}$) of approximately −0.28 (vs. Ag/AgCl) based on the extrapolation of the linear portion of the MS plot to the x-axis. Carrier density ($N_d$) as a function of the slope of the MS data at an applied V of 1V was found to be $4.5 \times 10^{17}$ $cm^{-3}$ and a space charge thickness (W) of 100 nm was calculated.

$WO_3/TiO_2$ impedance measurements depicted a more complex system that had a narrow range of potentials in which the MS model for capacitance was evident. Firstly, the overall shape of the four scans look similar with a linear region from −0.25→0V, and a shallowing of the overall slope from 0→1.0 V (FIG. 3.2B). Unlike the previous sample, there was not an overt change in the shoulder of the scan as the experimental frequency was increased. This small region of linearity nearest the x-axis is used for the overall determination of $V_{FB}$, $N_d$ and W. To remain consistent with the previous $TiO_2/WO_3$ results we extrapolated the values using values obtained from the 10 kHz scan. The $V_{FB}$ of the $WO_3/TiO_2$ sample was determined to be −0.21 V, 0.07 V anodic of the flat band potential found for $TiO_2/WO_3$.

FIG. 3.3 illustrates linear sweep voltammagrams of $TiO_2/WO_3$ core-shell nanorods in 0.5 M $NaClO_4$ buffered to pH=7.0. A dark background scan (blue), and a 100 mW/cm² scan (red) reveal a sublinear increase in photocurrent. Photocurrent generation is originally seen at ca. 0.0 V versus the Ag/AgCl reference electrode.

FIG. 3.4 illustrates IPCE action spectra of $TiO_2/WO_3$ and $WO_3/TiO_2$ core-shell nanorods show particularly different photoresponse based on the core material. The $TiO_2/WO_3$ nanorods show a photoresponse in the UV region starting after 400 nm, and represents photocurrent generation based on the intrinsic bandgap of $TiO_2$. The $WO_3/TiO_2$ nanorods show a drastically different action spectra with photoresponse out to about 600 nm. The intrinsic bandgap of $WO_3$ is 2.7 eV or 550 nm, and suggests the photocurrent generation is based on the absorption of photons in the core of the $WO_3/TiO_2$ nanorod. Since $WO_3$ has a much larger volume in the nanostructure compared to $TiO_2$, it is reasonable to believe that it will absorb more light than $TiO_2$, and thus we see that the multi-layer structure is photoactive in a range that is closer to the optical absorption of $WO_3$ than $TiO_2$.

Example 4

Brief Introduction

Dense and aligned $TiO_2$ nanorod arrays have been fabricated using oblique angle deposition on indium tin oxide conducting substrates. The $TiO_2$ nanorods were measured to be 800-1100 nm in length and 45-400 nm in width with an anatase crystal phase. Coverage of the indium tin oxide was extremely high with $25 \times 10^6$ $mm^{-2}$ of the $TiO_2$ nanorods. We have demonstrated the first use of these dense $TiO_2$ nanorod arrays as working electrodes in photoelectrochemical cells used for the generation of hydrogen by water splitting. A number of experimental techniques including UV-visible absorption spectroscopy, X-ray diffraction, high resolution scanning electron microscopy, energy dispersive X-ray spectroscopy and photoelectrochemistry have been used to characterize their structural, optical, and electronic properties. Both UV-visible and incident-photon-to-current-efficiencies measurements showed their photoresponse in the visible was limited, but with a marked increase around ~400 nm. Mott-Schottky measurements gave a flat band potential ($V_{FB}$) of +0.20 V, a carrier density of $4.5 \times 10^{17}$ $cm^{-3}$, and a space charge layer of 99 nm. Overall water splitting was observed with an applied overpotential at 1.0 V (versus Ag/AgCl) with a photo-to-hydrogen efficiency of 0.1%. The results suggest that these dense and aligned one-dimensional (1-D) $TiO_2$ nanostructures are promising for hydrogen generation from water splitting based on PEC.

Introduction

Over the past decade, one-dimensional (1-D) nanostructures have attracted considerable attention because of their unique optical and electronic properties. Due to the increasing need for clean energy production, significant effort has been made to exploit the properties of these materials for applications such as photovoltaics and related solar harvesting devices.[1-4] The splitting of water with sunlight to produce hydrogen is one of the most altruistic forms of energy production, since both water and sunlight are vastly abundant. Solar harvesting devices such as photoelectrochemical (PEC) cells[5, 6] could be an important source of sustainable alternative energy for the burgeoning hydrogen economy, and essential to decreasing the consumption of fossil fuels.

The first study of photoelectrochemical water splitting on $TiO_2$ was reported by Fujishima and Honda in 1972[6] and the details of which have been delved into extensively since then. [7-9] Khaselev and Turner greatly advanced the water splitting field by coupling a PV/PEC into a monolithic system with a 12.4% photon-to-hydrogen efficiency.[5] Metal oxides such as $TiO_2$, ZnO and $WO_3$ have all been investigated for water splitting with various film morphologies and efficiencies typically less than 1%.[10-16] A major obstacle in the use of metal oxides in general is their inherent large bandgaps and lack of absorption in the visible portion of the light spectrum. In order to reduce the bandgap of nanostructured $TiO_2$, there have been investigations into doping, utilizing both transition metals as well as nitrogen and carbon.[17-19] An additional issue for films with interconnected zero-dimensional (0-D) nanoparticles is charge transport, which is often limited because of the lack of continuous conducting pathways, with electrons moving by a hopping mechanism due to energy barriers between particles.[20] 1-D nanostructures are expected to have improved charge transport properties compared to 0-D nanostructures[21-23] because of the direct conduction pathways in nanorods versus electron hopping in nanoparticle systems.[24,25] In a successful utilization of 1-D nanostructures, Paulose et al. demonstrated hydrogen generation utilizing 6 μm long $TiO_2$ nanotube arrays and attained a hydrogen rate of ~180 μLhr$^{-1}$ via photolysis.[26] However, the use of 1-D metal oxide nanostructures as photoelectrodes in PEC for hydrogen generation is still limited and requires further research.

Techniques for the fabrication of 1-D nanostructures include colloidal synthesis[27,28], hydrothermal processes[29-31], organometallic chemical vapor deposition[32,33] (MOCVD), chemical vapor deposition (CVD)[34,35], oblique angle deposition (OAD)[36,37] and glancing angle deposition (GLAD)[38-43]. Compared to other 1-D nanostructure fabrication, OAD provides a simple way to produce aligned nanorod arrays with controlled porosity. OAD is a unique physical vapor deposition process, where the vapor flux is incident onto a substrate at a large angle $\theta(\theta>70°)$ with respect to the substrate normal. Due to a geometric shadowing effect, a well-aligned and separated nanorod array, tilting towards the direction of the vapor flux, can be produced. The length and diameter of the $TiO_2$ nanorods can be adjusted by changing the deposition condition.

In this work, we report the deposition of high-density and aligned $TiO_2$ nanorod arrays with well-defined lengths on ITO substrates via OAD. HRSEM measurements reveal the $TiO_2$ nanorods to have lengths of 800-1100 nm and widths of 45-400 nm. The nanorod arrays have been systematically characterized using a number of experimental techniques to gain a good understanding of their optical, structural, and electronic properties. Preliminary studies have demonstrated that the nanorod arrays have promising PEC properties for hydrogen generation by water splitting.

Results and Discussion
Structural and Optical Characterization

The nanorods were deposited at room temperature (RT), and then annealed in open air conditions at 550° C. During annealing they underwent a phase transition from amorphous to the anatase crystal structure. XRD spectra show vastly different crystallographic signatures from the as deposited to the fully annealed $TiO_2$ nanorod samples (FIG. 4.1). During the OAD process the substrate was held at RT throughout the deposition onto Si wafers, and in turn showed an amorphous XRD pattern without a trace of representative diffraction peaks (FIG. 4.1). Upon open-air calcinations at 550° C. diffraction peaks were seen at 25.27° and 47.96°. These peaks correspond to the (101) and (200) planes of the anatase crystal phase of $TiO_2$. No appearance of mixed phases of brookite, rutile and anatase were found as has been seen with colloidal $TiO_2$ nanoparticle systems.[44] The relatively small number of detectable diffraction peaks can be attributed to the thinness of the film at 1 μm, in comparison to 220 μm $TiO_2$ nanotubes which showed an improved signal-to-noise ratio.[45] EDS data, which provided information about elemental composition, was collected during HRSEM imaging (FIG. 4.2). The O peak at 0.5 keV (O Kα) was by far the most dominant since both the substrate, ITO and the material of interest ($TiO_2$) contain oxygen. Ti peaks at 4.5 keV (Ti Kα) and 4.9 keV (Ti Kβ) had similar counts compared to the signal coming from the substrate. Peaks arising from the ITO conducting substrate on soda lime glass include Na (Na Kα), Si (Si Kα) and In (In Lα, Lβ, Lγ). No trace of carbon was found during EDS measurements, indicating the lack of hydrocarbon contamination during processing.

Examination of the $TiO_2$ nanorods by HRSEM showed several distinct features arising from the OAD technique (FIG. 4.3). The first striking feature is that, due to the high angle of the incident adatom plume to the substrate (α=86°), the nanorods are tilted from the substrate at an angle of approximately 75° from substrate normal (FIG. 4.3A). FIG. 4.3A is actually taken normal to the substrate, but appears to be tilted due to this oriented growth. Overall length of the nanorods was found to be fairly uniform and in the range of 800-1100 nm (FIGS. 4.3 and 4.4). Due to the tilted orientation of the $TiO_2$ nanorods, it was more accurate to find a cluster of nanorods dislodged from the substrate in order to determine their length (FIG. 4.4A). A wide distribution existed in the width of the nanorods and was measured to be in the general range of 45-400 nm. The $TiO_2$ nanorods widen from the base to the tip due to a feathering effect (FIG. 4.3B). When examined at higher magnifications, the nature of the surface of the nanorods becomes more apparent (FIG. 4.4B). The $TiO_2$ nanorods display steps and flanges along their surface with a surface topography that is not uniform. The overall surface area of an individual nanorod is thus much higher than that of a nanorod with smooth or uniform surface. Overall density of the $TiO_2$ nanorods is on the order of $25 \times 10^6$ mm$^{-2}$, and the relatively high porosity is expected to be useful for PEC applications.

UV-visible absorption spectra of both as deposited $TiO_2$ nanorods and annealed $TiO_2$ nanorods at 550° C. show similar absorptive trends (FIG. 4.5). As deposited amorphous thin films show little absorption in the visible region (<400 nm), and abruptly increases around 400 nm with an overall absorption of 0.5 at 360 nm (FIG. 4.5A). After annealing at 550° C. in open-air conditions there is a subtle increase in the absorption in the visible region starting at 550 nm. Unlike the unannealed edition, they also have a shoulder at ~350 nm and an optical density (OD) of 0.8 at 360 nm. The crystallization of $TiO_2$ is responsible for these changes, since the as-deposited sample is amorphous with an undefined band gap, and after annealing a definite band gap is achieved. The band gap of the annealed sample was measured using the following relationship $$\alpha'(h\nu)^2 = A[(h\nu)^2 - E_g^2] \quad (1)$$

where $\alpha'=d\alpha/d(h\nu)$, is the first derivative of absorbance $\alpha$ with respect to hν. The plot is shown in FIG. 5.5B. Where this relationship becomes linear and crosses the x-axis is known to correspond to the band gap of the material. For the annealed $TiO_2$ nanorod sample, the band gap was calculated to be 3.27 eV (380 nm), which is very close to the bulk band gap of 3.2 eV.

PEC Characterization and Water Splitting

Linear sweep voltammetry is a common electrochemical technique to examine charge carrier characteristics at the semiconductor-electrolyte interface for n and p-type materials (SEI).[46] A set of linear sweep voltammagrams were measured in a 0.5 M NaClO$_4$ electrolyte solution buffered with phosphate buffer (PB) to pH=7.0 (FIG. 4.6). In order to verify that no leakage current was present, a dark current linear sweep was performed in a blackened room from −0.5 V→1.5 V, and showed minute current in the 10$^{-9}$ Acm$^{-2}$ range until approximately 1.4 V where a pronounced increase due to water splitting begins (FIG. 4.6). With an illuminated TiO$_2$ nanorod cell at AM 1.5 (100 mWcm$^{-2}$), there is a pronounced photocurrent (I$_{PH}$) starting at −0.2 V that continues to increase and has a I$_{PH}$ of 15 μAcm$^{-2}$ at 0.5 V. (FIG. 4.6). The I$_{PH}$ does not saturate completely and continues to gradually increase to a I$_{PH}$ of 18 μAcm$^{-2}$ at 1.0 V. The increase of I$_{PH}$ at −0.2 V indicates that there is good charge separation upon illumination, but an optimized depletion layer is not fully formed until 0.5 V→1.0 V, where the photocurrent saturates in the ~15 μAcm$^{-2}$-18 μAcm$^{-2}$ range. Increasing of the incident white light power to 230 mWcm$^{-2}$ (2.3×AM 1.5) showed a paralleled increase in I$_{PH}$ (FIG. 4.6). In this case, the saturation was observed at ~0.5 V and remained saturated with no further increase in I$_{PH}$. The saturated photocurrent at 230 mWcm$^{-2}$ was measured to be 40 μA/cm$^{-2}$, which is an increase of 166% in comparison to the AM 1.5 illumination at 0.5 V (FIG. 4.6). The larger than linear increase could be attributed to poorer charge separation at AM 1.5 and that the overall photocurrent was not optimized due to a higher rate of electron-hole recombination or surface trapping. The enhanced performance at 230 mWcm$^{-2}$ could be due to an increased electric field produced in the depletion layer because of the additional photogenerated excitons at the SEI. This increased electric field would in turn localize holes at the surface of the n-type TiO$_2$ nanorods more efficiently, and allow the photogenerated electrons to be vectorially transported through the long axis of the nanorods and collected at the backcontact.

To examine the photoresponse over time, amperometric I-t curves were collected with light on/off cycles at AM 1.5 (100 mWcm$^{-2}$) and 230 mWcm$^{-2}$ (2.3×AM 1.5) at 1 V (FIG. 4.7). At AM 1.5 the increase in I$_{PH}$ peaked quickly during initial illumination to ~25 μAcm$^{-2}$, and then decreased to a steady-state of 15 μAcm$^{-2}$ after 30 seconds (FIG. 4.7). At 230 mWcm$^{-2}$ the behavior is similar except that the initial I$_{PH}$ spike was at 52 μAcm$^{-2}$, and decayed to a steady-state value around 35 μAcm$^{31\ 2}$ (FIG. 4.7). The second on-cycle saw a less pronounced spike to 37 μAcm$^{-2}$ and more gradual photocurrent decay to 35 μAcm$^{-2}$. The types of decay profiles observed at both power densities can be attributed to recombination of charge carriers at surface sites of the TiO$_2$ nanorods.[47] Strikingly, I$_{PH}$ vs. J$_{LIGHT}$ on the TiO$_2$ nanorod electrode continues to linearly increase at 230 mWcm$^{-2}$ when compared to 100 mW/cm$^2$. There is a direct correlation in the increased steady state I$_{PH}$ (133%) to the increased irradiance (130%) on the PEC cell. Of practical importance would be the ability to use such a system with solar concentrators, and increase the I$_{PH}$ accordingly. The upper limit to this I$_{PH}$ vs. J$_{LIGHT}$ linear relationship has not been found, but continuing examinations are underway.

AC impedance measurements performed in the dark provide information about the intrinsic electronic properties of the semiconductor in contact with the electrolyte solution. Based on the Mott-Schottky plot (1/C$^2$ vs. V), one can extrapolate the position of the flatband potential V$_{FB}$ from the X-intercept, which was found to be +0.20 V (versus Ag/AgCl) at pH=7.0. The capacitance of the semiconductor is described by the Mott-Schottky equation $$\frac{1}{C^2} = \left(\frac{2}{e_o \varepsilon \varepsilon_o N_d}\right)\left[(V - V_{FB}) - \frac{kT}{e_o}\right] \quad (2)$$

wherein e$_o$ is the fundamental charge constant, ∈ is the dielectric constant of TiO$_2$, ∈$_o$ is the permittivity of vacuum, N$_d$ is the donor density, V is the electrode applied potential, V$_{FB}$ is the flatband potential, and kT/e$_o$ is a temperature dependent correction term. An examination into the Mott-Schottky behavior of nanoporous TiO$_2$ via theoretical and experimental routes revealed different behavior from that of the classic semiconductor electrode model.[48] The inherent differences mentioned were that of the contact made by the semiconductor to the conducting substrate (fluorine tin oxide, FTO) and the interaction of the electrolyte throughout the semiconductor network. Taking those aspects into consideration the capacitance relationship was defined by $$\frac{1}{C^2} = \left(\frac{2}{e_o \varepsilon \varepsilon_o N_d}\right)\left[(V - V_{FB}) - \frac{kT}{e_o}\right] + \frac{1}{C_H^2} \quad (3)$$

where C$_H$ is the Helmholtz capacitance.[48,49] While it was found that the V$_{FB}$ shifted negatively from their study, the slope 2/(e$_o$∈∈$_o$N$_d$) is unaffected and the donor density can still be described by equation (2). The V$_{FB}$ of +0.2 V (versus Ag/AgCl) is anodic in comparison to other TiO$_2$ nanoparticle and nanowires systems reported in the literature.[48,49] In the case of TiO$_2$ nanoparticle systems, the coverage of the conducting substrate is small (less than 20%) with an electric field that penetrates only 1 particle deep.[48] We believe the case is different for the dense TiO$_2$ nanorods produced by OAD. Our measured V$_{FB}$ value of +0.2 V can be understood by an increased capacitance of dense TiO$_2$ nanorod arrays as well as a larger coverage area of the ITO substrate by the TiO$_2$.[48]

The donor density N$_d$ is derived by the slope of the Mott-Schottky plot and is calculated via the equation $$N_d = -\left(\frac{2}{e\varepsilon_o \varepsilon}\right)\left(\frac{d(1/C^2)}{dV}\right)^{-1} \quad (4)$$

With an ∈ value of 50 based upon a nanoporous model,[48] the donor density, N$_d$, was then calculated to be 4.5×10$^{17}$ cm$^{-3}$ for our TiO$_2$ nanorod array system. In comparison, for TiO$_2$ nanowires produced by a solvo-thermal route, a N$_d$ value of 2×10$^{18}$ cm$^{-3}$ has been reported.[49] Their relatively high carrier density was attributed to a high level of defects caused by oxygen vacancies. The carrier density of our OAD TiO$_2$ nanorod system can also be attributed to oxygen vacancies, and the results also suggest that the level of defects is lower when producing TiO$_2$ nanorods via OAD than through the solvo-thermal route. The increase in I$_{PH}$ at 230 mW/cm$^2$ is strong evidence that the carrier density positively affects photocurrent generation, and will need to be further studied at higher light intensities.

Thickness of the space charge layer in the semiconductor-electrolyte can also be derived from the Mott-Schottky plot relationships and is described by $$W = \left[\frac{2\varepsilon\varepsilon_o(V - V_{FB})}{e_o N_D}\right]^{1/2} \quad (5)$$

with W being the space charge thickness. A potential of 1.0 V was chosen to calculate the space charge region because of the lack of dark current at that potential (FIG. 4.8). According to equation (5), the thickness of the space charge layer has been calculated to be 99 nm, significantly smaller than the 1 μm thickness of the $TiO_2$ nanorod film. When the space charge thickness is smaller than the film thickness, then an increase of photocurrent as a function of space charge thickness should be observed.[50]

IPCE measurements were performed in the photoactive wavelength regime for the $TiO_2$ nanorod arrays. IPCE action spectra essentially measures the amount of photogenerated electrons which are collected at the back contact per photon irradiated on the PEC surface. IPCE is described as $$IPCE = \frac{1240 * I_{PH}}{\lambda * J_{LIGHT}} \quad (6)$$

where $I_{PH}$ is the generated photocurrent in $\mu A/cm^2$, $\lambda$ is the incident light wavelength, and $J_{LIGHT}$ is the measured irradiance in $\mu W/cm^2$. The photoresponse of the $TiO_2$ nanorod arrays was minimal until 400 nm, and then sharply increased once bandgap illumination had been reached (FIG. 4.9). At 400 nm the IPCE was 2% due to the weak absorption below the bandgap energy of 3.27 eV (380 nm). This increased to 8% at 380 nm, and peaked at 350 nm with an IPCE of near 79% due to strong absorption. A lack of appreciable light below 350 nm from the light source prevented accurate data collection in the 300-340 nm range. The IPCE measurements were reflective of the UV-vis absorption spectrum with an increase in photoresponse as wavelengths were blue shifted from 400 nm. The efficiency of photon-to-hydrogen generation in a simplified form is described by $$\eta_c = \frac{I(1.23 - V_{BIAS})}{J_{LIGHT}} \quad (7)$$

wherein I is the current in $\mu A cm^{-2}$, $V_{BIAS}$ is the applied external bias and $J_{LIGHT}$ is the incident light in $mW cm^{-2}$.[7] Overall the greatest correction that needs to be considered is the lack of absorbance by the $TiO_2$ nanorod arrays in the visible region. While the direct irradiance was measured to be 100 $mWcm^{-2}$, several mechanisms for optical loss should be addressed. Reflection is a significant source of optical loss, from the light striking the pyrex PEC container (external reflection), reflection off of the ITO conducting substrate (internal reflection), and reflection off of the $TiO_2$ nanorods. We have conservatively placed the amount of reflection losses at 20%. Absorption and scattering is also an optical loss pathway, including absorption and scattering by the pyrex container and the electrolyte solution, which are estimated to be 5%. Overall the reflective, scattering, and absorptive optical losses are about 25%, which reduce the effective irradiance to about 75 mW/cm². The limited spectral overlap between the absorption of the $TiO_2$ PEC cell and the light emission profile of the Xe lamp is the most significant correction. Of the approximate 75 $mWcm^{-2}$ of available light, only about 5% is within the absorptive region between 350-400 nm where $TiO_2$ absorbs with an average OD of about 0.5.

With these corrections, we estimate an effective $J_{LIGHT}$ of 3.15 mW/cm². The overall photon-to-hydrogen efficiency is then calculated to be about 0.1% at an applied potential of 1.0 V with a current density of 18 $\mu A cm^{-2}$. While the current conversion efficiency is relatively low, it is clearly not yet optimized with respect to many important parameters. For instance, the thinness of the $TiO_2$ nanorod film coupled with the large bandgap of anatase $TiO_2$ leaves significant room for improvement in the realm of increasing the nanorod length and enhancing photoresponse in the visible with schemes such as doping or sensitization.[40] An important positive factor of the $TiO_2$ nanorod arrays is that photogenerated carriers have a high collection rate at the back contact as was observed with an IPCE of 79% at 350 nm and 54% at 360 nm. The good photocurrent production can be attributed to the vectorial charge transport through the long axis of the $TiO_2$ nanorods and the limited losses caused by electron-hole recombinations and surface trapping. The density of the $TiO_2$ nanorods ($25 \times 10^6$ $mm^{-2}$) on the ITO substrate makes efficient use of the available surface area, and allows for more water splitting sites per unit space. These features are unique for photoelectrodes composed of high density, aligned 1-D nanorod arrays and can be further studied to increase the overall water splitting efficiency.

Conclusion

In summary, $TiO_2$ nanorods have been fabricated using oblique angle deposition on conducting substrates and used as working electrodes in PEC studies for hydrogen generation from water splitting. The nanorod arrays have been characterized using a combination of spectroscopic, microscopy, and photoelectrochemistry techniques. The nanorods are generally well-ordered, dense, and uniform in length and orientation. With an applied overpotential at 1.0 V and near UV excitation, PEC hydrogen generation from water splitting has been successfully demonstrated. In the future, studies will be conducted to quantitatively compare the PEC performance of $TiO_2$ nanorod arrays produced by OAD with various lengths and with different strategies to enhance visible absorption including doping and sensitization.

Experimental

Materials

Sodium perchlorate ($NaClO_4$, #7601-89-0, 98% purity) and potassium phosphate dibasic ($HK_2PO_4$, #16788-57-1, 99+% purity) was purchased from Acros Organics (Morris Plains, N.J.). Potassium phosphate monobasic ($KH_2PO_4$, 99%, #BP362-500) was purchased from Fisher Scientific (Pittsburgh, Pa.). High purity silver conducting paint (#5002) was bought from SPI supplies (West Chester, Pa.). The Ag/AgCl reference electrode (#CHI111) was purchased from CHInstruments (Austin, Tex.). Indium tin oxide ($In:SnO_2$ #CG-411N-S107 6Ω) conducting substrates were purchased from Delta Technologies, Limited (Stillwater, Minn.). The $TiO_2$ evaporation source (99.9%) was purchased from Kurt J. Lesker Company (Pittsburgh, Pa.). Oxygen gas (#OX100, 99.5% purity) was purchased from National Welding Supply Company (Charlotte, N.C.).

4.2 $TiO_2$ Nanorod and PEC Cell Fabrication and Evaluation

The $TiO_2$ nanorod samples were prepared using a custom-built electron beam evaporation system (Torr International, New Windsor, N.Y.). Prior to deposition, the chamber was pumped down to a background pressure of $10^{-6}$ Torr. $TiO_2$ (99.9%, Kurt J. Lesker) was used as the source material, with no other gases present in the chamber during depositions. Three kinds of substrates were used; glass microscope slides for optical characterization, Si wafers for XRD measurements, and conducting ITO coated glass slides for PEC characterization. For OAD, the substrate was positioned 86° from the vapor incident direction. The growth rate and thickness of the deposition was monitored by a quartz crystal microbalance directly facing the vapor flux direction. For OAD $TiO_2$ nanorod depositions, the rate was fixed at 0.3 nm/s. After the depositions, the samples were annealed at 550° C. for 2 hours in air with a Leister heat gun (#CH-6056, Switzerland).

$TiO_2$ nanorod electrodes were fashioned into PEC cells by the placement of a copper wire onto a bare portion of the conducting substrate and secured with high purity silver conducting paint. Cells were then sealed on all edges with epoxy resin except for a working electrode surface area of 0.25-0.50 $cm^2$. Electrolyte solutions of 0.5 M $NaClO_4$ were prepared and then buffered to pH=7.0 with phosphate buffer solutions. Prior to photoelectrochemical experiments, all solutions were deaerated with nitrogen, and during experimentation a constant positive pressure of nitrogen was also flowing through a 3-neck PEC vessel at all times. A Ag/AgCl reference electrode (+0.198 V versus NHE) was employed along with a coiled Pt wire counter electrode during all runs. The PEC setup is as follows; a 1000 W Xe lamp (Oriel Research Arc Lamp assembly #69924 and power supply #69920) was utilized as a white light source, and was coupled to an infrared (IR) water filled filter (Oriel #6127), and then aligned into a monochromator (Oriel Cornerstone 130 1/8m). Irradiance measurements were performed with a Molectron (#PM5100) and Newport (#1815-C) power meter with a full power irradiance of 230 $mW/cm^2$ (2.3× Air Mass or AM 1.5). All PEC and impedance measurements were carried out on a Solartron 1280B (Oakridge, Tenn.) with CorrWare 2, CorrView 2, Zplot 2, and ZView 2 software (Scribner Associates, Inc. Southern Pines, N.C.). Linear sweep voltammagrams were measured at a scan rate of 10 mV/s at applied potentials from −0.5 V to 1.5 V in the dark, AM 1.5 (100 $mW/cm^2$) and at 230 $mW/cm^2$. Amperometric I-t curves were performed at an applied voltage of 1.0 V at AM 1.5 (100 $mW/cm^2$) and 230 $mW/cm^2$ (2.3×AM 1.5) with 180 second light on/off cycles. AC impedance measurements were performed in the dark at an AC amplitude of 7 mV and a frequency of 10 kHz with a three electrode system. IPCE action spectra were measured at various wavelengths from 350-500 nm at an applied potential of 1.0 V. Illumination of the $TiO_2$ PEC cells were all performed with irradiation from the substrate-semiconductor (SSC) interface.

UV-visible absorption spectroscopy was carried out on a Jasco 570 (Easton, Md.) spectrophotometer in ambient conditions on glass substrates. Samples were blanked to the glass substrates prior to collecting data on the $TiO_2$ thin films. $TiO_2$ nanorod nanorod arrays were placed normal to the beam path of the spectrometer, and the absorption spectra collected. XRD data were collected on a PANanalytical X'Pert PRO (Westborough, Mass.) with a Cu Kα (λ=1.5418 Å) X-ray radiation source. XRD was collected from $TiO_2$ nanorod samples deposited onto Si wafers. HRSEM was performed on a Zeiss Gemini Ultra-55. All images were taken with accelerating voltages of 5-10 keV, a working distance of 4-8 mm, and a sample tilt of 0-35°. Energy dispersive x-ray spectroscopy (EDS) was performed on the Ultra-55 with an EDAX detector (Mahwah, N.J.). All imaging was performed on the as-deposited $TiO_2$ nanorod samples on ITO conducting substrates.

References for Example 4, which are Incorporated herein by Reference

[1] M. Law, A. Radenovic, T. R. Kuykendall, J. Liphardt, P. D. Yang, *J. Phys. Chem. B* 2006, 110, 22652-22663.
[2] E. Enache-Pommer, J. E. Boercker, E. S. Aydil, *App. Phys. Let.* 2007, 91, 12.
[3] Q. Shen, K. Katayama, T. Sawada, M. Yamaguchi, T. Toyoda, *Jap. J. Appl. Phys.* 2006, 45, 5569-5574.
[4] W. U. Huynh, J. J. Dittmer, A. P. Alivisatos, *Science* 2002, 295, 2425-2427.
[5] O. Khaselev, J. A. Turner, *Science* 1998, 280, 425-427.
[6] A. Fujishima, K. Honda, *Nature* 1972, 238, 37-38.
[7] T. Bak, J. Nowotny, M. Rekas, C. C. Sorrell, *Int. J. Hydrogen Energy* 2002, 27, 991-1022.
[8] A. Hagfeldt, M. Gratzel, *Chem. Rev.* 1995, 95, 49-68.
[9] K. Rajeshwar, *J. Appl. Electrochem.* 2007, 37, 765-787.
[10] K. S. Ahn, Y. F. Yan, S. H. Lee, T. Deutsch, J. Turner, C. E. Tracy, C. L. Perkins, M. Al-Jassim, *J. Electrochem. Soc.* 2007, 154, B956-B959.
[11] J. H. Park, S. Kim, A. J. Bard, *Nano Lett.* 2006, 6, 24-28.
[12] J. H. Park, A. J. Bard, *Electrochem. Solid State Letters* 2006, 9, E5-E8.
[13] J. H. Park, A. J. Bard, *Electrochem. Solid State Letters* 2005, 8, G371-G375.
[14] C. Santato, M. Odziemkowski, M. Ulmann, J. Augustynski, *J. Am. Chem. Soc.* 2001, 123, 10639-10649.
[15] C. Santato, M. Ulmann, J. Augustynski, *J. Phys. Chem. B* 2001, 105, 936-940.
[16] A. Wolcott, T. R. Kuykendall, W. Chen, S. W. Chen, J. Z. Zhang, *J. Phys. Chem. B* 2006, 110, 25288-25296.
[17] X. F. Qiu, C. Burda, *Chem. Phys.* 2007, 339, 1-10.
[18] X. F. Qiu, Y. X. Zhao, C. Burda, *Adv. Mater.* 2007, 19, 3995-3999.
[19] G. R. Torres, T. Lindgren, J. Lu, C. G. Granqvist, S. E. Lindquist, *J. Phys. Chem. B* 2004, 108, 5995-6003.
[20] C. Santato, M. Ulmann, J. Augustynski, *Adv. Mater.* 2001, 13, 511-514.
[21] A. M. Morales, C. M. Lieber, *Science* 1998, 279, 208-211.
[22] X. F. Duan, Y. Huang, Y. Cui, J. F. Wang, C. M. Lieber, *Nature* 2001, 409, 66-69.
[23] J. T. Hu, M. Ouyang, P. D. Yang, C. M. Lieber, *Nature* 1999, 399, 48-51.
[24] G. K. Mor, K. Shankar, M. Paulose, O. K. Varghese, C. A. Grimes, *Nano Lett.* 2006, 6, 215-218.
[25] A. J. Frank, N. Kopidakis, J. van de Lagemaat, *Coord. Chem. Rev.* 2004, 248, 1165-1179.
[26] M. Paulose, G. K. Mor, O. K. Varghese, K. Shankar, C. A. Grimes, *J. Photochem. Photobi. A: Chem.* 2006, 178, 8-15.
[27] E. C. Scher, L. Manna, A. P. Alivisatos, *Phil. Trans. R. Soc. Lond.* 2003, 361, 241-255.
[28] L. Manna, E. C. Scher, A. P. Alivisatos, *J. Amer. Chem. Soc.* 2000, 122, 12700-12706.
[29] L. Vayssieres, *Adv. Mater.* 2003, 15, 464-466.
[30] L. Vayssieres, M. Graetzel, *Angew. Chem.* 2004, 43, 3666-3670.
[31] L. Vayssieres, K. Keis, S. E. Lindquist, A. Hagfeldt, *J. Phys. Chem. B* 2001, 105, 3350-3352.
[32] Y. Li, F. Qian, S. Gradecak, Y. Wu, H. Yan, H. Yan, D. A. Blom, C. M. Lieber, *Nano Lett.* 2006, 6, 1468-1473.
[33] S. Gradecak, F. Qian, Y. Li, H. G. Park, C. M. Lieber, *Appl. Phys. Lett.* 2005, 87, 17, 173111.
[34] T. Kuykendall, P. Ulrich, S. Aloni, P. D. Yang, *Nature Mater.* 2007, 6, 951-956.
[35] D. A. Boyd, L. Greengard, M. Brongersma, M. Y. El-Naggar, D. G. Goodwin, *Nano Lett.* 2006, 6, 2592-2597.
[36] J. D. Driskell, Y. Liu, S. B. Chaney, X. J. Tang, Y. P. Zhao, R. A. Dluhy, *J. Phys. Chem. C* 2008, 112, 895-901.
[37] W. Smith, Z. Y. Zhang, Y. P. Zhao, *J. Vac. Sci. Tech. B* 2007, 25, 1875-1881.

[38] Y. P. He, J. X. Fu, Y. Zhang, Y. P. Zhao, L. J. Zhang, A. L. Xia, J. W. Cai, *Small* 2007, 3, 153-160.
[39] Y. P. Zhao, D. X. Ye, G. C. Wang, T. M. Lu, *Nano Lett.* 2002, 2, 351-354.
[40] A. C. van Popta, J. Cheng, J. C. Sit, M. J. Brett, *J. Appl. Phys.* 2007, 102, 1, 013517.
[41] M. J. Colgan, B. Djurfors, D. G. Ivey, M. J. Brett, *Thin Solid Films* 2004, 466, 92-96.
[42] A. C. van Popta, J. C. Sit, M. J. Brett, *Appl. Opt.* 2004, 43, 3632-3639.
[43] M. Suzuki, T. Ito, Y. Taga, *Appl. Phys. Lett.* 2001, 78, 3968-3970.
[44] T. Lopez-Luke, A. Wolcott, L. P. Xu, S. W. Chen, Z. H. Wen, J. H. Li, E. De La Rosa, J. Z. Zhang, *J. Phys. Chem. C* 2008, 112, 1282-1292.
[45] K. Shankar, G. K. Mor, H. E. Prakasam, S. Yoriya, M. Paulose, O. K. Varghese, C. A. Grimes, *Nanotechnology* 2007, 18, 6, 065707.
[46] R. Memming, *Semiconductor Electrochemistry* Weinheim, Wiley-VCH, 2001. pp. 41-43
[47] J. E. Kroeze, T. J. Savenije, J. M. Warman, *J. Amer. Chem. Soc.* 2004, 126, 7608-7618.
[48] F. Fabregat-Santiago, G. Garcia-Belmonte, J. Bisquert, P. Bogdanoff, A. Zaban, *J. Electrochem. Soc.* 2003, 150, E293-E298.
[49] G. Wang, Q. Wang, W. Lu, J. H. Li, *J. Phys. Chem. B* 2006, 110, 22029-22034.
[50] R. Beranek, H. Tsuchiya, T. Sugishima, J. M. Macak, L. Taviera, S. Fujimoto, H. Kisch, P. Schmuki, *Appl. Phys. Lett.* 2005, 87, 24, 243114.

Example 5

Brief Introduction

Photoelectrochemical (PEC) cells based on nanostructured ZnO thin films have been investigated for hydrogen generation from water splitting. The ZnO nanostructures have been fabricated using three different deposition techniques, pulsed laser deposition (PLD), oblique angle deposition (OAD), and glancing angle deposition (GLAD). The nanostructured films generated have been characterized by SEM, HRSEM, XRD, UV-vis spectroscopy, and photoelectrochemistry techniques. PLD produced dense thin films with ca. 200 nm grain sizes, while OAD produced films with a fishscale morphology and individual features measuring ca. 900 nm by 450 nm on average. In contrast, GLAD generated highly nanoporous, interconnected network of spherical nanoparticles of 15-40 nm in diameter. Mott-Schottky plots shows the flat band potential ($V_{FB}$) of PLD, OAD, and GLAD samples to be −0.29 V, −0.28 V and +0.20 V, respectively. Generation of photocurrent ($I_{PH}$) was observed at anodic potentials and no limiting photocurrents were seen out to applied potentials of 1.3 V for all PEC cells. Effective photon-to-hydrogen efficiency was found to be 0.2%, 0.2% and 0.6% for PLD, OAD and GLAD samples, respectively. The photoelectrochemical properties of the GLAD ZnO nanoparticle films were superior and this is attributed to their greater nanoporosity and better charge transport properties.

Introduction

The utilization of metal oxides for light harvesting and water splitting via photolysis is an promising avenue for sustainable alternative energy (SAE) production, especially as the cost of petroleum increases, and the evidence for global climate change due to the release of greenhouse gases mounts.[1-3] Metal oxides such as ZnO, $TiO_2$, $TiO_2$:N and $WO_3$ have been widely utilized for photovoltaic (PV), photocatalysis and photoelectrochemical (PEC) cell devices.[4-12] Water splitting utilizing PEC cells has been an area of intense research, starting from the seminal work of Fujishima et al. and followed by the work of Morisaki et al. with $TiO_2$.[3,13] The first integrated PEC/PV cell composed of n and p-doped GaAs and p-GaInP$_2$, was capable of 12.4% photo-to-hydrogen efficiency, and remains the benchmark.[10]

The process of photoelectochemical water splitting has been studied extensively.[14-17] In total the overall PEC reaction can be described as follows for n-type semiconductor (n-SC) photoelectrodes:

$$4hv_o + (n-SC) + 2H_2O \Rightarrow 2H_2 + O_2 + (n-SC) \quad (1)$$

The properties of the semiconductor photoelectrodes critically influence the performance of the the photoelectrochemical cell. Therefore, significant efforts have been made to study and optimize the materials properties of the photoelectrodes in order to increase the efficiency of PEC.

The dimensionality of metal oxides has also been widely investigated as 0-D, 1-D and 2-D nanostructures with their unique properties elucidated upon.[18-22] Colloidal wet chemistry, chemical vapor deposition (CVD), and magnetron sputtering has proven versatile in the creation of nanometer sized features of metal oxides.[18, 23-26]

In this work, we compare the PEC properties of three types of ZnO nanostructures produced by different deposition techniques. The various materials were examined by XRD, SEM and HRSEM for both structural and morphological information, both before and after annealing at 550° C. in open air conditions. UV-visible spectrophotometry and photoelectrochemistry were utilized to determine their optical and photoeletrochemical properties. The results clearly demonstrate that the PEC characteristics are strongly dependent on the porosity and morphology of the ZnO photoelectrodes and suggest the importance of controlling the materials properties for optimizing PEC performance for hydrogen generation from water splitting.

Results and Discussion

Crystal Structure and Morphology of ZnO Nanostructured Films

Based upon the XRD data, there is a direct correlation between the observed diffraction peaks after room temperature deposition and after annealing. When α=0° (PLD), and the deposition process is creating a ZnO thin film, the annealing process is a key factor in overall crystallinity and phase (FIG. 5.2A). When deposition proceeds at room temperature, there are two diffraction peaks present around 31.0° and 56.3°, representative of the (100) and (110) crystal facets, respectively. After annealing at 550° C. in open air conditions, there are diffraction peaks at 31.5°, 34.4°, 36.3° and 56.6° which are assigned to the (100), (002), (101) and (110) crystal facets, all representative of the ZnO zincite phase (wurtzite structure-JCPDS#36-1451).[21] Consequently, it is evident that the position of the (100) and (110) diffraction planes shift slightly due to the difference in substrate temperature. During ZnO nano-fishscale formation utilizing OAD at α=86°, at both RT and after annealing there is only a single diffraction peak at 34.4°, representative of the (100) crystal facet (FIG. 5.2B). At 550° C. the intensity of the (100) increases 3-fold over the ZnO nanoplatelet deposition at RT and has a sharper peak profile as well. Contrarily ZnO GLAD samples have a drastically different XRD pattern, and have more crystal facets satisfying the Bragg requirements. The major diffraction peaks at (100), (002), (101) and (110) are prominent with very sharp features (FIG. 5.2C). The intensity of the zincite crystal phase peaks is attributed to the overall random orientation of the ZnO nanocrystallites and their relatively low density of defects. Due to the growth of ZnO GLAD samples on FTO substrates, the additional diffraction peaks representative of FTO are also apparent.

High resolution scanning electron microscopy (HRSEM) and SEM images detail the morphological differences of PLD, OAD and GLAD ZnO samples. ZnO thin films produced by PLD form a dense structure with grain sizes of ca. 200 nm (FIG. 5.3A). A portion of the thin film was displaced and allowed for a glimpse into the nature of the interface morphology between the FTO conducting substrate and the ZnO. Due to the rough nature of the FTO, the ZnO then replicates that texture, and produces a semi-porous interface (FIG. 5.3A). The thickness of the film was ca. 500 nm when viewed at a sample angle tilt of 25° (FIG. 5.3B). In contrast to the PLD samples, OAD morphology has an overlaid ensemble of nanoplatelets forming a fishscale like pattern (FIG. 5.4A). Individual ZnO nanoplatelets were ca. 950 nm by 450 nm, and were made up of agglomerated ZnO crystallites with an overall added porosity due to the shadowing effect of the oblique deposition angle of α=86° (FIG. 5.4B). OAD ZnO thin films have an average thickness of 500 nm measured via HRSEM images (not shown). GLAD samples, produced by electron beam deposition, alternatively were a collection of 15-40 nm diameter nanoparticles with a high level of nanoporosity (FIG. 5.5A and FIG. 5.5B). The interconnected ensemble produced a very contoured surface with areas of stalagmite like features and a high surface to volume ratio. GLAD samples examined had a thickness of 500 nm as well to allow for comparative PEC studies.

Defect Characteristics and UV-Visible Absorption

Depending upon the deposition technique utilized, the state of coloration of the films varied before and after annealing. PLD thin films, for instance, were a transparent brownish-yellow tone after their deposition at room temperature (RT). Intrinsic ZnO has a bulk bandgap of 3.3 eV, and should therefore be optically colorless.[27] However, the level of defects allows for weakly absorbing states and thereby color typically due to Zn interstitial sites and oxygen vacancies.[28,29] These defects allow for a red-shifted optical transition out to ca. 680 nm, a gradual increase throughout the visible until a plateau at 400 nm, and a continued absorptive increase in the UV region (FIG. 5.6A). This optical response was also observed in incident-photon-to-current-conversion-efficiency (IPCE) action spectra, which will be discussed later. After annealing of the PLD thin films at 550° C., the overall coloration of the films remained a transparent brownish-yellow hue. UV-vis absorption spectra changed slightly with a similar increase starting in the 650 nm range and gradually increasing until 400 nm, wherein a steep increase due to photoexcitation above the intrinsic bandgap occurred (FIG. 5.6B). Conclusively, it is apparent that PLD thin films were defect heavy, and due to the dense nature of the films, defects were not able to anneal out at 550° C.

OAD and GLAD samples behave in a different manner compared to the PLD thin films. OAD nanoplatelet thin films were near optically transparent, with a slight opaqueness to them and colorless after deposition at RT. The OAD optical absorption spectrum represented this well with little absorption throughout the visible region, and a drastic increase at 400 nm when bandgap photoexcitation was reached (FIG. 5.6A). Subsequent annealing at 550° C. in open air conditions showed little overall change to the ZnO nanoplatelets appearance or the UV-vis spectrum. After annealing at 550° C., a slight increase in absorbance at 500 nm is observed with an increased absorptive profile after 400 nm. The behavior of the ZnO GLAD samples was different than both the PLD and OAD thin films. At RT deposition the GLAD nanoparticles films were a dark brown tone and optically transparent, very similar to the appearance of the PLD thin films (FIG. 5.7A). The GLAD samples have a broad absorption throughout the visible starting at 700 nm, and continue to increase until a shoulder near 360 nm (FIG. 5.6A). At elevated annealing temperatures from 100-400° C. the ZnO nanoparticle films retained their dark brown appearance, indicative of a defect heavy ZnO (FIG. 5.7B). In stark contrast to both PLD and OAD samples, the GLAD nanoparticle films became optically transparent and colorless at a threshold annealing temperature of 550° C. within a matter of thirty seconds (FIG. 5.7C). After annealing, the UV-vis absorbance of the ZnO GLAD samples blue-shifted drastically to an absorption onset of ca. 400 nm with a peak residing at 360 nm (FIG. 5.6B). The evidence for the ZnO GLAD nanoparticle films unequivocally shows that defects introduced during the deposition process at RT were removed at a temperature of 550° C. We believe this change in the defect content of the nanoparticle films was due to the overall porosity of the film in conjunction with the high surface-to-volume ratio of the 15-40 nm nanoparticles.[29] Oxygen vacancies are the most likely culprit for the mid-bandgap optical transitions, and their subsequent removal at elevated temperatures is apparent in open air conditions.

Photoresponse and Photoelectochemical Water Splitting

The PEC results demonstrate successful hydrogen generation based on photocurrent response from nanostructured ZnO films with different morphologies and defect levels. At high current density, hydrogen generation can be visualized in terms of gas bubble formation on the photocathode and simultaneously oxygen bubble formation on the photoanode. The hydrogen generation efficiency clearly depends on the film properties, including thickness, morphology, defect density, and optical absorption spectrum. Fundamental electrochemical and photoelectrochemical properties were investigated to deduce properties such as the flatband potential ($V_{FB}$), donor density ($N_d$), and space charge layer (W).

Mott-Schottky plots ($1/C^2$ versus V) were performed in dark conditions in 0.5M $NaClO_4$ buffered with PB. The Mott-Schottky equation is described by $$\frac{1}{C^2} = \left(\frac{2}{e_o \varepsilon \varepsilon_o N_d}\right)\left[(V - V_{FB}) - \frac{kT}{e_o}\right] \quad (2)$$

wherein $e_o$ is the fundamental charge constant, $\varepsilon$ is the dielectric constant of ZnO (8.5)[30], $\varepsilon_o$ is the permittivity of vacuum, $N_d$ is the donor density, V is the electrode applied potential, $V_{FB}$ is the flatband potential, and $$\frac{kT}{e_o}$$

is a temperature dependent correction term. Flatband potentials were found by the extrapolation of the linear portion of $1/C^2$ vs. V to the x-axis. PLD, OAD and GLAD ZnO samples had $V_{FB}$ of −0.29V, −0.28V and +0.20V, respectively (FIG. 5.8). Both the PLD and OAD $V_{FB}$ are in the range of flatband potentials found for sputtered and sol gel ZnO thin films that had $V_{FB}$ values in the range of −0.3 to −0.4 V.[31] The anodic shift of the $V_{FB}$ to +0.20V in the ZnO GLAD nanoparticle film is due to the depletion of charge from the 15-40 nm nanoparticles based on previous discussions.[32] Theoretical and experimental Mott-Schottky studies of nanocrystalline semiconductor-electrolyte interfaces (SEI) on FTO substrates have revealed a dependence on surface coverage with $V_{FB}$ position.[33] From the Mott-Schottky plots, one is also able to calculate the donor density $N_d$ based on the slope via the equation $$N_d = -\left(\frac{2}{e\varepsilon_o\varepsilon}\right)\left(\frac{d(1/C^2)}{dV}\right)^{-1} \quad (3)$$

In our study we found donor densities for PLD, OAD and GLAD to be $3.2*10^{16}$ cm3, $2.8*10^{17}$ cm$^3$ and $1.4*10^{16}$ cm$^3$, respectively. Previous studies on magnetron sputtered ZnO films by Ahn et al. reported $N_d$ values of $4.6*10^{16}$ cm$^3$ and $1.8*10^{16}$ cm$^3$ for unannealed and annealed ZnO, respectively.[30] Unintuitively, the donor densities of PLD thin films were lower than the OAD films, even though the PLD samples were brownish-yellow and the OAD samples had an opaque colorless appearance, indicative of a higher density of defects for the PLD samples than the OAD samples. Coincidentally, the ZnO GLAD nanoparticle films with an original deep brownish hue indicative of heavy defects became colorless, and in turn had a lower donor density (compared to both PLD and OAD films) due to the removal of oxygen vacancies produced during RT deposition. An important aspect of the SEI is the phenomenon of band bending and the formation of a space charge layer (Schottky barrier).[32, 34] In the case of ZnO, a n-type semiconductor, under applied anodic conditions, a depletion layer is formed. The space charge layer is extrapolated from the Mott-Schottky plot through the expression $$W = \left[\frac{2\varepsilon\varepsilon_o(V - V_{FB})}{e_o N_D}\right]^{1/2} \quad (4)$$

wherein V is the applied potential at the working semiconductor electrode.[34] At an applied potential (V) of 1.0 V the calculated space charge layers were found to be 195 nm, 65 nm and 235 nm for the PLD, OAD and GLAD films, respectively. When the space charge layer is smaller than the film thickness (500 nm), we expect to see no limiting photocurrents, and this is indeed what was observed (FIG. 5.9).[35, 36]

Dark current and photocurrent measurements (100 mW/cm$^2$ white light) as a function of a varied potential were highly dependent on the deposition technique used. Firstly, the ZnO PLD samples under dark conditions showed a marked increase in dark current at ~0.8 V, which continued to increase linearly up to 1.3 V (FIG. 5.9). The PLD ZnO thin films had by far the largest background current, which may be attributed to the level of defects in the dense film, and incomplete coverage of the FTO conducting substrate. Photocurrent was generated in the PLD thin film at ca. 0.4 V, wherein it increased gradually until 0.8 V, and then steeply increased until 1.3 V. Initial photocurrent generation beginning at 0.69 V anodic of the flatband potential is an indication of rigorous photogenerated electron-hole recombination, and an under developed space charge region. (Reference-Heli Wang) A photocurrent of 45.9 µA/cm$^2$ was in turn generated at an applied potential of 1.0 V after which a space charge layer of 195 nm was formed.

ZnO OAD nanoplatelet films had a reduced dark current until 1.0 V where the electrolytic oxidation of water occurs. Under illumination at AM 1.5, photocurrent was initially generated at +0.25 V, and increased near linearly up to a $I_{PH}$ of 44.9 µA/cm$^2$ at 1.0V (FIG. 5.9). Efficient collection of electrons at the backcontact occurred at 0.58 V anodic of $V_{FB}$, and is due to an increased microporosity and semiconductor-electrolyte interaction in the ZnO nanoplatelet system.

The ZnO nanoparticle system produced by GLAD was superior in its overall PEC properties with a small back ground current (≤0.25 µA/cm$^2$ at 1.0 V) and immediate $I_{PH}$ generation at 0.2 V indicative of a more efficient diffusion of carriers through the nanoparticles to the backcontact (FIG. 5.9). With a larger space charge layer of 235 nm, electron-hole recombination was reduced and produced a photocurrent of 142.5 µA/cm$^2$ at 1.0 V and AM 1.5. The hopping mechanism, inherently used to describe interconnected nanoparticle systems such as the Graetzel cell, allowed for greater carrier mobility. The increased surface-to-volume ratio of the 15-40 nm ZnO nanoparticles along with the decreased number of defects after annealing at 550° C. aided the PEC performance.

Incident-photon-to-current-conversion efficiency (IPCE) were calculated based upon the equation $$IPCE = \frac{1240 * I_{PH}}{\lambda * J_{LIGHT}} \quad (5)$$

where $I_{PH}$ is the photocurrent in µA/cm$^2$, $\lambda$ is the incident wavelength of light and $J_{LIGHT}$ is the irradiance in µW/cm$^2$. Overall, the three systems behaved in a similar manner with the PLD thin film having a weak visible response out to 640 nm (FIG. 5.10). The PLD system (from the left, the bottom curve) increased its IPCE % after 400 nm, but was not consistent dropping from 9.7% at 360 nm to 2.3% at 350 nm. The OAD (from the left, the middle curve) and GLAD ZnO (dashed curve) samples behaved more traditionally with no visible photoresponse, and a fast increase after 400 nm and achieved IPCE % at 350 nm of 12.9% and 16.0%, respectively.

Water splitting was observed at an applied potential of 1.0 V for the ZnO PLD, OAD and GLAD cells resulting in a photon-to-hydrogen efficiency of 0.1%, 0.2% and 0.6%, respectively. These values were obtained with a corrected irradiance of 10 mW/cm$^2$ for PLD thin films and 5 mW/cm$^2$ for the OAD nanoplatelet and GLAD nanoparticle thin films. The integrated spectral overlap of the Xe lamp in the UV is approximately 5%, as estimated from individual irradiance measurements made through the UV-visible spectrum at various wavelengths. This correction was made because of the weak visible absorption by the samples as indicated by both UV-visible absorbance (FIG. 5.6) and IPCE % action spectra (FIG. 5.9). PLD thin films, with an extended weak visible absorption, had a corrected irradiance of 10 mW/cm$^2$ to account for the increased photoresponse. The original irradiance was measured to be 100 mW/cm$^2$, but due to the limited spectral output of the Xe lamp in the UV region, there is considerable loss in usable photons. Losses relating to reflection, absorption by the PEC experimental cell and electrolyte were also considered. The photon-to-hydrogen efficiency is calculated via the expression $$\eta_c = \frac{I(1.23 - V_{BIAS})}{J_{LIGHT}} \quad (6)$$

and I is the photocurrent, $V_{BIAS}$ is the applied external bias and $J_{LIGHT}$ the incident light irradiance.[14]

While the PLD and OAD films showed consummate photon-to-hydrogen efficiencies of 0.2%, the GLAD nanoparticle system showed a three-fold increase to 0.6%. This is attributed to increased porosity of the GLAD films and thereby increased semiconductor-electrolyte interaction that is beneficial to PEC performance and water splitting. Also, transport of photogenerated carriers in the GLAD films could be aided in part by a larger space charge region that promotes the separation of photogenerated electron/holes at the SEI. Possible routes to increase photoresponse and efficiency, especially in the visible, are the utilization of doping and quantum dot sensitization, which are currently under investigation.

Conclusion

PEC studies have shown the different nanostructures of ZnO have promising photoresponse for hydrogen generation from water splitting. The defect heavy PLD ZnO samples showed extended photoresponse due to oxygen vacancies and Zn interstitials, in comparison to OAD and GLAD PEC cells. The GLAD and PLD also responded differently to annealing in terms of changes in the density of defects. The dependence on morphology and defect level suggests the importance of controlling the nanostructures to tailor their fundamental properties for optimal hydrogen generation applications. A combination of the inherit advantages of defect ladened PLD ZnO with the nanoporosity of GLAD are both positive aspects to be optimized to further increase photoresponse, and hydrogen generation efficiency.

Experimental Section

Materials

Sodium perchlorate ($NaClO_4$, #7601-89-0, 98% purity) and potassium phosphate dibasic ($HK_2PO_4$, #16788-57-1, 99+% purity) was purchased from Acros Organics (Morris Plains, N.J.). Potassium phosphate monobasic ($KH_2PO_4$, 99%, #BP362-500) was purchased from Fisher Scientific (Pittsburgh, Pa.). High purity silver conducting paint (#5002) was bought from SPI supplies (West Chester, Pa.). The Ag/AgCl reference electrode (#CHI111) was purchased from CHInstruments (Austin, Tex.). Conducting soda lime glass substrates ($F:SnO_2$ Tec-30) was obtained from Hartford glass (Hartford City, Ind.). ZnO powder (#87812, 99.98%) was purchased from Alfa Aesar (Ward Hill, Mass.). Oxygen gas (#OX100, 99.5% purity) was purchased from National Welding Supply Company (Charlotte, N.C.). Fluorine tin oxide (FTO, Tec-15) conducting substrates were purchased from Hartford glass company (Hartford City, Ind.) Indium tin oxide (ITO, CG-411N-S107) conducting substrates were purchased from Delta Technologies (Stillwater, Minn.).

ZnO Electrode deposition Use of PLD and OAD for thin film formation has stretched over many genres of application driven materials work. PLD is based on a target material being ablated by high energy laser pulses in an ultra high vacuum or in a controlled gas environment, and the created adatom plume subsequently depositing material onto the substrate of choice perpendicular to the adatom stream (FIG. 5.1). In OAD the substrate angle ($\alpha$) is changed to a very obtuse angles ($\alpha=86°$) in comparison to the incoming plume of atoms to allow for shadowing to occur, and thus various morphologies and porosities can result.[37-39] GLAD is an extension of OAD with the target angle $\alpha=86°$, but the substrate is also simultaneously rotating at a certain revolution per minute rate (rpm). In this particular study an electron-beam was used to ablate the target for GLAD samples. In previous studies GLAD has produced 1-D nanostructures and were found to have novel optical, photocatalytic and magnetic properties.[40-45] The deposition of a plethora of metal oxides using OAD and other deposition techniques has also garnered attention for solar energy applications and is reviewed thoroughly by Granqvist.[46]

ZnO (99.99%, Alfa Aesar) targets were initially prepared by pressing ZnO powder into disks approximately 3 cm in diameter and 1 cm thick under ~10,000 psi by a hydraulic press. The pellets were then annealed in air at 1000° C. for 2 hours in a furnace. The hardened pellets were then stuck with silver paste to the target carousel inside the PLD/OAD or GLAD chamber for deposition. For PLD deposition, an Nd:YAG laser (Spectra Physics Mountain View, Calif.) was used at a wavelength of 355 nm with an average power of ~4.76 Watts and a deposition time of 2 hours. The incident laser beam was at a 45° angle with respect the ZnO target plane. A base pressure of $~10^{-7}$ mbar was achieved for all depositions. Before depositing the ZnO, oxygen gas was let into the chamber and for all depositions, an $O_2$ pressure of $6.3 \times 10^{-3}$ mbar was attained. The substrates used were Si wafers (100), glass, and FTO conducting substrates. The FTO substrates were used for photoelectrochemical characterization. For thin film deposition, the incident ZnO plasma plume was normal in respect to the substrate utilized. For OAD deposition, the incident ZnO plasma plume was positioned 86° to the substrate, and was performed for 15 hours. The source materials used to deposit was ZnO, with no other gases present in the chamber during depositions and the chamber background pressure was at $1-2 \times 10^{-6}$ Torr. Both Si wafers and glass microscope slides were used as substrates for different characterizations. GLAD samples were prepared using a custom-built electron beam evaporation system (Torr International, New Windsor, N.Y.). For glancing angle deposition (GLAD), the substrate normal was also positioned 86° from the vapor incident flux, and was rotated azimuthally at a constant rate of 0.5 rev/second. All ZnO GLAD samples were deposited onto ITO conducting substrates for optical, crystallographic and photoelectrochemical (PEC) characterization. The growth rate and thickness of the deposition were both monitored by a quartz crystal microbalance (QCM) facing the vapor flux direction directly. All samples were annealed at 550° C. in open air conditions with a Leister heat gun (Switzerland, CH-6056).

PEC Measurement and Electrolyte Preparation

ZnO electrodes were fashioned into PEC cells by the placement of a copper wire onto a bare portion of the conducting substrate and secured with high purity silver conducting paint. Cells were then sealed on all edges and upon the active area (deposited ZnO) with epoxy resin except for a working electrode surface area of 0.25-0.50 $cm^2$ on average. Electrolyte solutions of 0.5 M $NaClO_4$ were prepared and then buffered to pH=7.4 with phosphate buffer solutions. Prior to photoelectrochemical experimentation, all solutions were deaerated with nitrogen, and during experimentation a constant stream of nitrogen was also flowing through the 3-neck PEC vessel at all times. A Ag/AgCl reference electrode (+0.198 V versus NHE) was employed along with a coiled Pt wire counter electrode during all runs. The PEC setup is as follows, a 1000 W Xe lamp (Oriel Research Arc Lamp assembly #69924 and power supply #69920) was utilized as a white light source, an infrared (IR) water filled filter was than attached (Oriel #6127), and then the white light beam was coupled into a monochromator (Oriel Cornerstone 130 1/8 m) for spectral resolution from 300 to 800 nm. Irradiance measurements were performed with a Molectron (#PM5100) and Newport (#1815-C) power meter with a full power irradiance of 230 mW/$cm^2$ (2.3× Air Mass or AM 1.5).

Optical, Crystallographic and Morphological Characterization

UV-visible absorption spectroscopy was carried out on a Jasco 570 (Easton, Md.) spectrophotometer in ambient conditions on glass substrates. Samples were blanked to the glass substrates prior to collecting data on the ZnO thin films. ZnO thin films were placed normal to beam path of the spectrometer, and the absorption spectra collected. XRD data was performed on a PANanalytical X'Pert PRO (Westborough, Mass.) with a Cu Kα ($\lambda$=1.5418 Å) X-ray radiation source. High resolution scanning electron microscopy (HRSEM) was done on a FEI Srata 235 dual beam focused FIB and a JOEL FESEM (field emission SEM) at the National Center for Electron Microscopy (NCEM) at Lawrence Berkeley National Laboratory (LBNL) with as prepared samples on FTO substrates.

References for Example 5, which are Incorporated Herein by Reference

1. Fujishima, A.; Honda, K., Electrochemical Photolysis Of Water At A Semiconductor Electrode. *Nature* 1972, 238, (5358), 37-+.
2. Gratzel, M., Photoelectrochemical cells. *Nature* 2001, 414, (6861), 338-344.
3. Morisaki, H.; Watanabe, T.; Iwase, M.; Yazawa, K., Photoelectrolysis Of Water With Tio2-Covered Solar-Cell Electrodes. *Applied Physics Letters* 1976, 29, (6), 338-340.
4. Keis, K.; Vayssieres, L.; Lindquist, S. E.; Hagfeldt, A., Nanostructured ZnO electrodes for photovoltaic applications. *Nanostructured Materials* 1999, 12, (1-4), 487-490.
5. Lopez-Luke, T.; Wolcott, A.; Xu, L.; Chen, S.; Wen, Z.; Li, J.; De La Rosa, E.; Zhang, J., Nitrogen Doped and CdSe Quantum Dot Sensitized Nanocrystalline TiO2 Films for Solar Energy Conversion Applications. *Journal Of Physical Chemistry B* 2007.
6. Oregan, B.; Gratzel, M., A Low-Cost, High-Efficiency Solar-Cell Based On Dye-Sensitized Colloidal Tio2 Films. *Nature* 1991, 353, (6346), 737-740.
7. Sobana, N.; Swaminathan, M., Combination effect of ZnO and activated carbon for solar assisted photocatalytic degradation of Direct Blue 53. *Solar Energy Materials And Solar Cells* 2007, 91, (8), 727-734.
8. Wang, H. L.; Lindgren, T.; He, J. J.; Hagfeldt, A.; Lindquist, S. E., Photolelectrochemistry of nanostructured WO3 thin film electrodes for water oxidation: Mechanism of electron transport. *Journal Of Physical Chemistry B* 2000, 104, (24), 5686-5696.
9. Huynh, W. U.; Dittmer, J. J.; Alivisatos, A. P., Hybrid nanorod-polymer solar cells. *Science* 2002, 295, (5564), 2425-2427.
10. Khaselev, O.; Turner, J. A., A monolithic photovoltaic-photoelectrochemical device for hydrogen production via water splitting. *Science* 1998, 280, (5362), 425-427.
11. Park, J. H.; Bard, A. J., Unassisted water splitting from bipolar Pt/dye-sensitized TiO2 photoelectrode arrays. *Electrochemical And Solid State Letters* 2005, 8, (12), G371-G375.
12. Wolcott, A.; Smith, W.; Kuykendall, T. R.; Zhao, Y.; Zhang, J. Z., Photoelectrochemical Water Splitting Using Dense and Aligned TiO2 Nanorod Arrays. *Small* 2008, Accepted.
13. Fujishima, A.; Honda, K., Photoelectrochemical photolysis of water at a semiconductor electrode. *Nature* 1972, 238, 37-38.
14. Bak, T.; Nowotny, J.; Rekas, M.; Sorrell, C. C., Photo-electrochemical hydrogen generation from water using solar energy. Materials-related aspects. *International Journal Of Hydrogen Energy* 2002, 27, (10), 991-1022.
15. Hagfeldt, A.; Graetzel, M., Light-Induced Redox Reactions in Nanocrystalline Systems. *Chemical Reviews* 1995, 95, (1), 49-68.
16. Rajeshwar, K., Hydrogen generation at irradiated oxide semiconductor-solution interfaces. *Journal Of Applied Electrochemistry* 2007, 37, (7), 765-787.
17. Memming, R., *Semiconductor Electrochemistry*. 1st ed.; Wiley-VCH: Weinheim, 2001; p 399.
18. Law, M.; Greene, L. E.; Johnson, J. C.; Saykally, R.; Yang, P. D., Nanowire dye-sensitized solar cells. *Nature Materials* 2005, 4, (6), 455-459.
19. O'Regan, B.; Lenzmann, F.; Muis, R.; Wienke, J., A solid-state dye-sensitized solar cell fabricated with pressure-treated P25-TiO2 and CuSCN: Analysis of pore filling and IV characteristics. *Chemistry Of Materials* 2002, 14, (12), 5023-5029.
20. Wolcott, A.; Kuykendall, T. R.; Chen, W.; Chen, S. W.; Zhang, J. Z., Synthesis and characterization of ultrathin WO3 nanodisks utilizing long-chain poly(ethylene glycol). *Journal Of Physical Chemistry B* 2006, 110, (50), 25288-25296.
21. Vayssieres, L., Growth of arrayed nanorods and nanowires of ZnO from aqueous solutions. *Advanced Materials* 2003, 15, (5), 464-466.
22. Wu, J. J.; Wong, D. K. P., Fabrication and impedance analysis of n-ZnO nanorod/p-Si heterojunctions to investigate carrier concentrations in Zn/O source-ratio-tuned ZnO nanorod arrays. *Advanced Materials* 2007, 19, (15), 2015-+.
23. Law, M.; Greene, L. E.; Radenovic, A.; Kuykendall, T.; Liphardt, J.; Yang, P. D., ZnO—Al2O3 and ZnO—TiO2 core-shell nanowire dye-sensitized solar cells. *Journal Of Physical Chemistry B* 2006, 110, (45), 22652-22663.
24. Musil, J.; Herman, D.; Sicha, J., Low-temperature sputtering of crystalline TiO2 films. *Journal Of Vacuum Science & Technology A* 2006, 24, (3), 521-528.
25. O'Regan, B.; Schwartz, D. T.; Zakeeruddin, S. M.; Gratzel, M., Electrodeposited nanocomposite n-p heterojunctions for solid-state dye-sensitized photovoltaics. *Advanced Materials* 2000, 12, (17), 1263-+.
26. Robel, I.; Subramanian, V.; Kuno, M.; Kamat, P. V., Quantum dot solar cells. Harvesting light energy with CdSe nanocrystals molecularly linked to mesoscopic TiO2 films. *Journal Of The American Chemical Society* 2006, 128, (7), 2385-2393.
27. Ahn, K. S.; Shet, S.; Deutsch, T.; Jiang, C. S.; Yan, Y. F.; Al-Jassim, M.; Turner, J., Enhancement of photoelectrochemical response by aligned nanorods in ZnO thin films. *Journal Of Power Sources* 2008, 176, (1), 387-392.
28. Oba, F.; Togo, A.; Tanaka, I.; Paier, J.; Kresse, G., Defect energetics in ZnO: A hybrid Hartree-Fock density functional study. *Physical Review B* 2008, 77, (24).
29. Ischenko, V.; Polarz, S.; Grote, D.; Stavarache, V.; Fink, K.; Driess, M., Zinc oxide nanoparticles with defects. *Advanced Functional Materials* 2005, 15, (12), 1945-1954.
30. Ahn, K. S.; Yan, Y. F.; Lee, S. H.; Deutsch, T.; Turner, J.; Tracy, C. E.; Perkins, C. L.; Al-Jassim, M., Photoelectrochemical properties of n-incorporated ZnO films deposited by reactive RF magnetron sputtering. *Journal Of The Electrochemical Society* 2007, 154, (9), B956-B959.
31. Windisch, C. F.; Exarhos, G. J., Mott-Schottky analysis of thin ZnO films. *Journal Of Vacuum Science & Technology A—Vacuum Surfaces And Films* 2000, 18, (4), 1677-1680.

32. Hagfeldt, A.; Gratzel, M., Light-Induced Redox Reactions In Nanocrystalline Systems. *Chemical Reviews* 1995, 95, (1), 49-68.
33. Fabregat-Santiago, F.; Garcia-Belmonte, G.; Bisquert, J.; Bogdanoff, P.; Zaban, A., Mott-Schottky analysis of nanoporous semiconductor electrodes in dielectric state deposited on SnO2(F) conducting substrates. *Journal Of The Electrochemical Society* 2003, 150, (6), E293-E298.
34. Schottky, W., *Z. Phys.* 1942, 118, (539).
35. Gartner, W. W., Depletion-Layer Photoeffects In Semiconductors. *Physical Review* 1959, 116, (1), 84-87.
36. Beranek, R.; Tsuchiya, H.; Sugishima, T.; Macak, J. M.; Taveira, L.; Fujimoto, S.; Kisch, H.; Schmuki, P., Enhancement and limits of the photoelectrochemical response from anodic TiO2 nanotubes. *Applied Physics Letters* 2005, 87, (24).
37. Driskell, J. D.; Shanmukh, S.; Liu, Y.; Chaney, S. B.; Tang, X. J.; Zhao, Y. P.; Dluhy, R. A., The use of aligned silver nanorod Arrays prepared by oblique angle deposition as surface enhanced Raman scattering substrates. *Journal Of Physical Chemistry C* 2008, 112, (4), 895-901.
38. Smith, W.; Zhang, Z. Y.; Zhao, Y. P., Structural and optical characterization of WO3 nanorods/films prepared by oblique angle deposition. *Journal Of Vacuum Science & Technology B* 2007, 25, (6), 1875-1881.
39. Chaney, S. B.; Shanmukh, S.; Dluhy, R. A.; Zhao, Y. P., Aligned silver nanorod arrays produce high sensitivity surface-enhanced Raman spectroscopy substrates. *Applied Physics Letters* 2005, 87, (3).
40. Colgan, M. J.; Djurfors, B.; Ivey, D. G.; Brett, M. J., Effects of annealing on titanium dioxide structured films. *Thin Solid Films* 2004, 466, (1-2), 92-96.
41. He, Y. P.; Fu, J. X.; Zhang, Y.; Zhao, Y. P.; Zhang, L. J.; Xia, A. L.; Cai, J. W., Multilayered Si/Ni nanosprings and their magnetic properties. *Small* 2007, 3, (1), 153-160.
42. Suzuki, M.; Ito, T.; Taga, Y., Photocatalysis of sculptured thin films of TiO2. *Applied Physics Letters* 2001, 78, (25), 3968-3970.
43. van Popta, A. C.; Cheng, J.; Sit, J. C.; Brett, M. J., Birefringence enhancement in annealed TiO2 thin films. *Journal Of Applied Physics* 2007, 102, (1).
44. van Popta, A. C.; Sit, J. C.; Brett, M. J., Optical properties of porous helical thin films. *Applied Optics* 2004, 43, (18), 3632-3639.
45. Zhao, Y. P.; Ye, D. X.; Wang, G. C.; Lu, T. M., Novel nano-column and nano-flower arrays by glancing angle deposition. *Nano Letters* 2002, 2, (4), 351-354.
46. Granqvist, C. G., Transparent conductors as solar energy materials: A panoramic review. *Solar Energy Materials And Solar Cells* 2007, 91, (17), 1529-1598.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In embodiments where "about" modifies 0 (zero), the term "about" can include ±1%, ±2%, ±3%, ±4%, ±5%, ±6%, ±7%, ±8%, ±9%, ±10%, or more of 0.00001 to 1. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of the disclosure. Many variations and modifications may be made to the above-described embodiments. All such modifications and variations are intended to be included herein within the scope of this disclosure and protected by the following claims.

Therefore, at least the following is claimed:

1. A photocatalytic structure comprising:
   a substrate;
   a first layer comprising an aligned array of $WO_3$ nanorods deposited on the substrate; and
   a second layer deposited on each of the nanorods of the array of the first layer, the second layer comprising $TiO_2$.

2. The photocatalytic structure of claim 1, wherein the first layer and the second layer form an aligned array of two-layer nanorods.

3. The photocatalytic structure of claim 2, wherein each of the two-layer nanorods is vertical relative to the substrate.

4. The photocatalytic structure of claim 3, wherein the array has a density ($\eta$) of about 8-12 nanorods/$\mu m^2$, an average length (l) of about 750-850 nm, and an average diameter on top (D) of about 70-90 nm.

5. The photocatalytic structure of claim 3, wherein the crystal structure of the $TiO_2$ and the $WO_3$ is amorphous.

6. The photocatalytic structure of claim 3, wherein the crystal structure of the $TiO_2$ is anatase and the crystal structure of the $WO_3$ is orthorhombic.

7. The photocatalytic structure of claim 2, wherein each of two-layer nanorods is tilted relative to the substrate.

8. The photocatalytic structure of claim 7, wherein the array has a density ($\eta$) of about 35-45 rods/$\mu m^2$, an average length (l) of about 1.1-1.5 μm, an average diameter (D) of about 40-50 nm, and a tilting angle ($\beta$) of about 53°-57°.

9. The photocatalytic structure of claim 7, wherein the crystal structure of the $TiO_2$ is anatase and the crystal structure of the $WO_3$ is amorphous.

10. The photocatalytic structure of claim 7, wherein the crystal structure of the $TiO_2$ is anatase and the crystal structure of the $WO_3$ is orthorhombic.

11. A photocatalytic structure comprising:
    a substrate;
    a first layer comprising an aligned array of nanorods deposited on the substrate, wherein each of the nanorods is made of a material selected from the group consisting of: $WO_3$ and $TiO_2$; and
    a second layer deposited on each of the nanorods of the array of the first layer, the second layer is made of a material selected from the group consisting of: $WO_3$ and $TiO_2$, wherein the first layer and the second layer are made of different materials,
    wherein the first layer and the second layer form a core-shell nanorod array, wherein each core-shell nanorod includes a first layer core and a second layer shell disposed around the first layer core.

12. The photocatalytic structure of claim 11, wherein the core-shell nanorod array has morphological parameters comprising: a height of about 1.5 to 1.7 μm, a base diameter of about 25 to 35 nm, a diameter at the top of about 320 to 340 nm, and a density of about 7-11 rods/$\mu m^2$.

13. The photocatalytic structure of claim 11, wherein the first layer is $TiO_2$ and the second layer is $WO_3$.

14. The photocatalytic structure of claim 11, wherein the first layer is $WO_3$ and the second layer is $TiO_2$.

15. The photocatalytic structure of claim 11, wherein the crystal structure of the $TiO_2$ and the $WO_3$ is amorphous.

16. The photocatalytic structure of claim 11, wherein the crystal structure of the $TiO_2$ is anatase and the crystal structure of the $WO_3$ is amorphous.

17. The photocatalytic structure of claim 11, wherein the crystal structure of the $TiO_2$ is anatase and the crystal structure of the $WO_3$ is orthorhombic.

* * * * *